US006320676B1

United States Patent
Yoshidome

(10) Patent No.: US 6,320,676 B1
(45) Date of Patent: Nov. 20, 2001

(54) METHOD OF PREDICTING AND PROCESSING IMAGE FINE STRUCTURES

(75) Inventor: Yoshifumi Yoshidome, Kagoshima (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/373,233

(22) Filed: Aug. 12, 1999

Related U.S. Application Data

(62) Division of application No. 09/018,337, filed on Feb. 4, 1998.

(30) Foreign Application Priority Data

Feb. 4, 1997 (JP) .................................................. 09-021574
Feb. 4, 1997 (JP) .................................................. 09-021691

(51) Int. Cl.⁷ .................................................. G06F 15/00
(52) U.S. Cl. .................................................. 358/1.9; 358/534
(58) Field of Search .............................. 358/1.9, 1.1, 534

(56) References Cited

U.S. PATENT DOCUMENTS 5,734,801 * 3/1998 Noguchi et al. ...................... 395/109
5,781,709 * 7/1998 Usami et al. ......................... 395/109
6,026,216 * 2/2000 Ohtsuka et al. ..................... 395/109

FOREIGN PATENT DOCUMENTS 8-192540   7/1996 (JP) .............................. B41J/2/525
9-115854   5/1997 (JP) .............................. H01L/21/268
9-270930  10/1997 (JP) .............................. H04N/1/60
10-23285   1/1998 (JP) .............................. H04N/1/60

* cited by examiner

Primary Examiner—Joseph Mancuso
Assistant Examiner—Douglas Tran
(74) Attorney, Agent, or Firm—Sughrue, Mion, Zinn, Macpeak & Seas, PLLC

(57) ABSTRACT

A method of predicting and processing image fine structures which, by simulating the interference-generated image fine structures with a continuous-tone printer or a display, enables the image fine structures to be predicted as faithfully as can be achieved by high quality machines without sacrificing the advantages of the continuous-tone printer or display (i.e., convenience in handling and the low costs of materials and machine), thus ensuring that moiré, line discontinuities, imperfections in straight lines and other image fine structures that will appear in a printed document can be predicted on a hard or soft proof in an accurate and convenient way within a short time, and which also ensures that the intensity of moiré and other peculiar patterns that occur can be freely adjusted in accordance with the type of the printing machine to be used. The pixel values of the original image separated into pixels for each of the CMY or CMYK plates are converted to pixel values for predicting image fine structures which will appear in a printed halftone image, characterized in that the values of the pixel to be converted and neighboring pixels are subjected to weighted averaging with adjustable weights dependent on the period of grid units that is determined by the screen ruling and screen angle for said printed halftone image.

10 Claims, 21 Drawing Sheets

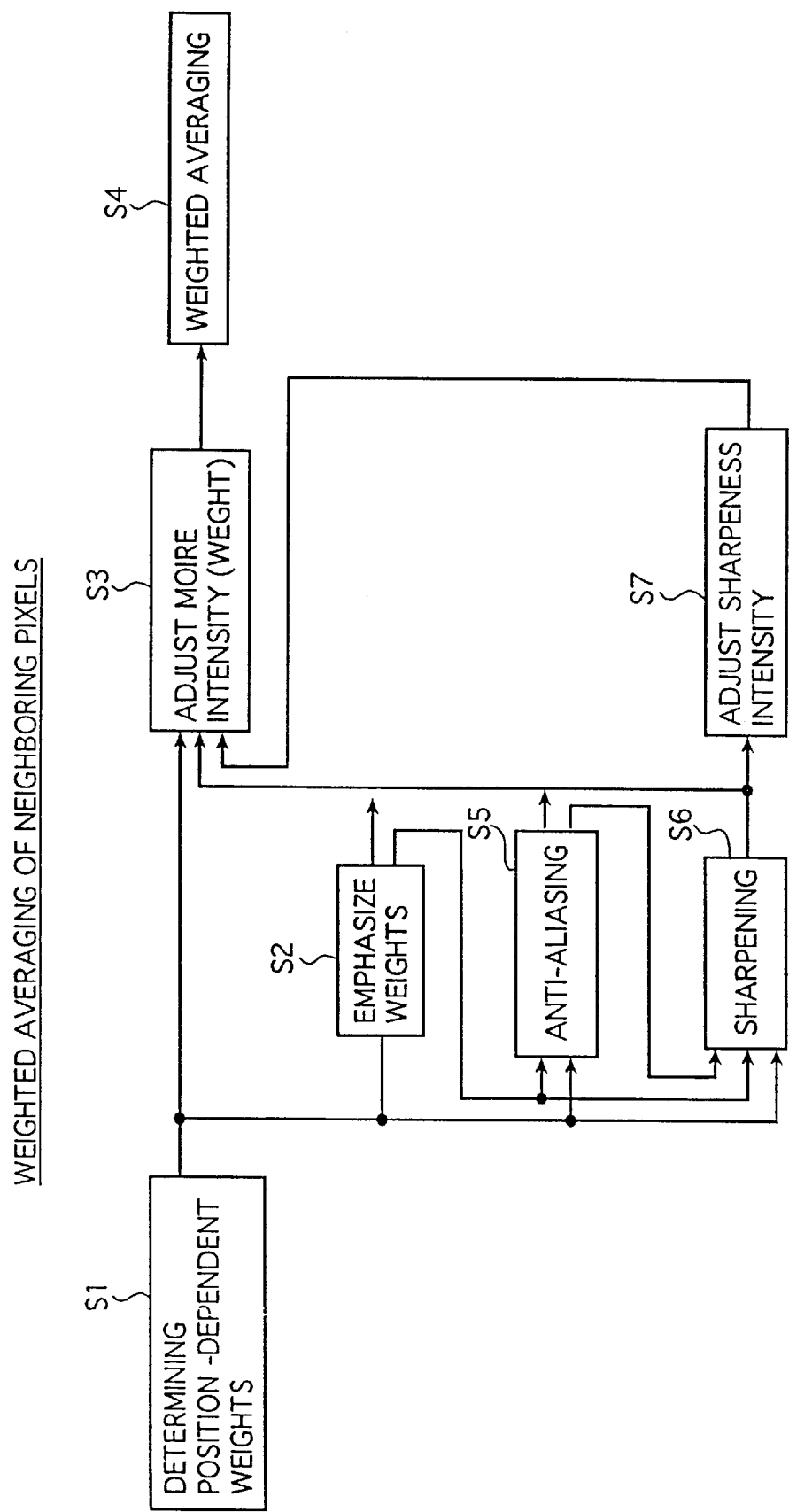

SPECIFIC CASE OF WEIGHTED AVERAGING

E  $e' = a \times 0.148 + b \times 0.105 + \cdots + e \times 0.138 + \cdots + i \times 0.055$
$= 0.9 \times (a \times 208 + b \times 148 + \cdots e \times 54 + \cdots + i \times 77)/1{,}268 + 0.1 \times e$

FIG.10

| | | | | | th1' | | | | | | | th1' | | | | TM1' | | | | |
|---|---|---|---|---|---|---|---|---|---|---|---|---|---|---|---|---|---|---|---|---|
| 255 | 240 | 192 | 124 | 61 | 23 | 17 | 14 | 16 | 78 | 108 | 121 | 112 | 85 | 50 | 4 | 0 | 0 | 0 | 0 |
| 240 | 220 | 177 | 112 | 55 | 37 | 30 | 41 | 78 | 126 | 168 | 184 | 172 | 138 | 88 | 9 | 2 | 0 | 0 | 0 |
| 192 | 177 | 138 | 83 | 44 | 30 | 37 | 49 | 107 | 168 | 217 | 237 | 223 | 179 | 119 | 58 | 8 | 3 | 2 | 2 |
| 124 | 114 | 85 | 18 | 16 | 18 | 24 | 56 | 119 | 184 | 237 | 255 | 240 | 194 | 132 | 65 | 23 | 16 | 13 | 14 |
| 62 | 56 | 8 | 4 | 3 | 4 | 8 | 51 | 110 | 172 | 220 | 240 | 226 | 182 | 123 | 59 | 37 | 30 | 40 | 71 |
| 22 | 7 | 2 | 0 | 0 | 0 | 2 | 8 | 83 | 136 | 179 | 197 | 184 | 144 | 94 | 46 | 37 | 37 | 46 | 97 |
| 17 | 3 | 0 | 0 | 0 | 0 | 0 | 3 | 17 | 85 | 117 | 130 | 121 | 92 | 55 | 17 | 19 | 24 | 62 | 110 |
| 14 | 2 | 0 | 0 | 0 | 0 | 0 | 2 | 14 | 44 | 58 | 66 | 62 | 10 | 5 | 3 | 4 | 9 | 49 | 105 |
| 16 | 3 | 0 | 0 | 0 | 1 | 0 | 3 | 16 | 26 | 33 | 24 | 10 | 2 | 0 | 0 | 0 | 1 | 7 | 81 |
| 75 | 6 | 1 | 0 | 2 | 6 | 1 | 6 | 22 | 32 | 27 | 18 | 4 | 0 | 0 | 0 | 0 | 0 | 3 | 15 |
| 106 | 17 | 6 | 2 | 14 | 6 | 6 | 17 | 51 | 47 | 36 | 15 | 3 | 0 | 0 | 0 | 0 | 0 | 2 | 11 |
| 117 | 57 | 20 | 14 | 42 | 76 | 128 | 102 | 112 | 102 | 75 | 17 | 7 | 1 | 0 | 0 | 2 | 5 | 2 | 13 |
| 110 | 52 | 37 | 30 | 52 | 106 | 168 | 163 | 177 | 163 | 126 | 76 | 52 | 6 | 2 | 10 | 12 | 15 | 5 | 19 |
| 83 | 43 | 31 | 37 | 61 | 123 | 187 | 215 | 231 | 215 | 170 | 108 | 60 | 20 | 12 | 40 | 71 | 66 | 94 | 48 |
| 49 | 17 | 19 | 28 | 57 | 117 | 179 | 237 | 255 | 237 | 189 | 123 | 57 | 37 | 30 | 48 | 102 | 119 | 167 | 105 |
| 4 | 3 | 5 | 10 | 9 | 89 | 144 | 228 | 246 | 226 | 182 | 115 | 45 | 37 | 37 | 55 | 119 | 161 | 209 | 172 |
| 0 | 0 | 0 | 2 | 4 | 55 | 94 | 184 | 199 | 184 | 144 | 89 | 19 | 21 | 28 | 52 | 114 | 182 | 231 | 226 |
| 0 | 0 | 0 | 0 | 2 | 15 | 47 | 126 | 138 | 124 | 95 | 56 | 4 | 5 | 10 | 9 | 91 | 177 | 226 | 255 |
| 0 | 0 | 0 | 0 | 3 | 17 | 26 | 64 | 71 | 62 | 10 | 5 | 0 | 0 | 2 | | | 142 | 187 | 246 |
| 0 | 0 | 0 | 0 | | | | 33 | 24 | 9 | 2 | 0 | | | | | | | | 204 | i' →
j' →

FIG. 13

| n (j') \ m (i') | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|
| -7 | 4 | 8 | 15 | 25 | 38 | 52 | 62 | 66 | 62 | 52 | 38 | 25 | 15 | 8 | 4 |
| -6 | 8 | 17 | 32 | 55 | 83 | 112 | 134 | 142 | 134 | 112 | 83 | 55 | 32 | 17 | 8 |
| -5 | 15 | 32 | 62 | 106 | 160 | 216 | 258 | 274 | 258 | 216 | 160 | 106 | 62 | 32 | 15 |
| -4 | 25 | 55 | 106 | 181 | 274 | 369 | 440 | 467 | 440 | 369 | 274 | 181 | 106 | 55 | 25 |
| -3 | 38 | 83 | 160 | 274 | 415 | 559 | 668 | 709 | 668 | 559 | 415 | 274 | 160 | 83 | 38 |
| -2 | 52 | 112 | 216 | 369 | 559 | 752 | 899 | 954 | 899 | 752 | 559 | 369 | 216 | 112 | 52 |
| -1 | 62 | 134 | 258 | 440 | 668 | 899 | 1074 | 1140 | 1074 | 899 | 668 | 440 | 258 | 134 | 62 |
| 0 | 66 | 142 | 274 | 467 | 709 | 954 | 1140 | 1210 | 1140 | 954 | 709 | 467 | 274 | 142 | 66 |
| 1 | 62 | 134 | 258 | 440 | 668 | 899 | 1074 | 1140 | 1074 | 899 | 668 | 440 | 258 | 134 | 62 |
| 2 | 52 | 112 | 216 | 369 | 559 | 752 | 899 | 954 | 899 | 752 | 559 | 369 | 216 | 112 | 52 |
| 3 | 38 | 83 | 160 | 274 | 415 | 559 | 668 | 709 | 668 | 559 | 415 | 274 | 160 | 83 | 38 |
| 4 | 25 | 55 | 106 | 181 | 274 | 369 | 440 | 467 | 440 | 369 | 274 | 181 | 106 | 55 | 25 |
| 5 | 15 | 32 | 62 | 106 | 160 | 216 | 258 | 274 | 258 | 216 | 160 | 106 | 62 | 32 | 15 |
| 6 | 8 | 17 | 32 | 55 | 83 | 112 | 134 | 142 | 134 | 112 | 83 | 55 | 32 | 17 | 8 |
| 7 | 4 | 8 | 15 | 25 | 38 | 52 | 62 | 66 | 62 | 52 | 38 | 25 | 15 | 8 | 4 |

Gauss2 (m,n)

FIG.14A

→ i,k,r — Shp1 j,l,s ↓

| 0.1814 | -0.7887 | 0.1814 |
|---|---|---|
| -0.7887 | 3.4293 | -0.7887 |
| 0.1814 | -0.7887 | 0.1814 |

FIG.14B

→ i,k,r — Shp2 j,l,s ↓

| 0.2934 | -1.12847 | 0.2934 |
|---|---|---|
| -1.12847 | 4.34028 | -1.12847 |
| 0.2934 | -1.12847 | 0.2934 |

FIG.14C

→ i,k,r — Shp3 j,l,s ↓

| 0.94204 | -2.85467 | 0.94204 |
|---|---|---|
| -2.85467 | 8.65052 | -2.85467 |
| 0.94204 | -2.85467 | 0.94204 |

FIG.19

| d11(dij) | | | | AF | | | | |
|---|---|---|---|---|---|---|---|---|
| 4 | 10 | 16 | 20 | 22 | 20 | 16 | 10 | 4 |
| 10 | 25 | 40 | 50 | 55 | 50 | 40 | 25 | 10 |
| 16 | 40 | 64 | 80 | 88 | 80 | 64 | 40 | 16 |
| 20 | 50 | 80 | 100 | 110 | 100 | 80 | 50 | 20 |
| 22 | 55 | 88 | 110 | 121 | 110 | 88 | 55 | 22 |
| 20 | 50 | 80 | 100 | 110 | 100 | 80 | 50 | 20 |
| 16 | 40 | 64 | 80 | 88 | 80 | 64 | 40 | 16 |
| 10 | 25 | 40 | 50 | 55 | 50 | 40 | 25 | 10 |
| 4 | 10 | 16 | 20 | 22 | 20 | 16 | 10 | 4 | d55

METHOD OF PREDICTING AND PROCESSING IMAGE FINE STRUCTURES

This is a divisional of application Ser. No. 09/018,337 filed Feb. 4, 1998, the disclosure of which is incorporated herein by reference.

BACKGROUND ART

This invention relates to a method of predicting and processing image fine structures. More particularly, the invention relates to a method of predicting and processing image fine structures which, when applied to a system for preparing color proofs with an image output device such as a color printer or a CRT display before a printed color document carrying halftone dot images (or simply "halftone images") is actually produced with a color printing machine using rotary presses or the like that have press plates mounted thereon, can ensure that image fine structures such as moiré and a rosette image which would occur in the actually produced printed document are represented in advance either as an image on the display such as CRT (the image is generally referred to as "soft proof") or as an image on a hard copy output from the color printer (which is generally referred to as "hard proof").

The process of producing printed documents carrying halftone images with a color printing machine using rotary presses or the like is not only time-consuming but also costly and, hence, it is common practice to produce proofs with a device other than the color printing machine which is commonly referred to as a proofer before the printed document is output as the actual product. The production of proofs with a proofer has two purposes, one for predicting the colors to be reproduced on the printed document (this may be called "simulation of color reproductions") and the other is for predicting the image fine structures to be produced on the printed document (which may be called "simulation of image fine structures").

Two types of proofers have heretofore been proposed for use in the production of proofs for printed documents, one being a proofer which involves dot formation and the other being a non-dot forming proofer. Proofing technology, or the techniques for predicting and processing image fine structures using proofers, is conventionally implemented by the following three methods. In the first method, a high-resolution digital printer is used as a dot-forming proofer and halftone images are actually produced. This technique has the advantage of correctly simulating the image fine structures which will appear on the printed document.

A dot-forming proofer is also used in the second method and halftone images (pictures) formed on printing lith films for four plates of C (cyan), M (magenta), Y (yellow) and K (black) are individually transferred to special chemical materials by exposure and the resulting four sheets of chemical materials for the C, M, Y and K plates which are commonly referred to as "transfer films" are placed one on another. An example of such proofers is one that employs the transfer films marketed by the Applicant. In this method, transfer films for the four plates of C (cyan), M (magenta), Y (yellow) and K (black) are prepared by dot formation using the actual screen ruling and transferred onto a print sheet at the actual screen angles to thereby produce a hard proof. This approach also has the advantage of correctly simulating the image fine structures which will appear on the printed document.

The third method uses a non-dot forming proofer which is exemplified by a system employing a continuous-tone color printer such as one which uses sublimable dye pigmented inks and which operates on a density modulation process to achieve a resolution of 300 dpi. This type of color printer represents the original image as a continuous-tone image without forming dots and, hence, has the advantage of producing proofs by simple procedures.

Of the two methods that use a dot forming proofer, the first approach which actually produces halftone dots with a high-resolution digital printer allows for halftone representation and is capable of correctly simulating the image fine structures which will appear on the printed documents. On the other hand, the high-resolution digital printer is an expensive device and requires high running cost; hence, the first method is not a convenient way to be performed in practice.

The second approach which superposes four transfer films for the plates of CMYK which are made of special chemical materials also allows for halftone representation and is capable of correctly simulating the image fine structures which will appear on the printed document. However, the apparatus used in the method is also costly. In addition, the cost of the print sheet is relatively high and the transfer films made of special chemical materials are also expensive. What is more, the process up to the stage of proof production is cumbersome (i.e., requires much labor due to manual operations) and, hence, a comparatively long time is taken to produce the desired proof; in other words, the second method is not necessarily an easy way to operate. In addition, it has been theoretically difficult to achieve color matching with the ultimate printed document.

In the third method which uses a non-dot forming proofer, the original image is represented as a continuous-tone image by means of a continuous-tone printer without producing dots. Therefore, this method is inexpensive, is convenient and can produce a proof within a short time. On the other hand, the method gives no consideration to representation by dots and is not capable of representing halftones; hence, the proof produced by the method can be used in simulating color reproduction but not in simulating image fine structures.

Under the circumstances, there has been a strong need for a technology that retains the advantage of low cost and convenience of the third method using a non-dot forming proofer and which yet is capable of representing dot-generated image fine structures as in the first and second methods which employ a dot-forming proofer.

Further referring to the third approach which uses a non-dot forming proofer, it has heretofore been customary to produce color proofs for examining and correcting colors and so forth before a printed color document carrying halftone images is ultimately produced by a color printing machine. The proofs are produced using a color printer that forms an image for each pixel by a density gradation process (also called "continuous gradation process") and this is primarily because the color printer is of a comparatively simple Composition and inexpensive. In addition, by means of the color printer, a hard copy having an image formed on a sheet can easily be produced a plurality of times within a short period of time since, as is well known in the art, the preparation of process-plate films and press plates which are required by color printing machines are not needed by the color printer.

FIG. 23 shows the flow of a conventional process for producing color proofs using a color printer. First, the image on an image document 52 is read two-dimensionally with an image reader such as a color scanner having a CCD linear image sensor or the like and gradation (continuous-tone) image data Ia for each of the colors R (red), G (green) and B (blue) are generated (step S51: image reading step).

Then, in step S52, the RGB gradation image data Ia are rendered by a color conversion process using conversion lookup tables or the like into dot area percentage data (also referred to as "dot percentage data" or "original image pixel dot percentage data") aj for the four plates of respective colors C (cyan), M (magenta), Y (yellow) and K (black), where j=0, 1, 2, 3 (0 represents the color C, 1 the color M, 2 the color Y, and 3 the color K). The color conversion process allows for various versions in relation to the color printing machine to be described later on and it is usually the proprietary know-how of individual printing companies who employ different color printing machines.

Halftone images are produced by the color printing machine and, hence, in order to produce a printed color document in the actual practice, the dot area percentage data aj produced by the color conversion process are rendered into bit map data, on the basis of which a process-plate film or the like is generated. A problem with the color printing machine is the need to use an automatic image developing machine, so the process following the generation of the process-plate film is considerably complicated.

To facilitate the production of color proofs, a color printer 53 (which may hereinafter be referred to as either "color digital printer" or "DP" as the case may be) is employed for the reasons set forth above. DP 53 forms an image on a donor film by a density gradation process in which the intensity and time of emission of three primary colors from an LED (light-emitting diode) or a laser are digitally controlled pixel for pixel and the image is transferred to an image-receiving sheet, whereby image formation is effected on the sheet. Compared to the color printing machine which generates presensitized plates from printing plates and which produces a printed color document using the presensitized plates, DP 53 is considerably inexpensive. In addition, it is smaller in volume and lighter in weight.

In order to employ DP 53, it is necessary that the halftone-dot area percentage data aj of the four CMYK plates produced in step S52 be converted into image data (also called "common color space data") which are independent of devices including a printing device, a CRT, a photographic device, an LED, etc. and which are exemplified by tristimulus value data X, Y, Z. To meet this need, the halftone-dot area percentage data aj of the four CMYK plates are converted into tristimulus value data X, Y, Z in an image data processing section (step S54). The image data processing is conventionally carried out using the Neugebauer's equation.

Prior to step S54, colorimetric data Xi, Yi, Zi (i represents $2^4$=16 colors for the four CMYK plates and ranges from 0 to 15) for the colors of printing inks are measured with a calorimeter (step S53). To measure the calorimetric data Xi, Yi, Zi, the 16 colors are printed on a print sheet which will be used to produce a printed color document with a color printing machine, thereby preparing "color patches". This process is commonly referred to as "solid printing". The 16 colors correspond to the presence and absence of the respective colors, C, M, Y, K ($2^4$=16).

Specifically, the 16 colors consist of color w (white) which represents the background color of the print sheet when nothing is printed on it, the primary colors C, M, Y, color K (black), and mixed colors C+M, C+Y, C+K, M+Y, M+K, Y+K, C+M+Y, C+M+K, C+Y+K, M+Y+K, and C+M+Y+K. These 16 colors are also called "16 basic colors". The colors of reflection from the colors printed on the print sheet are measured with a colorimeter such as a spectrometer to produce the calorimetric data Xi, Yi, Zi.

In the image data processing using the Neugebauer's equation, the colorimetric data Xi, Yi, Zi are multiplied by the area percentage data bi (i=0–15) as a coefficient [(see the following equations (6)] to produce the tristimulus value data X, Y, Z which have been subjected to image data processing (step S54):

$X=\Sigma_{i=0}^{15} bi \cdot Xi$ $Y=\Sigma_{i=015} bi \cdot Yi$ $Z=\Sigma_{i=0}^{15} bi \cdot Zi$ \hfill (6)

The area percentage data bi of the 16 basic colors which are included as a coefficient in equations (6) are determined from the halftone-dot area percentage data aj by performing probability calculations as follows:

$b0=(1-c)(1-m)(1-y)(1-k)$ $b1=c \cdot (1-m)(1-y)(1-k)$ $b2=(1-c) \cdot m \cdot (1-y)(1-k)$ $b3=c \cdot m \cdot (1-y)(1-k)$ $b4=(1-c)(1-m) \cdot y \cdot (1-k)$ $b5=c \cdot (1-m) \cdot y \cdot (1-k)$ $b6=(1-c) \cdot m \cdot y \cdot (1-k)$ $b7=c \cdot m \cdot y \cdot (1-k)$ $b8=(1-c)(1-m)(1-y) \cdot k$ $b9=c \cdot (1-m)(1-y) \cdot k$ $b10=(1-c) \cdot m \cdot (1-y) \cdot k$ $b11=c \cdot m \cdot (1-y) \cdot k$ $b12=(1-c)(1-m) \cdot y \cdot k$ $b13=c \cdot (1-m) \cdot y \cdot k$ $b14=(1-c) \cdot m \cdot y \cdot k$ $b15=c \cdot m \cdot y \cdot k$ \hfill (7)

To provide for easy understanding by intuition, the halftone-dot area percentage data aj (j=0–3) are set to a0=c, a1=m, a2=y and a3=k in the above equations (7) and c, m, y and k represent the halftone-dot area percentage data of the respective color plates C, M, Y and K. Take, for example, b3 which represents the area percentage of the mixed color C+M in the equations (7); this parameter can be determined by multiplying c (the probability that plate C exists), m (the probability that plate M exists), 1−y (the probability that plate Y does not exist), and 1−k (the probability that plate K does not exist). Therefore, the Neugebauer's equation expressed by the equations (7) can be understood as being based on the theory of probability.

The tristimulus value data X, Y, Z thus obtained by image data processing according to equations (6) are supplied to DP 53, in which they are converted into data for the three primaries with respect to the laser beam or the like on the basis of lookup tables (LUTs). Said data are so-called "device dependent image data", which are sometimes referred to as "inherent color space data". Thereafter, DP 53 generates a color proof CPa which is a hard copy having an image formed on a sheet (step S54).

When the tristimulus value data X, Y, Z for DP 53 are generated using the Neugebauer's equation as described above, the colors of the printed color document to be produced with a color printing machine can be reproduced faithfully in the image on the hard copy due to the use of the calorimetric data obtained by measurement with a calorimeter as representing the colors of the image to be formed on the printed color document. On the other hand, image fine structures which will appear on the printed color document, such as moiré, a rosette image and other peculiar patterns caused by interference fringes cannot be reproduced in the image on the hard copy.

If image fine structures are to appear on the printed color document, they should also be reproduced faithfully on the color proof CPa which is output from DP 53. In this respect, the conventional color proof CPa which fails to reproduce image fine structures is not an accurate (faithful) proof for the printed color document.

The reason for the failure of image fine structures to appear on the hard copy from DP 53 is conceivably because the Neugebauer's equation is based on the theory of probability as described above.

Under the circumstances, the present inventors made intensive studies in order to verify the hypothesis that if pixel data which compose input image data for use with a color printer are generated without relying upon the Neugebauer's equation, image fine structures such as moiré, a rosette image and so forth which are peculiar to the printed document to be produced can be reproduced on a color proof in an accurate and faithful manner. As a result, the inventors proposed in Unexamined Published Japanese Patent Application (kokai) No. Hei 8-192540 a technique which is capable of faithful reproduction of not only the colors of a printed image but also the image fine structures such as moiré and a rosette image which appear due to halftoning.

This technique enables the simulation of interference-generated image fine structures using a continuous-tone printer but at the same time it suffers from the problem of taking time in processing. The reason for the slow processing speed of this technique is the great number of mathematical operations to be performed on individual pixels, which in turn is caused by the need to simulate halftone dots by performing the same calculations for each pixel as are effected in the halftoning step in the printing process.

SUMMARY OF THE INVENTION

The present invention has been accomplished under these circumstances and its first principal object is to provide a method of predicting and processing image fine structures which, by simulating the interference-generated image fine structures with a continuous-tone printer or a display, enables the image fine structures to be predicted as faithfully as can be achieved by high quality machines without sacrificing the advantages of the continuous-tone printer or display (i.e., convenience in handling and the low costs of materials and machine), thus ensuring that moiré, line discontinuities, imperfections in straight lines and other image fine structures that will appear in a printed document can be predicted on a hard or soft proof in an accurate and convenient way within a short time, and which also ensures that the intensity of moiré and other peculiar patterns that occur when simulating the image fine structures in a printed document can be freely adjusted in accordance with the type of the printing machine which is to be employed to produce the printed document.

Another object of the invention which is associated with the above-stated first primary object is to provide a method of predicting and processing image fine structures which is capable of predicting interference-generated image fine structures on a hard or soft proof in an accurate and convenient way without impairing the sharpness of a printed document or by ensuring that the intensity of sharpness as achieved when simulating the image fine structures in the printed document can be freely adjusted in accordance with the type of the printing machine which is to be employed to produce the printed document.

Yet another object of the invention which is associated with the stated two objects is to provide a method of predicting and processing image fine structures which can also achieve faithful reproduction of the colors of a printed document simultaneously with the prediction of image fine structures.

The term "line discontinuities" as used herein means such an image fine structure that a tall object which will be approximately represented by one pixel on a printed document, for example, a vertical flagpole located at a far distance appears to be discontinued periodically.

The term "imperfections in straight lines" means such an image fine structure that a long object which will be approximately represented by one pixel on a printed document, for example, a horizontal handrail on the roof of a far distant building appears to be non-straight periodically.

The second principal object of the invention is to provide a method of predicting and processing image fine structures which uses a color printer or a like image output device that is comparatively low in cost and resolution to ensure that moiré, a rosette image and other image fine structures that will appear on a printed color document of high resolution due to halftone dots can be predicted and reproduced as faithfully as can be achieved by high quality machines without sacrificing the advantages of the image output device (i.e., convenience in handling and the low cost of materials and machine) and which is capable of rapid simulation (prediction and processing) of the image fine structures.

Another object of the invention which is associated with the above-stated second primary object is to provide a method of predicting and processing image fine structures which can also achieve faithful reproduction of the colors of a printed document simultaneously with the simulation of interference-caused image fine structures.

Yet another object of the invention which is associated with the stated two objects is to provide a method of predicting and processing image fine structures which is capable of increasing the precision in simulation of the colors of a printed document and/or adjusting the degree of contrast of the simulated moiré, rosette image or other image fine structures in accordance with the printing machine to be eventually used and the appearance of the printed document to be produced.

In order to achieve the above-said first principal object of the present invention, there is provided a method of predicting and processing image fine structures, in which the pixel values of the original image separated into pixels for each of the CMY or CMYK plates are converted to pixel values for predicting image fine structures which will appear in a printed halftone image, characterized in that the values of the pixel to be converted and neighboring pixels are subjected to weighted averaging with adjustable weights dependent on the period of grid units that is determined by the screen ruling and screen angle for said printed halftone image In order to achieve the above-said second principal object of the present invention, there is provided a method of predicting and processing image fine structures, in which the original image is converted to dot area percentage data for n plates including at least three primary colors and, for ensuring that a color proof for a color printed document which is to be produced with a color printing machine is output from an image output device using said dot area percentage data, the latter are converted to gradation image data for predicting the image fine structures on said color printed document, characterized in that 0–100% dot area percentage data for each of the n plates are preliminarily divided into N stages and said gradation image data for predicting said image fine structures are determined for each of the monochromatic images for a total of $N^n$ colors, thereby constructing a lookup table that has the repeating pixel size necessary for predicting said image fine structures and which has a position parameter and n color parameters as arguments, the dot area percentage data for the n plates associated with said original image being converted to said gradation image data by referencing said lookup table.

BRIEF DESCRIPTION OF THE DRAWINGS

FIG. 2 is a diagram illustrating an example of the basic flow of the invention method of predicting and processing image fine structures;

FIG. 10 is a diagram showing a threshold matrix of 2000 dpi which is generated by emphasizing the threshold values of the threshold matrix shown in FIG. 7;

FIG. 13 is a diagram showing the composition of a 15×15 Gaussian filter which is also to be used in the invention method of predicting and processing image fine structures;

FIG. 14A is a diagram showing an exemplary composition of a sharpness filter which is a reverse filter having opposite characteristics to those of the Gaussian filter used in the invention method of predicting and processing image fine structures;

FIG. 14B is a diagram showing an exemplary composition of a sharpness filter having stronger characteristics than the sharpness filter of FIG. 14A;

FIG. 14C is a diagram showing an exemplary composition of a sharpness filter having stronger characteristics than the sharpness filter of FIG. 14B;

FIG. 19 is a diagram showing an exemplary composition of an anti-aliasing filter which is to be used in the process of generating a six-dimensional lookup table as shown in FIG. 18;

DETAILED DESCRIPTION OF THE PREFERRED EMBODIMENTS

The method of the invention for predicting and processing image fine structures is hereunder described in detail with reference to the preferred embodiments shown in FIGS. 1–22 of the accompanying drawings. To begin with, the method according to the first embodiment of the invention will be described with reference to FIGS. 1–15.

Figure 1:
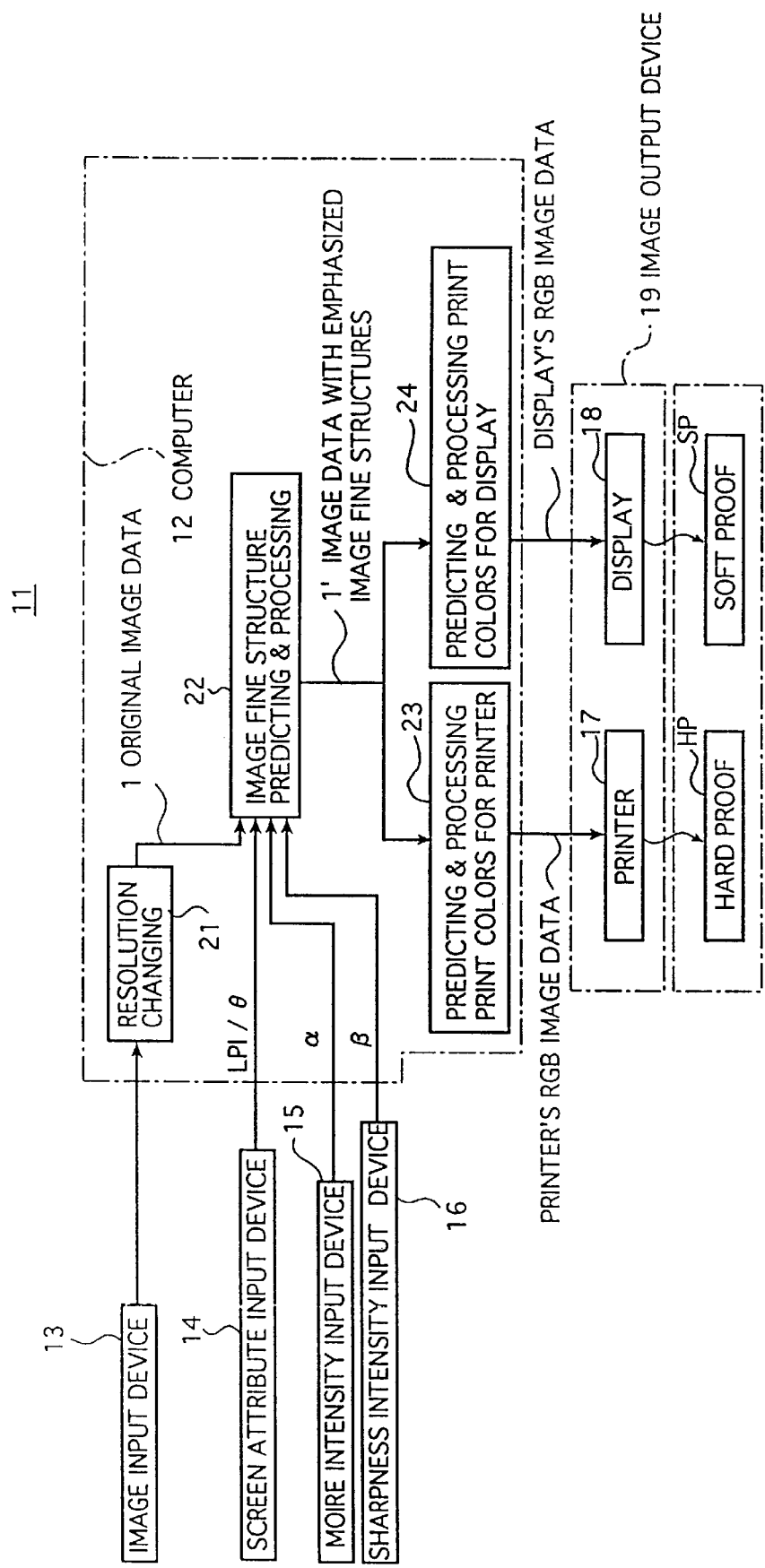
FIG. 1 is a block diagram showing an exemplary configuration of an image fine structure predicting system which incorporates the first embodiment of the invention method of predicting and processing image fine structures.

FIG. 1 shows the general layout of a system for predicting and processing image fine structures by implementing the first embodiment of the invention method of predicting and processing image fine structures. The system generally indicated by 11 in FIG. 1 has a computer 12 as an engine for performing the prediction and processing of image fine structures. An image input device 13, a screen attribute input device 14, a moiré intensity input device 15 and a sharpness intensity input device 16 are connected to the input side of the computer 12 whereas an image output device 19 having a printer 17 and/or a display 18 is connected to the output side of the computer 12.

The computer 12 may be of any type that is capable of executing software for the prediction and processing of image fine structures and common personal computers or workstations can be employed that permit the installation and execution of software other than that dedicated to the prediction and processing of image fine structures.

The image input device 13 is typically a printing scanner (image reading means) or an external storage device which is a component of the above-mentioned workstation or the like. The image input device 13 outputs imagewise separated data for the original image (i.e., for the CMYK plates), which is passed through a resolution converting block 21 in the computer 12 and the resulting original image data I (for the CMYK plates, consisting of the original image data C for C plate, original image data M for M plate, original image data Y for Y plate, and original image data K for K plate) are supplied into an image fine structure predicting and processing block (or means) 22.

The resolution converting block 21, image fine structure predicting and processing block 22 and other components of the computer 12 which are labelled with "block" and shown in FIG. 1 are generally intended to perform processing with software.

The original image data delivered from the image input device 13 are gradation image data represented in CMYK colors and provide images of various resolutions that may be represented by an image format (e.g. TIFF) capable of storing attributes such as the number of bits in which the data are expressed, the image size and the image resolution. Such original image data of various resolutions are converted by the block 21 into data having the resolution to be achieved by printer 17, namely, the output resolution which is typically 400 dpi, and the resulting original image data I of a multilevel gradation, say, 8-bit gradation are supplied into the block 22. The resolution conversion to be performed in the block 21 is typically executed by a well-known area interpolating process and, hence, there will be no occurrence of image fine structures or color changes.

The screen attribute input device 14 is composed of a keyboard, a mouse and so forth and used to supply the image fine structure predicting and processing block 22 with the screen ruling LPI (lines per inch) and the screen angle θ for a printed document of which the image fine structures are to be predicted on a proof (which is not the proof to be produced with a printing machine but, as will be discussed below in detail, an image which is to be examined and corrected on a continuous-tone printer or a display by a density gradation process). In the embodiment under discussion, the screen ruling LPI is set at 175 and the screen angle at 75°, 45°, 0° and 15° for the four plates C, M, Y and K, respectively. Needless to say, any desired values can be selected for the screen ruling LPI and the screen angle θ.

The moiré intensity input device 15 is also composed of a keyboard, a mouse and so forth and provides a means of inputting the intensity of moiré in simulation of image fine structures. When simulating moiré, line discontinuities, imperfections in straight lines and other image fine structures on a proof, the moiré intensity input device 15 supplies the image fine structure predicting and processing block 22 with the ratio at which the amplitude of image fine structures (which are hereinafter typified by moiré) to be simulated on a proof is adjusted in accordance with the type of the printing machine to be actually employed in producing a printed document. The ratio of this adjustment, also referred to as "coefficient of emphasis $\alpha$" of moiré intensity, is relied upon in the image fine structure predicting and processing block 22 to adjust the weight which is dependent on the period of the grid pattern that is determined by the screen ruling LPI and the screen angle θ for a printed document. For further details of the coefficient of emphasis $\alpha$, see below.

The intensity of moiré varies with the specifications of the printing machine to be used even if the original image and the printing conditions (screen ruling, screen angle and print density) are the same. The difference or the variation defines general prediction since it originates not only from mechanical factors such as the printing pressure applied by the printing machine but also from other factors associated with software (e.g. halftoning algorithms) and/or hardware.

In order to accommodate this difference, the method of the invention provides a means of adjusting the intensity Of moiré on the simulated image in accordance with the intensity of moiré which is variable with the printing machine to be used in producing a printed document. Briefly, depending upon whether the printing machine is prone to produce moiré, the means of inputting the intensity of moiré during simulation is used to adjust the intensity of moiré on the proof.

The sharpness intensity input device 16 is also composed of a keyboard, a mouse and so forth and provides a means of inputting the intensity of sharpness during simulation of image fine structures. When simulating moiré, line discontinuities, imperfections in straight lines and other image fine structures on a proof, the sharpness intensity input device 18 supplies the image fine structure predicting and processing block 22 with the ratio $\beta$ at which the sharpness of the image being simulated on a proof is emphasized in accordance with the type of the printing machine to be actually employed in producing a printed document. The ratio of sharpness emphasis $\beta$ is relied upon in the image fine structure predicting and processing block 22 to adjust the intensity of a sharpness filter which is to be applied to the weight which is dependent on the period of the grid pattern that is determined by the screen ruling LPI and the screen angle for a printed document. For further details of the ratio $\beta$, see below.

The intensity of sharpness varies with the specifications of the printing machine to be used even if the original image and the printing conditions (screen ruling, screen angle and print density) are the same. The difference or the variation defines general prediction since it originates not only from mechanical factors such as the printing pressure applied by the printing machine but also from other factors associated with software (e.g. halftoning algorithms) and/or hardware.

In order to accommodate this difference, the method of the invention provides a means of adjusting the intensity of sharpness of the simulated image in accordance with the intensity of sharpness which is variable with the printing machine to be used in producing a printed document. Briefly, depending upon the ease with which the printing machine produces sharpness, the means of inputting the intensity of sharpness during simulation is used to adjust the intensity of sharpness of the proof.

As will be described more specifically on the pages that follow, the process to be performed by the image fine structure predicting and processing block 22 is basically such that the pixel values of the individual images that compose the original image data I are converted to those which have been subjected to weighted averaging by weights which are dependent on the period of the grid pattern as determined by the screen ruling LPI and the screen angle θ for a printed document. In the method of the invention, in order to ensure that the intensity of moiré (and other image fine structures that appear in a simulated image) is freely adjusted in accordance with the type of the printing machine to be used to produce the printed document, weights which are dependent on the period of the grid pattern is adjusted in accordance with the coefficient of emphasis α of moiré intensity and, preferably, sharpening is applied to the adjusted weights, with the intensity of the sharpening process being optionally adjusted by the ratio of sharpness emphasis β in accordance with the type of the printing machine to be used to produce the printed document. The eventually obtained image data which are composed of weighted averaged pixel values are supplied into a print color predicting and processing block 23 and/or a display color predicting and processing block 24 as image data I' which are emphasized in image fine structure and which have the moiré intensity and, optionally, the sharpness intensity adjusted in accordance with the type of the printing machine to be used to produce the printed document (I' being the Image data for the CMYK plates and consisting of image data C' for plate C, image data M' for plate M, image data Y' for plate Y and image data K' for plate K).

The print color predicting and processing block 23 and the display color predicting and processing block 24 are not the essential part of the invention and need not be described in detail. It suffices here to say that in the block 23, the image fine structure emphasizing image data I' for CMYK are first converted to device independent data which are independent of devices (i.e., printing device, CRT, photographic device and LED), for example, tristimulus value data XYZ, which in turn are converted to printer's red-green-blue image data RGB (device dependent data) based on the calorimetric values of sample colors and then supplied into the printer 17. Similarly, in the block 24, the image fine structure emphasizing image data I' for CMYK are first converted to device independent image data such as tristimulus value data XYZ, which in turn are converted to display's image data RGB which take into account color temperatures, viewing light source and other conditions and then supplied into the display 18.

The printer 17 in the image output device 19 is not limited to any particular type of printers as long as it is a continuous-tone color printer capable of producing a hard proof HP which has a continuous-gradation image formed on a sheet. A preferred example is a so-called hard proof (HP) producing device which forms an image on a donor film by a density gradation process in which the intensity and time of emission of three primary colors from an LED (light-emitting diode) or a laser are digitally controlled pixel for pixel and the image is transferred to an image-receiving sheet, whereby image formation is effected on the sheet. The continuous-tone printer 17 having this functional feature is considerably less expensive than ordinary color printing machines which effect printing using PS plates prepared from press plates. The printer 17 typically has a resolution of 200–400 dpi, which is considerably lower than the printing resolution, say, 2000 dpi but it is this low resolution that enables the representation of moiré and other image fine structures that will appear in printed documents. In order to ensure that moiré and other image fine structures can be freely represented on a hard proof HP, their intensity adjusted freely and the intensity of the sharpness of the formed image also adjusted freely, the printer 17 preferably has a resolution of about 400 dpi.

The display 18 which is the other component of the image output device 19 may be a color CRT monitor, a color LCD (liquid-crystal display) monitor, a color plasma display or the like. While a display allowing for adjustment of color temperature, white balance, gamma characteristic and so forth is preferred, any devices that represent a so-called soft proof SP may be employed without particular limitation. If the purpose is only for checking image fine structures, ordinary inexpensive color CRT monitors and the like may be employed although they are not capable of adjustment of the various characteristics mentioned above.

We next describe the operating theory of the image fine structure predicting and processing block 22. In order to ensure that the pixel values of the original image data I which have been separated into the pixels of the CMY plates or CMYK plates are converted to pixel values for predicting moiré and other image fine structures that will appear in a printed image in a manner dependent upon the combinations of screen ruling, screen angle and the contents (text, line and pictures) of the original image, the prediction and processing of image fine structures involves determining the weights which are dependent on the period of the grid pattern determined by the screen ruling LPI and the screen angle θ for the values of the pixels whose values are to be converted (these pixels are hereinafter sometimes referred to as "pixels under calculation") and nearby pixels, adjusting the thus determined weights by the coefficient of emphasis α of moiré intensity so as to produce moiré (and other image fine structures) having an intensity of occurrence that complies with the type of the printing machine to output a printed document, and effecting weighted averaging of the pixel values with the adjusted weights, thereby converting them to the desired values.

Two basic flows of the process of weighted averaging of the pixels under calculation and nearby pixels in the present invention are shown in FIG. 2; the first flow consists of three steps, i.e., determining position dependent weights in accordance with the screen ruling LPI and screen angle θ which are entered by the screen attribute input device 14 (step S1), adjusting the position-dependent weights in accordance with the coefficient of emphasis of moiré intensity α which is entered by the moiré intensity input device 15 (step S3), and determining the values of the respective pixels by performing weighted averaging of the values of the pixels under calculation and nearby pixels in accordance with the adjusted weights; and the second flow consists of four steps, i.e., determining position dependent weights in accordance with the screen ruling LPI and screen angle θ (step S1), emphasizing the weights (step S2), adjusting the emphasized weights in accordance with the coefficient of emphasis of moiré intensity a (step S3), and determining the values of the respective pixels by performing weighted averaging of the values of the pixels under calculation and nearby pixels in accordance with the adjusted weights (step S4).

Determination of position dependent weights in step S1 may be accomplished by generating them using a certain function but this is a time-consuming approach and may be replaced by a method based on reference to a lookup table.

Step 3 is a characterizing part of the invention and in order to adjust the position dependent weights determined in step S1, both the determined weights and a function which takes the value "1" at the position of any pixel whose value is to be converted and which takes the value "0" in other positions are interpolated or extrapolated using the coefficient of emphasis of moiré intensity α. Needless to say, other methods may be adopted to adjust the ratio of moiré emphasis.

The weighted averaging to be performed in step S4 may be accelerated by a so-called "stockastic multiplication/addition process" which employs a convolution integrated weighting matrix (hereinafter also referred to as a "weighting filter") having a certain mask size (the process may hereinafter be referred to as "a filtering process"). When weighted averaging is to be performed by filtering with a weighting matrix, the matrix is preferably adjusted for the weights.

When designing a weighting matrix, anti-aliasing as indicated by step S5 in FIG. 2 may be performed using a decreasing filter (also referred to as "attenuating filter") in which the position dependent weight for pixels neighboring the pixel under calculation decreases with the increasing distance from the pixel under calculation in order to provide a smooth (natural) continuity for the image (picture) formed of the filtered pixels.

In order to ensure that the image on a proof HP or SP has the same degree of sharpness as the image to be formed on a printed document, sharpening may be effected as indicated by step S6 in FIG. 2 such that a sharpness filter (hereinafter referred to as "emphasizing filter") is allowed to act on the weighting filter processed by the decreasing filter and the resulting weighting matrix filter is used as a matrix filter in the weighted averaging step. Dots to be formed on a sheet by means of the printer 17 are usually such that the recording dots produced by means of a laser beam or the like assume a Gaussian or like shape and thereby produce an image with blurred edges; to deal with this problem, the sharpening process of step S6 is effective.

Step 7 is another characterizing portion of the invention and comprises adjustment of the intensity of sharpness. Briefly, in order to adjust the ratio of emphasis by the sharpness filter to be applied to the weighting filter after processing by the decreasing filter, both the sharpness filter and a filter which takes the value "1" at its center position and which takes the value "0" in the other positions are divided either internally or externally using the ratio of sharpness emphasis β. Needless to say, other methods may be adopted to adjust the ratio of sharpness emphasis.

In the example shown in FIG. 2, step S3 of weight adjustment is followed by step S4, in which weighted averaging is performed in accordance with the adjusted weights, thereby determining weighted-averaged pixel values. This is not the sole case of the invention and in an alternative case, the position dependent weights determined in step S1 or S2 are directly used in step S4 to determine weighted-averaged pixel values which, together with the pixel values of the original image, are interpolated or extrapolated using the coefficient of emphasis of moiré intensity α, whereby the average pixel values weighted by the adjusted weights are determined to eventually create a result which is equivalent to the weight adjustment to be performed in step S3.

The operating theory of the image fine structure predicting and processing block 22 is described below in greater details.

As already mentioned, weighted averaging is performed on the original image data for the CMYK plates which compose the original image data I. Take, for example, C plate. If the pixel data (pixel value) at coordinates (i,j) on the output resolution (proof resolution) are written as C(i,j) and the pixel data (pixel value) at coordinates (i,j) resulting from the weighted averaging of the pixels under calculation and nearby pixels are written as Ca(i,j), the pixel values Ca(i,j) after processing (conversion) can be expressed by the following equation (8):

$$Ca(i, j) = \sum_{k=-m}^{m} \sum_{l=-n}^{n} \{Weight(i, j, k, l, LPIc, \theta c) \times C(i+k, j+l)\} \quad (8)$$

The calculation for weighted averaging $$\left( \sum_{k=-m}^{m} \sum_{l=-n}^{n} \right)$$

of nearby pixels is performed on pixels C(i+k, j+l) in a rectangular range which surrounds the original image C(i,j) by a size of (2m+1)×(2n+1). Stated more specifically, k ranges from −m to m and l from −n to n in C(i+k, j+l), where 2m+1 and 2n+1 are natural numbers and represent the width and height (which may collectively be referred to as "size") of nearby pixels centered at the position (i,j) which represent the coordinates of the pixel under calculation.

The equation (8) is intended for weighted averaging, so it is normalized such that the total sum of the individual values of the weight (also called "weight function") Weight(i,j,k,l,LPIc,θc) is at unity (1.0); the process of normalization is hereinafter sometimes referred to as "standardization". Although equation (8) concerns C plate, similar equations can be written for the other plates M, Y and K by replacing the pixel value C(i,j) of the original image with M(i,j), Y(i,j) and K(i,j), respectively, and by replacing the pixel value Ca(i,j) of the processed image with Ma(i,j), Ya(i,j) and Ka(i,j), respectively. The coordinates (i,j) are on a Cartesian two-dimensional xy image space. The screen ruling for C plate LPIc may be replaced by LPIm, LPIY and LPIk for plates M, Y and K, respectively, and the screen angle θc for C plate may be replaced by θm, θy and θk for plates M, Y and K, respectively.

In equation (8), the weight function Weight(i,j,k,l,LPIc,θc) is intended for causing so-called "frequency interference" by enhancing the weight of the value of a pixel which is among the pixels that compose the original image and which is located at a position corresponding to a specified point on a grid having a certain periodic pitch (which is dependent on the screen ruling LPIc) and a certain inclination (which is equivalent to the screen angle θc).

In the case under discussion of the present invention, in order to ensure that the intensity of moiré (and other image fine structures) being simulated is adjusted in accordance with the type of the printing machine to be used to produce a printed document, the weight function Weight(i,j,k,l,LPIc, θc) to be used in step S4 (weighted averaging) is one that is newly adjusted in intensity in step S3 by the coefficient of emphasis of moiré intensity α which has been entered by moiré intensity input device 15. However, the position dependent weight function determined in step S1 and that determined in step S2 are both inherently a weight function, so needless to say, these weight functions may directly be used in step S4 to achieve equally good results in the prediction of moiré and other image fine structures.

We now describe the method by which the intensity of moiré (and other image fine structures) being simulated is adjusted in accordance with one characterizing feature of the invention.

In the case of printing, if the screen ruling LPI and the screen angle θ are determined, the LPIc and θc for the C plate may be regarded as constants and, hence, the weight function Weight(i,j,k,l,LPIc,θc) can be written as Weight(i, j,k,l) for each of the CMYK plates. Therefore, in the following description, the weight function with an adjusted moiré intensity as determined in step S3 is represented by a moiré intensity adjusted filter F'(i,j,k,l) for each of the CMYK plates and the position dependent weight function as determined in step S1 or S2 is represented by a position dependent filter F(i,j,k,l) for each of the CMYK plates.

In the case under consideration of the present invention, the newly intensity adjusted filter F'(i,j,k,l) can be expressed by the following equation (1):

$$F'(i,j,k,l)=\alpha\{-E(k,l)+F(i,j,k,l)\}+E(k,l) \tag{1}$$

where E(k,l) is a coefficient matrix which has a coefficient of 1.0 at the center and a coefficient of 0.0 in the other positions;

E is not dependent on the position of the coordinates (i,j) of a given pixel.

In equation (1), α is the coefficient of emphasis of moiré intensity; if α=1, the moiré intensity is just the same as what it was before emphasis and is equal to F(i,j,k,l) and if α=0, the moiré intensity is zero, which means no moiré simulation is being effected and the original image is just what you get.

In equation (1), i and j represent the coordinates of the position of a given pixel in the image; if the size (in pixels) of a rectangular image is designated by width×height, i ranges from 0 to (height−1) and j ranges from 0 to (width−1).

In equation (1), k and t are auxiliary variables for the convolution integral.

Using the thus determined moiré intensity adjusted filter F'(i,j,k,l), convolution integral is performed in step S4. If the intensity adjusted filter F'1361(i,j,k,l) is regarded as a position dependent (2m+1)×(2m+1) filter, convolution integral is carried out in accordance with the following equation (9):

$$D'(i, j) = \sum_{k=-m}^{m} \sum_{l=-m}^{n} \{F'(i, j, k, l) \times D(i+k, j+l)\} \tag{9}$$

where D(i,j) is a pixel value for either one of the CMYK plates prepared from the original images and D'(i,j) is a pixel value for the same plate after processing; −m≦k≦m and −m≦l≦m.

In the present invention, the pixel value D'(i,j) is determined by weighted averaging with the intensity adjusted filter F'(i,j,k,l). Alternatively, D'(i,j) may be determined in the following way. If the pixel value determined by weighted averaging with the position dependent filter F(i,j,k,l) is written as Da(i,j), it is given by the following equation (10):

$$Da(i, j) = \sum_{k=-m}^{m} \sum_{l=-m}^{m} \{F(i, j, k, l) \times D(i, +k, j+l)\} \tag{10}$$

By substituting equation (1) into equation (9) and also substituting equation (10) into the resulting equation, the converted pixel value D'(i,j) is given by the following equation (11):

$$D'(i,j)=\alpha Da(i,j)+(1-\alpha)D(i,j) \tag{11}$$

This is how weighted averaging with moiré intensity adjusted weights is performed in the image fine structure predicting and processing block 22.

Figure 3A:
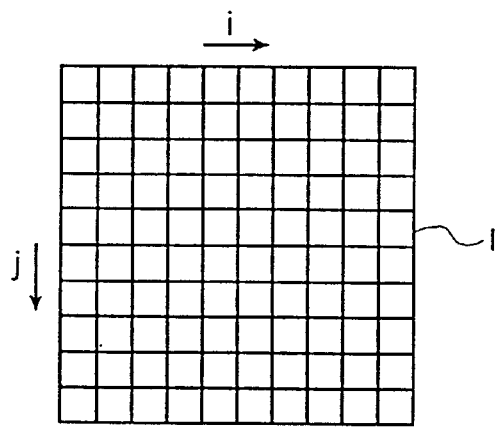
FIG. 3A is a schematic representation of an original image consisting of pixels divided to 400 dpi, to which reference may be had in explaining the operating theory of the invention method of predicting and processing image fine structures.
Figure 3B:
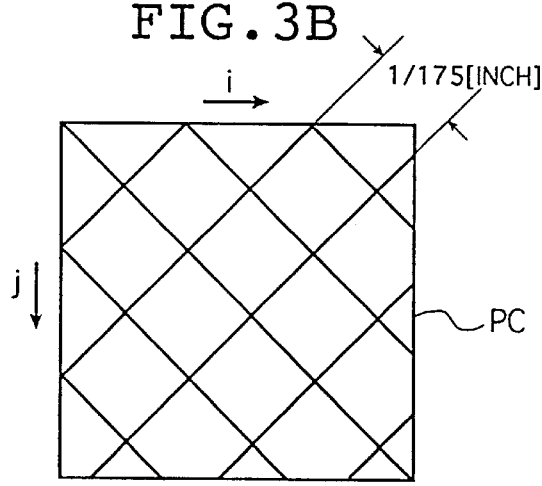
FIG. 3B is a schematic representation of a screen grid having a screen ruling of 175 and a screen angle of 45 degrees.

The operating theory of the weighted averaging to be performed by the image fine structure predicting and processing block 22 is now illustrated visudlly by means of diagrams. The operating theory of the weighted averaging process to be described below will hold irrespective of whether moiré intensity adjustment is performed or not. Suppose here that FIG. 3A represents conceptually the original image I as separated into pixels of 400 dpi. Also suppose that FIG. 3B represents a coordinate system (hereinafter also referred to as "screen grid coordinate system") PC having a screen ruling of 175 and a screen angle of 45 degrees in accordance with the printed document for which a proof is to be prepared. When the grid shown in FIG. 3B with respect to the coordinate system PC having the screen ruling of 175 and the screen angle of 45 degrees is placed on the concept of the original image I shown in FIG. 3A, a superposed image SI will result as shown in FIG. 3C.

Figure 3C:
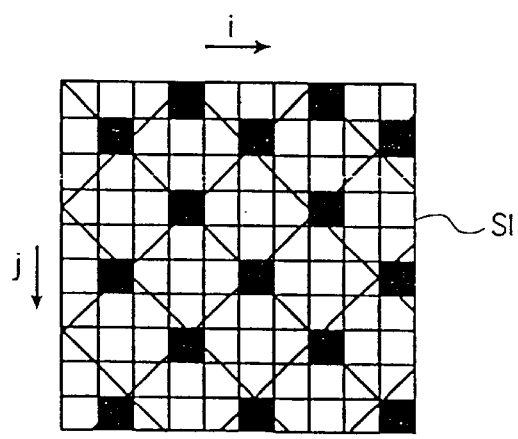
FIG. 3C is a schematic representation of the screen grid of FIG. 3B placed on the original image of FIG. 3A.

Those areas of the superposed image SI shown in FIG. 3C which are painted in black correspond to the pixels bridging the grind points in the coordinate system PC having the screen ruling of 175 and the screen angle of 45 degrees. By increasing the weights of the values of these pixels painted in black (in fact, in order to achieve weighted averaging, the weights of the values of the surrounding pixels shown as clear spots are reduced simultaneously), the weights of the values of pixels located in positions corresponding to specified points on the above-described grid can be increased.

For better understanding by intuition, let assume the case of extreme weighting such as where only two values of 1 and 0 are taken. This case may be interpreted as being based on simple mathematical operations for image reduction by leaving only the black pixels intact while discarding the clear spots. In other words, it may be held that moiré can be generated by the same principle as that for moiré generation by sampling which occurs when mathematical operations for image reduction are performed on an image of interest. In FIG. 3B, the reciprocal of the screen ruling, or $\frac{1}{175}$ (in inches), may be referred to as the pitch of the screen. Therefore, each of the square units in the screen has a size of $\frac{1}{175} \times \frac{1}{175}$ (in$^2$).

Returning to FIG. 2, the position dependent weights for weighting are calculated (determined) in step S1 and there are two basic methods for achieving this. In the first method, a threshold matrix for each of the CMYK plates for use in the halftoning step in the printing process (being also called "a threshold template" or "a rational number screen template", the matrix is commonly named "a supercell") is directly used (i.e., as a lookup table) for weight calculation.

Figure 4A:
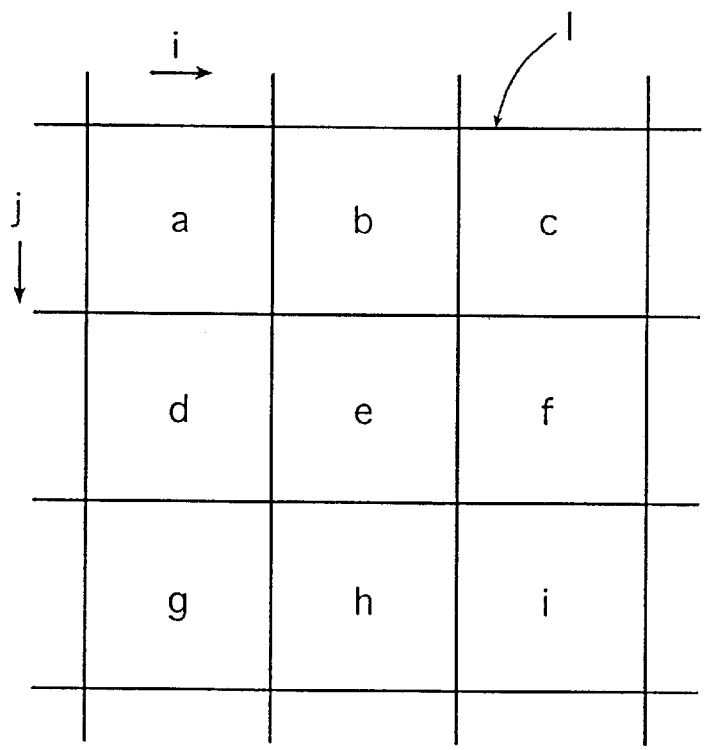
FIG. 4A is a schematic representation of an original image which may be subjected to the step of weighted averaging in the invention method of predicting and processing image fine structures.

FIG. 4A shows a portion (e.g. 9 pixels) of either one of the CMYK plates representing the original image I which is shown conceptually in FIG. 3A. The values of the respective pixels are represented by a, b, . . . i. The coordinate system is expressed generally by (i,j) and the pixel values a, b, . . .

i [in which i is different from i in the coordinate system (i,j)] may typically take any one of the values 0–255 which represent an 8-bit gradation.

Figure 4B:
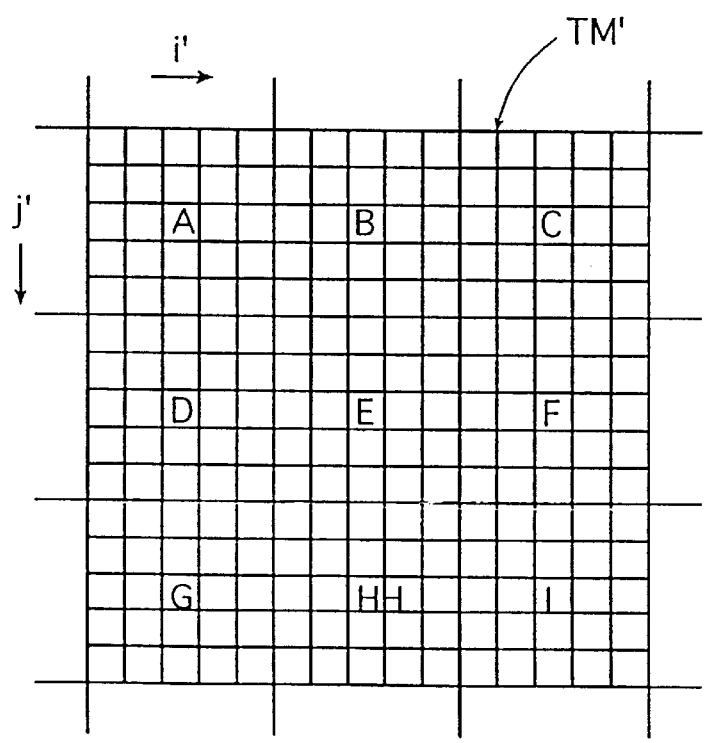
FIG. 4B is a schematic representation to which reference may be had in explaining the generation of a 3×3 weighting matrix from a rational number screen template of high resolution.

Suppose that FIG. 4B shows a portion of a halftoning threshold matrix TM' which is to be used in producing a printed document of 2000 dpi. One pixel of 400 dpi corresponds to 5×5=25 pixels of 2000 dpi (or 25 elements of a threshold matrix TM'). Also suppose that the partial threshold matrices each consisting of 5×5 elements have threshold values of A, B, . . . I for the central element as shown in FIG. 4B. Each of the threshold values A, B, . . . I may typically be one of the values of 0–255 which compose an 8-bit gradation. It should also be noted that if the threshold matrix TM has a size equivalent to 215×215 elements (representing 46225 threshold values), it corresponds to a size of 43×43 pixels in the original image I. The coordinate system on the space of 2000 dpi may be expressed as (i',j').

Referring back to FIG. 4A, suppose that the value of the pixel at the center of the original image I which is designated by e is subjected to weighted averaging using a position dependent weighting matrix which is yet to be adjusted in the ratio of emphasis of moiré intensity. The processed pixel value ea may be expressed by the following equation (12):

$$e_a = (Aa + Bb + \ldots + Ii)/(A + B + \ldots I) \quad (12)$$

In this case, the respective weights are represented by $A/(A+B+\ldots I)$, $B/(A+B+\ldots I)$, $\ldots I/(A+B+\ldots I)$; hence, the total sum of the weights is at unity. Thus, the weighted averaging process under consideration is such that a matrix of the original image consisting of 3 pixels wide by 3 pixels high surrounding the pixel e whose value is to be converted (see FIG. 4A) is filtered by convolution integration with a 3×3 weighting matrix in which the respective elements have weights of $A/(A+B+\ldots I)$, $B/(A+B+\ldots I)$, $\ldots I/(A+B+\ldots I)$. This filtering process is also known as a "stochastic multiplication/addition process".

If a position dependent weighting matrix after adjustment with the coefficient of emphasis of moiré intensity is used in weighted averaging, the processed central pixel value e' may be expressed by the following equation (13):

$$e' = \{\alpha(Aa + \ldots + Dd + Ff + \ldots + Ii)/(A+B+\ldots +I)\} + \{\alpha E/(A+B+\ldots +I) + (1-\alpha)\}e = \alpha e_a + (1-\alpha)e \quad (13)$$

Obviously, the pixel value e' can also be determined by a adjustment of the pixel value ea previously obtained by weighted averaging. In equation (13), the respective weights are represented by $\alpha A/(A+B+\ldots +I)$, $\alpha B/(A+B+\ldots +I)$, $\ldots, \alpha E/(A+B+\ldots +I)+(1-\alpha), \ldots, \alpha I/(A+B+\ldots +I)$ and, in this case, the total sum of the weights is also at unity.

When calculating the weight by direct use of the threshold matrix TM' for each of the CMYK plates used for the halftoning step in the printing process, the weight may originate from the threshold value of the element located at any specified position in each of the partial threshold matrices of 5×5 elements which compose the pixel-related threshold matrix TM', for example, at the center of each partial threshold matrix or at the top left corner of it. Alternatively, the average value for the partial threshold matrices of 5×5 elements may be used as the weight. The thus determined weight may subsequently be adjusted by the coefficient of emphasis of moiré intensity α.

Described above is the first method of providing an adjusted weights which is based on weight calculation by direct use of the threshold matrix TM' for each of the CMYK plates used for the halftoning step in the printing process.

Figure 5A:
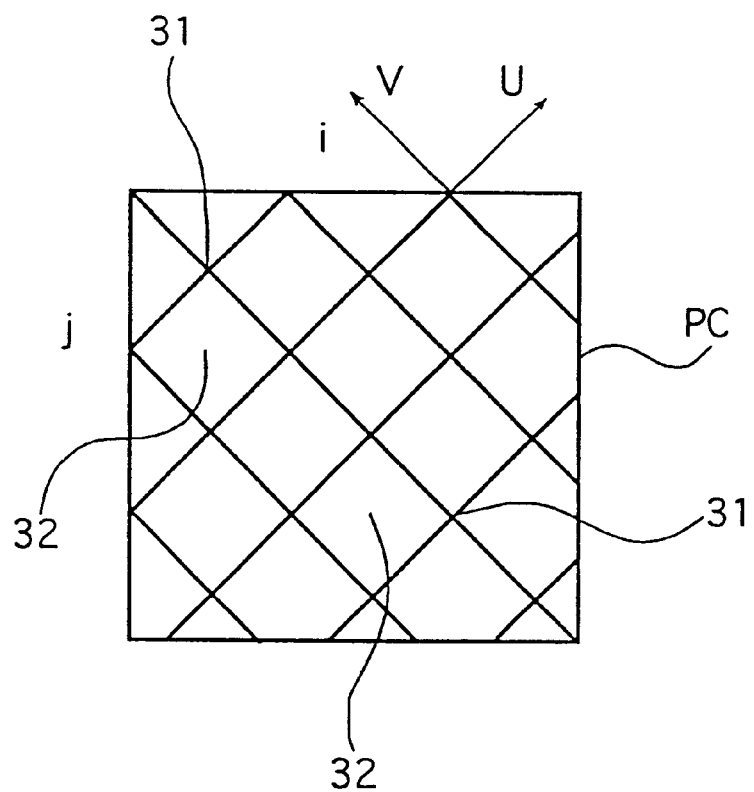
FIG. 5A is a schematic representation of a screen grid having a screen ruling of 175 and a screen angle of 45 degrees, which may be used in the step of generating a weight function in the invention method of predicting and processing image fine structures.

The second method of providing adjusted weights involves the use of a function which is characterized by monotonic weight decrease or increase from the center outward. FIG. 5A shows a screen grid represented by the same coordinate system PC as shown in FIG. 3B and the center from which the weight decreases outward may be each grid point 31 (where two lines intersect at right angles), or the midpoint 32 between two adjacent grid points or any single point within each grid unit. Consider, for example, a function in which the midpoint 32 between two adjacent grid points is the center from which the weight decreases monotonically. In terms of a uv coordinate system of the type shown in FIG. 5A, a weight function expressed by the following equation (14) can be established for each grid unit (the length of each side of one grid unit is equal to the reciprocal of the screen ruling LPI):

$$f(u,v) = 0.5 - \{(u-0.5)^2 + (v-0.5)^2\}/\Sigma f(u,v) \quad (14)$$

Figure 5B:
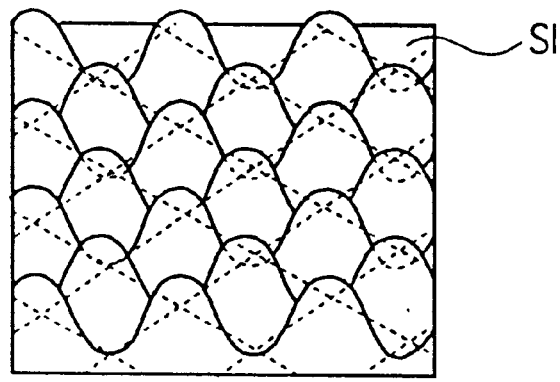
FIG. 5B is a schematic representation of the profile of a weight function drawn on FIG. 5A.

A schematic waveform of the weight function f(u,v) may be placed on the coordinate system PC having a screen ruling of 175 and a screen angle of 45 degrees to produce a superposed image SI', which is shown in perspective in FIG. 5B.

In practice, the weight for a specified pixel position (i,j) in the original image I shown in FIG. 3A may be calculated by the following procedure. Write (u,v) for the position on the grid space coordinate system PC which corresponds to the pixel position (i,j) and also write R, LPI and θ for the resolution (dpi) of the original image I, screen ruling and screen angle, respectively. Then, the position (u,v) can be determined by the following equation (15):

$$u = \{\cos(-\theta) \times i + \sin(-\theta) \times j\} \times L/R$$
$$v = \{\sin(-\theta) \times i + \cos(-\theta) \times j\} \times L/R \quad (15)$$

Substituting the determined position (u,v) into equation (14), one can obtain the weight for the position (u,v), which may safely be substituted for the weight at the specified pixel position (i,j). The thus determined weight may subsequently be adjusted by the coefficient of emphasis of moiré intensity α.

Described above is the second method of determining adjusted weights after weight calculation. The weighting weights, whether they are calculated by the first or second method, may be employed in predicting (or simulating) image fine structures to ensure equally satisfactory results.

The method of determining adjusted weights after weight calculation is described below in much greater details with reference to the flow chart shown in FIG. 6. Considering the convenience in calculations and the shortness of calculation times, the following description assumes that weights are calculated by direct use of the threshold matrix TM', for each of the CMYK plates for use in the halftoning step in the printing process.

Given this assumption, let us first describe an exemplary process of preparing a weighting matrix for the C plate on the basis of specific numerical values. Weighting matrixes for the MYK plates can be prepared by procedures which are entirely the same as described below. The following description also assumes that the printer 17 is a continuous-tone color printer which, as already mentioned hereinabove, has an output resolution of 400 dpi and which is capable of operating by a so-called "density gradation process" to provide 256 density gradations for each of the RGB colors. It is also assumed that the resolution of the original image I has been adjusted to 400 dpi (equal to the output resolution) by the preliminary resolution conversion with the block 21.

The screen ruling LPI and the screen angle θ which are used in simulating image fine structures on a hard proof HP being output from the printer 17, namely, for predicting the image fine structures which will appear in a printed document, may take any desired values but, in the following description, LPI is assumed to be 175 whereas θ is assumed to take the values of 75, 45, 0 and 15 in degrees for the plates C, M, Y and K, respectively.

In the printing process, the screen angle is dealt with as varying from 0 to 180 degrees because the screen has no geometric symmetry with respect to 90° rotation. However, if attention is paid only to the arrangement of dots, the screen space is a Cartesian coordinate system in which the two axes intersect at right angles, so the range through a 0–90° arc will suffice for the purpose of predicting the image fine structures which will appear in a printed document. With a screen in which θ=90–180°, values obtained by conversion in accordance with the following equation (16) may be employed:

$$\theta = \theta \% \ (90 \ \text{deg.}) \tag{16}$$

where "%" represents a residue calculation in which θ on the right side is divided by 90 degrees to leave θ on the left side as the remainder.

As will be understood from FIG. 3C, the mask size of a weighting matrix (hereinafter also referred to as "a weighting filter") would be sufficient to represent image fine structures if it is determined to be such that at least one pixel corresponding to the output resolution is present within a single grid unit (screen cell). In the case under consideration, a weighting matrix will be prepared which has a 3×3 mask size as specified by the following equation (17) which means that the output resolution is divided by the screen ruling and the fractional part of the quotient is raised to a whole number:

$$\text{INT(output resolution/screen ruling)}+1=\text{INT}(400/175)+1=3 \tag{17}$$

In equation (17), INT(X) signifies a mathematical operation for leaving only the integral part of X intact.

Given a mask size of 3×3 for the weighting matrix and if the screen ruling LPI and the screen angle θ in equation (8) are determined, these two parameters can be regarded as constants; therefore, equation (8) can be rewritten as follows:

$$Ca(i, j) = \sum_{k=-1}^{1} \sum_{l=-1}^{1} \{\text{Weight}(i, j, k, l) \times C(i+k, j+l)\} \tag{18}$$

For the sake of convenience in the following description, rewrite equation (18) as follows:

$$Ca(i,j)=\Sigma_{k=-1}^{1}\Sigma_{l=-1}^{1}\{\text{Weight }(i,j,k,l)\times C\ (i+k,\ j+t)\}=\Sigma_k\Sigma_l\{\text{Weight}(i,j,k,l)\times C\ (i+k,\ j+l)\}$$

The calculation of $\Sigma_{k=-1}^{1}\Sigma_{l=-1}^{1}$ is performed on the pixel under calculation and the nearby pixels within a rectangular range which surrounds it by a size of 3×3. Thus, k=−1, 0, 1 and l=−1, 0, 1. In the following description, the calculation of $\Sigma_{k=-1}^{1}\Sigma_{l=-1}^{1}$ will be designated by $\Sigma_k\Sigma_l$. The term Weight (i,j,k,l) may represent a weight which is either before or after adjustment of the moiré intensity.

On the pages that follow, the first method of providing adjusted weights which is based on weight calculation by direct use of the threshold matrix TM' for plate C will be described in an even more specific way with reference to FIG. 6.

When determining the values of the respective elements of a 3×3 weighting matrix, a rational number screen (also called "rational screen") template may be employed and, as already noted hereinabove, the template is a threshold matrix for use in the printing process (step S11). If a rational number screen template of 2000 dpi consists of 215×215 elements, the size of the template may be defined as being MMsize×MMsize (MMsize=215).

Figure 7:
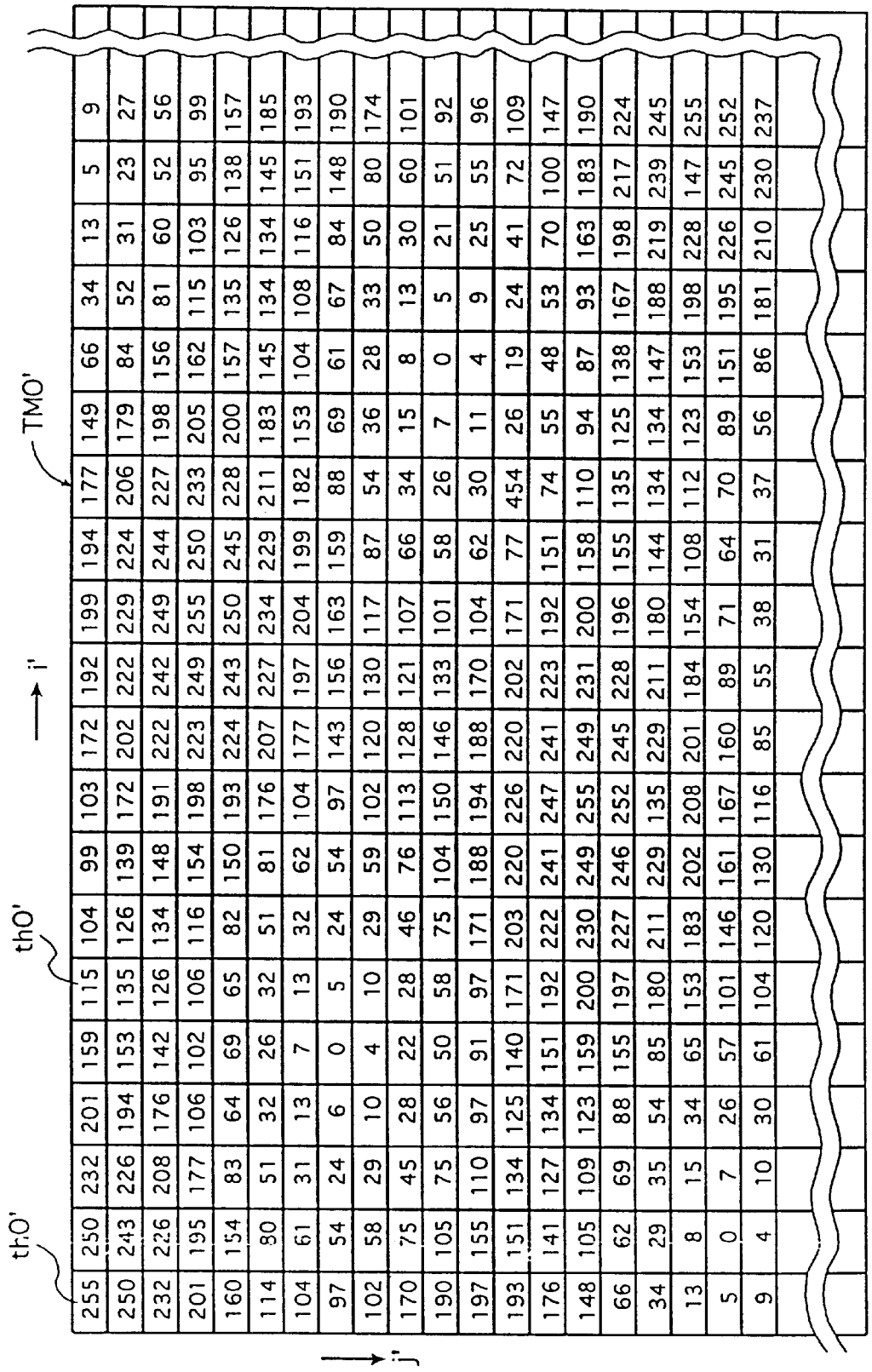
FIG. 7 is a diagram showing part of a rational number screen template (threshold matrix) of 2000 dpi which may be used in the invention method of predicting and processing image fine structures.

FIG. 7 shows an example of rational number screen template TM0' which has a resolution of 2000 dpi and a size of MMsize (=215)×MMsize (=215). The coordinate system on the resolution of 2000 dpi may be written as (i',j'); therefore, on the rational number screen template TM0' of 2000 dpi, the coordinate i' takes one of the values ranging from 0 to 214 and so does the coordinate j'. The threshold value th0' is assigned 215×215 elements and if it is 8-bit data, th0' takes one of the values in the range from 0 to 255.

In preparation for the case where a 3×3 weighting matrix of 400 dpi which is allowed to act on the original image data I is constructed from the rational number screen template, TM0' of 2000 dpi (step S12), one must consider that 5×5 dots (elements) of 2000 dpi correspond to a single dot of 400 dpi and he may then construct a threshold template consisting of 43×43 threshold values extracted from the centers (delineated by thick lines) of partial rational number screen templates each composed of 5×5 elements as shown in FIG. 4B (step S12).

Figure 8:
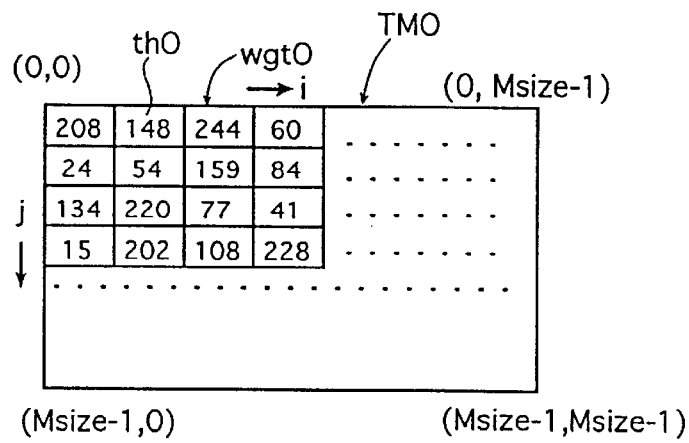
FIG. 8 is a diagram showing an exemplary weighting matrix of 400 dpi which may be used in the invention method of predicting and processing image fine structures.

FIG. 8 shows an example of the thus constructed threshold template TMO which consists of 43×43 threshold values th0(i,j). In this figure, the threshold template TMO is shown to have a mask size of Msize and in the case under consideration, the mask size Msize is equal to 43.

In the next step, a 3×3 weighting matrix wgt0(i,j,k,l) is constructed from the threshold template (step S13) and this matrix may be expressed by the following equation (19).

$$\text{wgt0}(i,j,k,l)=\text{th0}(i+k,\ j+l)/ss(i,j) \tag{19}$$

where k, l=−1, 0, 1 and ss(i,j) means $\Sigma_k\Sigma_l\{\text{th0}(i,j,k,l)\}$(where k and l each take a value in the range from −1 to 1).

Substituting the resulting 3×3 weighting matrix wgt0(i,j,k,l) as F(i,j,k,l) into equation (1), one can adjust said matrix with the coefficient of emphasis of moiré intensity α, whereby an adjusted weighting matrix wgt0'(i,j,k,l) can be determined in accordance with the following equation (20) (step S27):

$$\text{wgt0'}(i,j,k,l)=\alpha\{-E(k,l)+\text{wgt0}(i,j,k,l)\}+E(k,l) \tag{20}$$

Using the thus obtained 3×3 weighting matrix, mathematical operations for weighted averaging are performed by the specific sequence shown in FIGS. 9A–9E. Since wgt0(i,j,k,l) is wgt0(i,j,k,l)=th0(i+k, j+l)/ss(l,l), the first step is such that th0(l,l)=54 and the nearby threshold values in a 3×3 matrix having th0(l,l) in the center are extracted from the threshold template TM0 shown in FIG. 8 (see FIG. 9A). In the next step, $\Sigma_k\Sigma_l ss(l,l)$ is determined by summing up the threshold values including th0(l,l) and the nearby threshold values in the 3×3 matrix and the result is $$\Sigma_k\Sigma_l ss(l,l)=298+148+\ldots+77=1268.$$

Hence, the 3×3 weighting matrices wgtO are obtained by dividing the threshold values of the elements of interest by $\Sigma_k\Sigma_l ss(l,l)=1268$. The value of $\Sigma_k\Sigma_l \text{wgt0}(l,l,k,l)$ which is the total sum of the individual 3×3 weighted matrices wgt0 is always equal to unity (see FIG. 9C).

If the coefficient of emphasis of moiré intensity α is 0.9, the individual elements of the 3×3 weighting matrix wgt0 will take the values shown in FIG. 9D.

If the pixel value e in the original image data I of 400 dpi which is shown schematically in FIG. 4A to consist of 3×3 pixels is converted to e' by weighted averaging with weights adjusted by moiré intensity, the new pixel value e' is obtained as e'=(a ×0.148+b×0.105+. . . +e×0.138+i×0.055)= 0.9×(a×208+b×148 +. . . +e×54+. . . +i×77)/1268+e×0.1 (see FIG. 9E).

Consider here that the pixel value f next to the pixel e is converted to f' by weighted averaging with adjusted weights. In this case, the new pixel value f' can be obtained by the following procedure: the pixel at the ij coordinates of (2,1) in FIG. 8 is taken as the center and the threshold values including this center value and the nearby threshold values in a 3×3 matrix, namely, 148, 244, 60, 54, 159, 84, 220, 77 and 44, are used to first prepare a 3×3 weighting matrix wgt0(2,1) and, then, using the coefficient of emphasis of moiré intensity α which is set at 0.9, a 3×3 adjusted weighting matrix wgt0'(2,1) is constructed from the wgt0 (2,1) in accordance with the equation (20) and allowed to act on the pixel value f and the nearby pixels in the 3×3 matrix in the original image data I, thereby effecting weighted averaging in the same manner as described in connection with the pixel value e.

In practice, the 3×3 weighting matrices wgt0 and wgt0' need be provided in as many units as there are positions of screen cells (grid units) expressed in coordinates (i,j). In the case under discussion, the necessary number is 43×43 (=Msize×Msize) and the coordinates of screen cell position limited by the number Msize×Msize are expressed by (i%Msize, j%Msize), in which i%Msize signifies the remainder that is left after i is divided by Msize (take, for example, the case of i=1, 44, 87; i%Msize is the same for all values of i and it is at unity). Therefore, the image data after weighted averaging, namely, the image data Ca(i,j) after emphasis of image fine structures are obtained by the following equation (21) which is transformed from equation (18), provided that the image data Ca(i,j) represent converted data either prior to or after adjustment of moiré intensity:

$$Ca(i,j)=\Sigma_k\Sigma_l\{Weight(i\%Msize,j\%Msize,k,l)\times C(i+k, j+l)\} \quad (21)$$

Thus, the original image data I are subjected to weighted averaging in accordance with equation (21) to thereby produce image data Ca(i,j) processed by weighted averaging. Of the pixels in the original image data I, those which are located on the four sides should not contain the elements of a weighting matrix but it is cumbersome to determine such elements by mathematical operations. What is more, important pictures are not usually present on the four sides of the original image data I. Therefore, in the embodiment under consideration, the pixels located on the four sides of the original image data I are not subjected to weighted averaging but are used as such.

The image data Ca(i,j) obtained by weighted averaging in accordance with equation (21) using the adjusted 3×3 weighting matrix wgt0' as the weight function Weight (i%Msize,j%Msize,k,l) are converted to RGB image data by the predicting and processing block 23 or 24 shown in FIG. 1 and the resulting RBG image data are supplied into the printer 17 for producing a hard proof HP or into the display 18 for producing a soft proof SP. Moiré, line discontinuities and other image fine structures appear in the images on both proofs with their intensity adjusted in accordance with the type of the printing machine to be used to produce a printed document (also see FIG. 6).

We now describe another example of constructing a 3×3 weighting matrix. This example is intended to implement the weight emphasizing step S2 already explained above with reference to FIG. 2.

For weight emphasis, a 3×3 weighting matrix wgt1 (to be described later on) may be constructed after spatial emphasis of the respective threshold values th0' in the threshold template TM0' of 2000 dpi shown in FIG. 7 or it may be constructed direct from the already prepared threshold template TM0 of 400 dpi shown in FIG. 8.

In the case of emphasizing the respective threshold values th0' in the threshold template TM0 of 2000 dpi shown in FIG. 7, emphasized threshold values th1' can be obtained by performing a cubic normalizing operation in accordance with the following equation (22) (step S14):

$$th1'(i',j')=th0'(i',j')^3/255^2 \quad (22)$$

In the case of using the threshold template TM0 of 400 dpi shown in FIG. 8, emphasized threshold values th1 can be obtained by performing a cubic normalizing operation in accordance with the following equation (23) (step 14):

$$th1(i,j)=th0(i,j)^3/255^2 \quad (23)$$

FIG. 10 shows a threshold template TM1' of 2000 dpi which is composed of the emphasized threshold values th1' obtained as the result of calculation by equation (22).

Figures 11, 12:
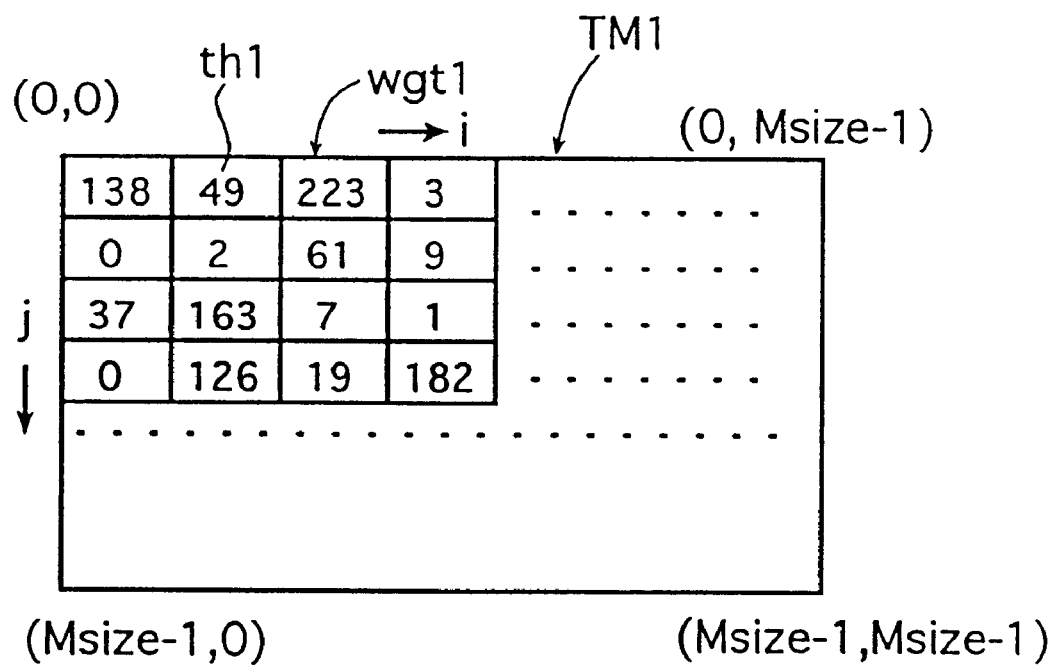
FIG. 11 is a diagram showing an exemplary weight matrix of 400 dpi that is generated by emphasis of threshold values and which is to be used in the invention method of predicting and processing image fine structures.
FIG. 12 is a diagram showing the composition of a 3×3 Gaussian filter which is to be used in the invention method of predicting and processing image fine structures.

FIG. 11 shows a threshold template TM1 of 400 dpi which is composed of the emphasized threshold values th1 obtained as the result of calculation by equation (23).

The threshold values th0' and th1' which are emphasized values of th0 and th1, respectively, are obtained by dividing the cubes of th0 and th1 by 255×255 which is a maximum of the threshold values. To give just a few examples, the initial threshold values (th0,th1) of 0, 24, 54, 77, 134, 148, 220, 244 and 255 are emphasized to threshold values (th0', th1') of 0, 0, 2, 7, 37, 49, 163, 223 and 255, respectively. Obviously, threshold values that are initially close to 255 remain substantially the same after emphasis and as they become closer to zero, initial threshold values are emphasized to much smaller values. Note that every threshold value is either zero or a positive integer (natural number), with zero being a minimum.

The 3×3 weighting matrix wgt1 can be constructed by the following equation (24) in correspondence with equation (19) using the threshold values th1 in the emphasized threshold template TMI shown in FIG. 11 (step S15):

$$wgt1(i,j,k,l)=th1(i+k, j+l)/ss(i,j) \quad (24)$$

where k and l each range from −1 to 1, and ss(i,j)=$\Sigma_k\Sigma_l$\{th1 (i,j,k,l)\} (where k and i each range from −1 to 1).

Using the thus obtained 3×3 weighting matrix wgt1(i,j,k, l) and adjusting it with the coefficient of emphasis of moiré intensity α in accordance with equation (1), one can construct an adjusted 3×3 weighting matrix wgt1'(i,j,k,l) in accordance with the following equation (25) which corresponds to equation (20) (Step S20):

$$wgt1'(i,j,k,l)=\alpha\{-E(k,l)+wgt1(i,j,k,l)\}+E(k,l) \quad (25)$$

Figure 6:
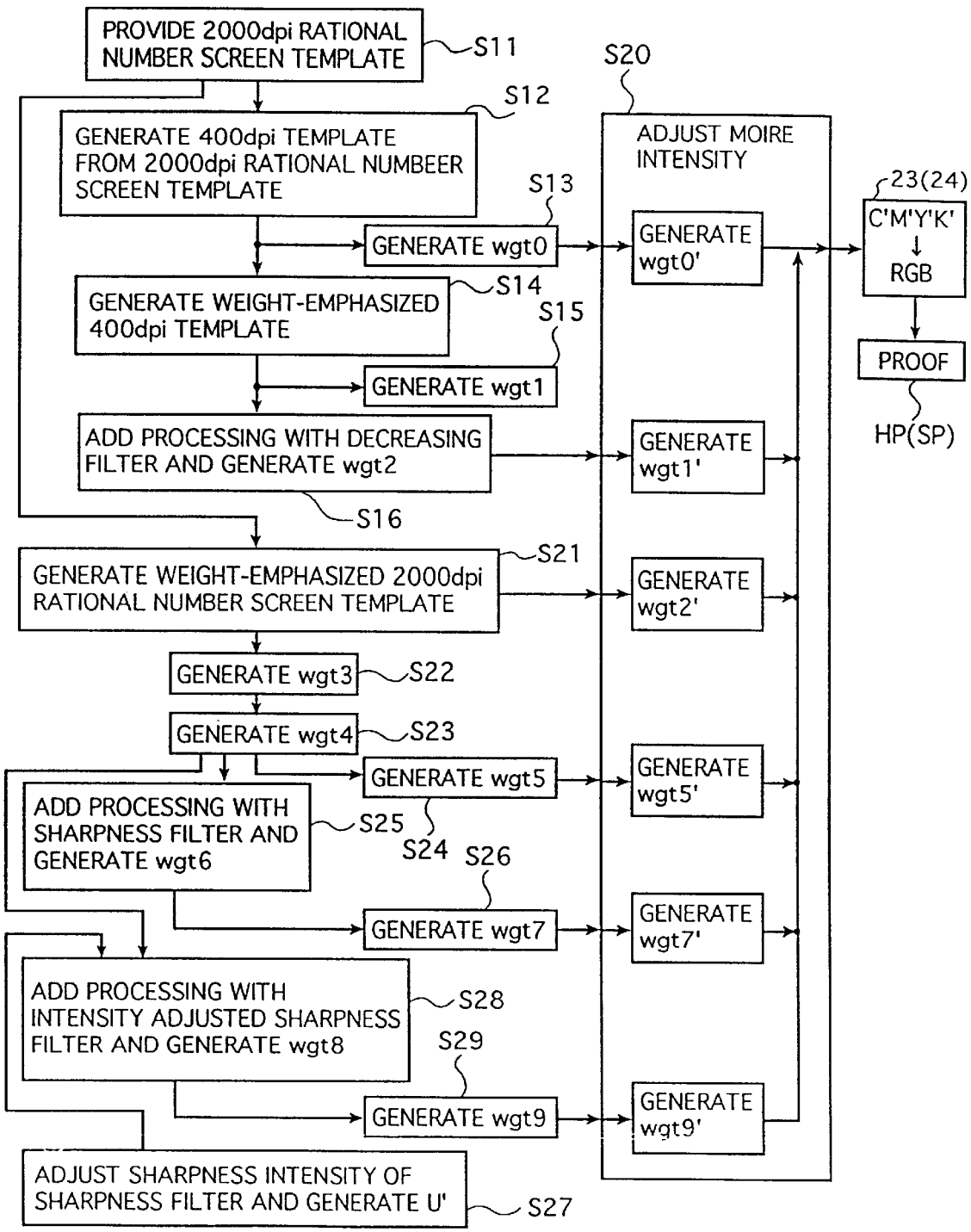
FIG. 6 is a flow chart to which reference may be had in explaining the generation of various weighting matrices in the invention method of predicting and processing image fine structures.

The image data Ca(i,j) obtained by weighted averaging in accordance with equation (21) using the adjusted 3×3 weighting matrix wgt1' as the weight function Weight (l%Msize, j%Msize, k,l) are converted to RGB image data by the predicting and processing block 23 or 24 as shown in FIG. 6 and the resulting RBG image data are supplied into the printer 17 for producing a hard proof HP or into the display 18 for producing a soft proof SP. Moiré, line discontinues and other image fine structures appear in the images on both proofs with their intensity adjusted in accordance with the type of the printing machine to be used to produce a printed document.

Compared to the proofs HP and SP produced using the adjusted 3×3 weighting matrix wgt0', those produced using the adjusted 3×3 weighting matrix wgt1' are characterized by more emphasized image fine structures, in other words, they can reproduce moiré, line discontinuities and other image fine structures that are sufficiently close to those to be eventually reproduced in a printed document that the latter can be predicted more accurately.

In fact, however, the adjusted 3×3 weighting matrix wgt1' has a side effect in that the output image on the proofs HP and SP produced using said matrix suffers from slight discontinuities, although very slight, that occur between adjacent pixels at a resolution of 400 dpi, in other words, the edges of the image are slightly noticeable. Frequency components from pixel periods higher than 400 dpi are also slightly noticeable and this is another side effect of the matrix wgt1'.

In order to eliminate these side effects, one may construct a 3×3 weighting matrix wgt2 (details of which will be given later in this specification) by allowing a 3×3 low-pass filter to act on the yet to be adjusted 3×3 weighting matrix wgt1. The 3×3 low-pass filter is characterized by weight decrease (attenuation) from the center outward and so named because the center is the component to be reduced. The 3×3 low-pass filter (also called "attenuating filter") may be regarded as a blurring or anti-aliasing filter. In the embodiment under consideration, a Gaussian filter is used as the 3×3 low-pass filter.

FIG. 12 shows the composition of the 3×3 Gaussian filter on the 400 dpi space which is used in the embodiment under consideration. The Gaussian filter is mathematically expressed by the following equation (26):

$$\text{Gauss1}(k,l) \tag{26}$$

where k and l each range from −1 to 1. The 3×3 weighting matrix wgt2 is constructed by multiplying the 3×3 weighting matrix wgt1 by the Gaussian filter Gauss1(k,l) and can be expressed by the following equation (27) (step S16):

$$\text{wgt2}(i,j,k,l) = \text{wgt1}(i,j,k,l) \times \text{Gauss1}(k,l) = \text{th1}(i+k, j+l) \times \text{Gauss1}(k,l)/ss(i,j) \tag{27}$$

where k and l each range from −1 to 1, $ss(i,j)=\Sigma_k\Sigma_l\{\text{th1}(i+k, j+l) \times \text{Gauss1}(k,l)\}$, and i and j each range from 0 to Msize −1.

Using the thus obtained 3×3 weighting matrix wgt2(i,j,k, l) and adjusting it with the coefficient of emphasis of moiré intensity α in accordance with the equation (1), one can construct an adjusted weighting matrix wgt2'(i,j,k,l) in accordance with the following equation (23) which corresponds to equation (20) (step S20):

$$\text{wgt2}'(i,j,k,l) = \alpha\{-E(k,l) + \text{wgt2}(i,j,k,l)\} + E(k,l) \tag{28}$$

The image data Ca(i,j) obtained by weighted averaging in accordance with the equation (21) using the adjusted 3×3 weighting matrix wgt2' are converted to RGB image data by the predicting and processing block 23 or 24 and the resulting RBG image data are supplied into the printer 17 for producing a hard proof HP or into the display 18 for producing a soft proof SP. This provides an output image in which adjacent pixels at the resolution of 400 dpi connect smoothly, which has no frequency components from periods higher than 400 dpi and in which moiré, line discontinuities and other image fine structures that will appear in a printed document are faithfully simulated with their intensity adjusted in accordance with the type of the printing machine to be used to produce the printed document.

We next describe the construction of an adjusted 3×3 weighting matrix wgt5' which is capable of connecting adjacent pixels even more smoothly than the matrix wgt2'.

To begin with, the threshold template TM1' of 2000 dpi level which is shown in FIG. 10 and which is constructed by so-called "cubic normalization" of threshold values is acted upon by a 15×15 Gaussian filter Gauss2(m,n) corresponding to the resolution of 2000 dpi (this adjustment is generally called "resolution conversion") so as to prepare a weight matrix wgt3 of 400 dpi.

FIG. 13 shows an example of the 15×15 Gaussian filter Gauss2(m,n) which is composed of pixels having the resolution of 2000 dpi. The coordinates (m,n) correspond to the coordinates (i',j') on the 2000 dpi space. As one can see from FIG. 13, the Gaussian filter Gauss2(m,n) has its elements arranged in a fashion that is approximated by Gaussian characteristics in which the center value is the greatest and gradual attenuation in value occurs as the pixels depart from the center outward.

The Gaussian filter Gauss2(m,n) is allowed to act on the emphasized threshold template TM1' to construct the weight matrix wgt3 of 400 dpi level in accordance with the following equation (29) (step S22):

$$\text{wgt3}(i,j,m,n) = \text{th1}'(5 \times i + m, 5 \times j + n) \times \text{Gauss2}(m,n) \tag{29}$$

where m and n each range from −7 to 7, (i,j) are coordinates on the 400 dpi Space, where i and j each range from 0 to Msize −1, and (5×i+m, 5×j+n) and (m,n) are each coordinates (i',j') on the 2000 dpi space, where i' and j' each range from 0 to Msize −1. The multiplier 5 of i and j results from 2000 dpi/400 dpi and is a constant for resolution conversion.

Consider first the case where (i,j) is (0,0) in equation (29). Since wgt3(0,0,m,n)=th1' (m,n)×Gauss2(m,n) select the 15×15 matrix at the top left corner of the threshold template TM1' shown in FIG. 10 which has threshold values of 255, 50, 49 and 12 at the four corners and multiply the respective elements of the matrix by the respective elements of the Gaussian filter Gauss2(m,n) shown in FIG. 13, to thereby construct a 15×15 weight matrix wgt3(0,0,m,n).

Consider next the case where (i,j) =(1,0) in equation (29). Since wgt3(1,0,m,n) =th1'(5+m, n)×Gauss2(m,n), select a 15×15 matrix in the threshold template TM1' shown in FIG. 10 which is shifted to the right by i'=5 from the above-mentioned 15×15 matrix at the top left corner of the template TM1' and which has threshold values of 23, 0, 123 and 105 at the four corners and multiply the respective elements of the matrix by the respective elements of the Gaussian filter Gauss2(m,n) shown in FIG. 13, to thereby construct a 15×15 weight matrix wgt3(1,0,m,n). Similar procedures are applied to construct weight matrices wgt3 in succession until wgt3 (Msize −1, Msize −1, m,n) is obtained for (i,j)=(Msize −1, Msize −1).

Thus, 43×43 (=Msize×Msize) weight matrices wgt3(i,j) are obtained after processing with the Gaussian filter Gauss2 (m,n). In order to convert these weight matrices to the same number (43×43) of 3×3 weighting matrices, one may effect conversion such that a single weight matrix wgt3(i,j) consisting of 15×15 elements corresponds to a single weighting matrix wgt4(i,i,k,l) (k and l each range from −1 to 1) which consists of 3×3 elements.

The respective elements of the stated number (43×43) of 3×3 weighting matrices wgt4(i,j,k,l) which are each centered at the coordinates (i,j) are given by the following equation (30) (step S23):

$$wgt4(i, j, k, l) = \sum_{m=5k-2}^{5k+2} \sum_{n=5l-2}^{5l+2} wgt3(i, j, m, n) \qquad (30)$$

where $$\sum_{m=5k-2}^{5k+2} \sum_{n=5l-2}^{5l+2}$$

represents the total sum of 5×5 elements for m of from 5k −2 to 5k+2 and n of from 5l −2 to 5l+2; in other words, since k and l each range from −1 to 1, m and n are each calculated to range from −7 to 7 and, hence, 15×15 elements are simply divided into 9 sections each consisting of 5×5 elements and all elements of these 9 section are added together to give $$\sum_{m=5k-2}^{5k+2} \sum_{n=5l-2}^{5l+2}.$$

In order to construct the adjusted 3×3 weighting matrix wgt5' which allows for even smoother connection between pixels than the adjusted 3×3 weighting matrix wgt2', the 3×3 weighting matrix wgt4 is normalized to construct a 3×3 weighting matrix wgt5, which is then adjusted by the coefficient of emphasis of moiré intensity α.

The first thing to do is to construct 43×43 units 3×3 weighting matrix wgt5 in accordance with the following equation (31) (step S24):

$$wgt5\ (i,j,k,l) = wgt4(i,j,k,l)/ss(i,j) \qquad (31)$$

where (k,l) represents the amount of shift from the center of a filter on the 400 dpi space, where k and l each range from −1 to 1 and ss(i,j) is equal to $\Sigma_k \Sigma_l \{wgt4(i,j,k,l)\}$.

Using the thus obtained 3×3 weighting matrix wgt5(i,j,k, l) and adjusting it by the coefficient of emphasis of moiré intensity α in accordance with the equation (1), one can construct the adjusted weighting matrix wgt5'(i,j,k,l) in accordance with the following equation (28) which corresponds to the equation (28) (step S20):

$$wgt5'(i,j,k,l) = \alpha\{-E(k,l) + wgt5(i,j,k,l)\} + E(k,l) \qquad (32)$$

The image data Ca(i,j) obtained by weighted averaging in accordance with equation (21) using the adjusted 3×3 weighting matrix wgt5' are converted to RGB image data by the predicting and processing block 23 or 24 as shown in FIG. 1 and the resulting RGB image data are supplied into the printer 17 for producing a hard proof HP or into the display 18 for producing a soft proof SP. This provides an output image in which adjacent pixels at the resolution of 400 dpi connect more smoothly, which has no frequency components from periods higher than 400 dpi and in which moiré, line discontinuities and other image fine structures that would appear in a printed document are faithfully simulated with their intensity adjusted in accordance with the type of the printing machine to be used to produce the printed document.

However, when the image formed either from the printer 17 or on the display 18 using the 3×3 weighting matrix wgt5' which was constructed using the Gaussian filter Gauss2(m, n) and which was subsequently adjusted in moiré intensity was observed, the sharpness for each pixel was found to be inferior to what would be obtained on a printed document.

The present inventors found that there were two major reasons for the decrease in sharpness; one is of course the use of the Gaussian filter Gauss2(m,n); the second and more important reason is that when a sublimation-type thermal transfer printer or a printer operating on photography, which are two specific versions of the continuous-tone printer 17 operating on a density gradient process, are used to output an image as a proof, these printers are usually adapted to be such that the contour of marked dots (pixels) has a Gaussian blur to provide a better connection between adjacent pixels and to prevent the occurrence of moiré in the marked dots.

Therefore, with a view to providing image sharpness that is approximate to that of a printed document, the 3×3 weighting matrix wgt4 expressed by equation (31) which is yet to be normalized with ss(i,j) to produce the yet to be adjusted 3×3 weighting matrix wgt5 is processed with either a space emphasizing filter (also called "sharpness matrix" or "sharpness filter") which has opposite characteristics to those of Gauss2 or a space emphasizing filter having stronger characteristics than said reverse sharpness filter. The method by which image data I' with emphasized image fine structures can be constructed by adopting the processing with such space emphasizing filters is described below.

FIG. 14A shows an exemplary composition of a sharpness filter Shp=Shp1 which is a "reverse" filter having opposite characteristics to those of Gauss2.

FIG. 14B shows an exemplary composition of a sharpness filter Shp=Shp2 which has stronger characteristics than the sharpness filter Shp1.

FIG. 14C shows an exemplary composition of a sharpness filter Shp=Shp3 which has stronger characteristics than the sharpness filter Shp2.

For each of the filters Shp1, Shp2 and Shp3, the horizontal axis is represented by i, k, r and the vertical axis by j, l, s for providing a good perspective in the use of the equations to be set forth below. The respective coordinates are on the same system as the coordinate system (i,j) on the 400 dpi space. It should also be noted that for each of the filters Shp1, Shp2 and Shp3, the total sum of the elements is at unity.

If the image data created by weighted averaging with the 3×3 weighting matrix wgt5' which is obtained by performing weight adjustment on the normalized 3×3 weighting matrix wgt4 with the coefficient of emphasis of moiré intensity is written as Ca [see equation (21)] and if the final image data created by allowing the sharpness filter Shp to act on Ca is written as Cb(i,j), this final image data Cb(i,j) can be obtained by the following equation (33):

$$Cb(i,i) = \Sigma_k \Sigma_l \{(Ca(i+k, j+l) \times Shp(k,l)\} \qquad (33)$$

where $\Sigma_k \Sigma_l$ is the total sum of the elements for the range of k and l from −1 to 1, and Shp(k,l) is either one of the sharpness filters shown in FIGS. 14A, 14B and 14C.

Instead of determining the final image data Cb(i,j) from Ca(i,j), the weighting matrix wgt4 may be directly used to determine Ca(i,j) with the aid of an adjusted filter that has been processed by sharpening (step S6 in the flow chart shown in FIG. 2) and adjustment of moiré intensity (step S3) and this alternative procedure will allow simplicity in calculations. In order to perform this, it suffices that the process by the equation (21) and the process by the equation (33) are performed in the process. To this end, a 3×3 weighting matrix wgt7 for weighted averaging is first constructed from the combination of a weighting matrix and a sharpness filter and then adjustment is made by the coefficient of emphasis of moiré intensity a so as to construct an adjusted 3×3 weighting matrix wgt7'.

For constructing the weighting matrix wgt7, the sharpness filter Shp is first applied to the weighting matrix wgt4 to construct a weighting matrix wgt6 (step S25). The weighting matrix wgt6(i,j,k,l) can be obtained by the following equation (34);

$$wgt6(i, j, k, l) = \sum_{r=-1}^{1}\sum_{s=-1}^{1} \{Shp(r, s) \times wgt4(i+r, j+s, k-r, l-s)\} \quad (34)$$

where wgt4(i+r, j+s, k−r, i−s) is regarded as zero if k−r and l−s are each outside the range of from −1 to 1, and Shp(r,s) is either one of the sharpness filters shown in FIGS. 14A, 14B and 14C.

In the next step, the wgt6(i,j,k,l) is normalized to construct the 3×3 weighting matrix wgt7 (step S26) in accordance with the following equation (35):

$$wgt7(i,j,k,l) = wgt6(i,j,k,l)/ss(i,j) \quad (35)$$

where k, l=−1, 0, 1, and $$ss(i, j) = \sum_{k}\sum_{l}\{wgt6(i, j, k, l)\}$$

(where k and l each range from −1 to 1).

Using the thus obtained 3×3 weighting matrix wgt7(i,j,k, l) and adjusting it by the coefficient of emphasis of moiré intensity α in accordance with the equation (1), one can construct the adjusted 3×3 weighting matrix wgt7'(i,j,k,l) for weighted averaging in accordance with the following equation (36) which corresponds to the equation (20) (step S20):

$$wgt7'(i,j,k,l) = \alpha\{-E(k,l) + wgt7(i,j,k,l)\} + E(k,l) \quad (36)$$

Using the thus obtained 3×3 weighting matrix wgt7'(i,j, k,l) as the weight function Weight of equation (21), one can ensure that sharpening and the simulation of image fine structures with the moiré intensity adjusted properly are accomplished simultaneously by one mathematical operation. The image data Cb(i,j) obtained by weighted averaging using the 3×3 weighting matrix wgt7' are converted to RGB image data by the predicting and processing block 23 or 24 and the resulting RGB image data are supplied into the printer 17 for producing a hard proof HP or into the display 18 for producing a soft proof SP. This provides an image in which moiré, line discontinuities and other image fine structures that would appear in a printed document are simulated accurately with their intensity being adjusted in accordance with the type of the printing machine which is to be eventually used to produce the printed document. The image also reproduces the sharpness of the image on the printed document. As a further advantage, the weighted averaging process has no effects on the prediction of colors.

As already mentioned, the intensity of sharpness varies with the specifications of the printing machine to be used even if the original image and the printing conditions (screen ruling, screen angle and print density) are the same. The difference defines general prediction since it originates not only from mechanical factors such as the printing pressure applied by the printing machine but also from other factors associated with software (e.g. halftoning algorithms) and/or hardware. To cope with this problem, the method of the invention uses a means of inputting the intensity of sharpness of an image which simulates moiré and other image fine structures so that the intensity of sharpness of the proof being output is adjusted in accordance with the type of the printing machine to be eventually used to produce a printed document.

The method to be employed in the present invention for adjusting the intensity of sharpness is by adjusting the intensity of a sharpness filter of a size of about 3×3 or 5×5 for use in a conventional sharpness filtering, for example, the intensity of an unsharpness mask (USM) which is employed in an USM process. If the USM such as either one of the sharpness filters Shp1, Shp2 and Shp3 illustrated in FIGS. 14A, 14B and 14C, respectively, is written as U(k,l), the USM (filter) after intensity adjustment as U'(k,l) and the ratio of sharpness emphasis as β, the filter after sharpness intensity adjustment can be determined by the following equation (37) (step S27):

$$U'(k,l) = \beta\{-E(k,l) + U(k,l)\} + E(k,l) \quad (37)$$

where (k,l) represents the coordinates of a filter and k and l each range from −1 to 1 if U(k,l) and U'(k,l) are each assumed to be a 3×3 sharpness filter; E(k,l) is, as already mentioned hereinabove, a coefficient matrix which takes the value "1.0" at its center and the value "0.0" in the other positions.

As in the processing by equation (33), the intensity adjusted sharpness filter U'(k,l) may be applied to the image data Ca(i,j) resulting from weighted averaging with the adjusted weighting matrix, whereby the final image data are determined. However, more preferably, the following alternative method may be adopted: the intensity adjusted sharpness filter U'(k,l) is incorporated into the position dependent filter F(i,j,k,l) or F'(i,j,k,l) specifically exemplified by wgt0, wgt0', . . . wgt4, wgt4', wgt5 or wgt5', and finally, the sharpness filter U'(k,l) adjusted in sharpness intensity and the position dependent filter F'(i,j,k,l) such as wgt5' which has been adjusted in moiré intensity are assembled into a single weighted averaging filter and the resulting composite filter is used to convert the pixels under calculation.

An example of the construction of the composite filter is described below. The sharpness filter U'(k,l) obtained in step S27 with its intensity adjusted properly and the previously determined 3×3 weighting matrix wgt4(i,j,k,l) are assembled by the same procedure as represented by equation (34), whereby a 3×3 weighting matrix wgt8(i,j,k,l) is constructed in accordance with the following equation (38) (step S28):

$$wgt8(i, j, k, l) = \sum_{r=-1}^{1}\sum_{s=-1}^{1}\{U'(r, s) \times wgt4(i+r, j+s, k-r, l-s)\} \quad (38)$$

where wgt4(i+r, j+s, k−r, l−s) is regarded as zero if k−r and l−s are each outside the range from −1 to 1.

In the next step, wgt8(i,j,k,l) is normalized by the same procedure as represented by equation (35) so that a 3×3 weighting matrix wgt9 is constructed in accordance with the following equation (39) (step S29):

$$wgt9(i,j,k,l) = wgt8(i,j,k,l)/ss(i,j) \quad (39)$$

where k, l=−1, 0, 1, and ss(i,j)=$\Sigma_k\Sigma_l$\{wgt8(i,j,k,l)\} (where k and l each range from −1 to 1).

Using the thus obtained 3×3 weighting matrix wgt9(i,j,k, l) and adjusting it with the coefficient of emphasis of moiré intensity a in the same manner expressed by equation (36), one can construct an adjusted 3×3 weighting matrix wgt9'(i,j,k,l) for weighted averaging in accordance with the following equation (40) (step S20):

$$wgt9'(i,j,k,l)=\alpha\{-E(k,l)+wgt9(i,j,k,l)\}+E(k,l) \qquad (40)$$

Using the thus obtained 3×3 weighting matrix wgt9'(i,j,k,l) as the weight function Weight of equation (21), one can ensure that a sharpening process with the intensity of sharpness adjusted properly and the simulation of image fine structures with the moiré intensity also adjusted properly are accomplished simultaneously by one mathematical operation. The image data Cb(i,j) obtained by weighted averaging using the 3×3 weighting matrix wgt9' are converted to RGB image data by the predicting and processing block 23 or 24 and the resulting RGB image data are supplied into the printer 17 for producing a hard proof HP or into the display 18 for producing a soft proof SP. This provides an image in which moiré, line discontinuities and other image fine structures that would appear in a printed document are simulated accurately with their intensity being adjusted in accordance with the type of the printing machine which is to be eventually used to produce the printed document. The image also reproduces the sharpness of the image on the printed document. As a further advantage, the weighted averaging process has no effects on the prediction of colors.

Using the weighting matrix wgt9' which was adjusted in moiré and sharpness intensities in accordance with the type of the printing machine to be eventually used, it took about 2 minutes to produce images C'M'Y'K' with emphasized image fine structures from original images CMYK of size A4 at the resolution of 400 dpi. Computer 12 was a commercial personal computer manufactured by Apple Computer, Inc. and named Power Macintosh 9500/132 Series (CPU: Power PC, 132 MHz; memory: 32 MB). The weighting matrix wgt9' consisted of 43×43 cells of 3×3 weighting matrix of 400 dpi corresponding to a rational number screen of 2000 dpi composed of 215×215 elements and it was a weighting matrix for use in the case where image fine structures on the C (cyan) plate having a screen ruling of 175 and a screen angle of 75 degrees were simulated on the printer 17 of 400 dpi; each weighting matrix was used after multiplying the respective coefficients by a factor of 8192 so that their normalized values would be integers.

In the embodiment under consideration, the sharpness and moiré intensities are preferably adjusted in the following manner.

When the coefficient of emphasis of moiré intensity a is set between 60 and 180% (0.6–1.8) during simulation, substantial changes in moiré intensity are visually verified on proofs. With ordinary printed documents, close resemblance in appearance is achieved when $\alpha$ is set to about 120%, so 60–180% is adequate for dealing with most printed documents; hence, in the case under consideration, the coefficient of emphasis of moiré intensity $\alpha$ is preferably in the range between 0.6 and 1.8.

As for the emphasis of sharpness, it has already been pointed out that the image obtained from a continuous-tone printer is somewhat blurred since the dots marked with the printer have a spatial distribution resembling a Gaussian function and that the image in a printed document produces a sharp visual impression on account of the fact it is composed of tiny dots. Therefore, in order to correct this difficulty, sharpness must deliberately be provided with respect to the actual printed document; otherwise, the proof cannot have the same level of apparent sharpness as the printed document. When proofs simulating a printed document having a screen ruling of 175 are produced on Pictrography 3000 (continuous-tone printer of 400 dpi manufactured by Fuji Photo Film Co., Ltd.) using a 5×5 USM mask, substantial changes in sharpness can be visually observed at β values of 0–80% and a sharpness close to that of the printed document is obtained at about 50%. Using levels of 0–80%, one can produce proofs adequate for most of ordinary printed documents; hence, in the case under consideration, the ratio of sharpness emphasis β is preferably in the range between 0.0 and 0.8.

Figure 15:
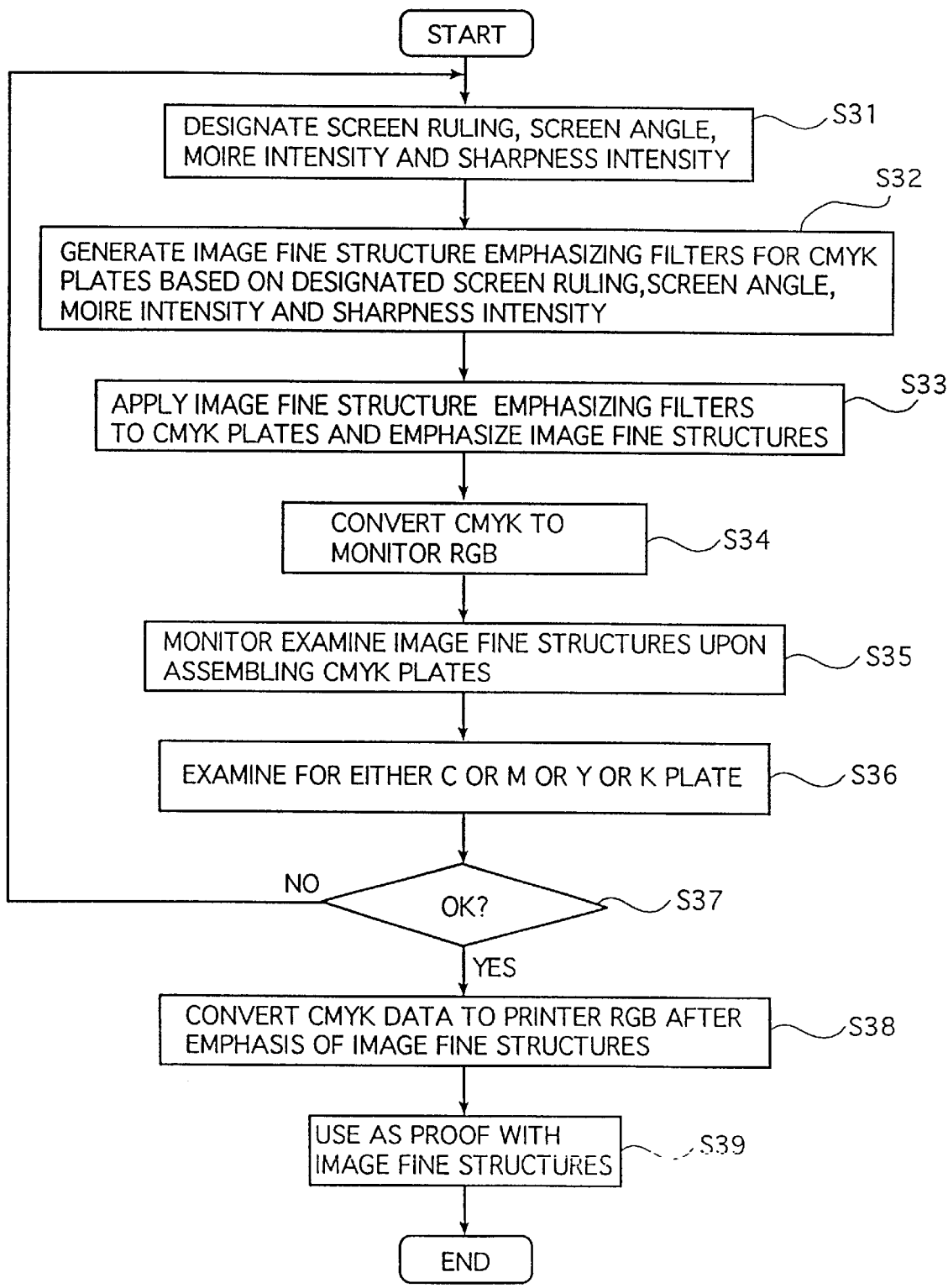
FIG. 15 is a flow chart to which reference may be had in explaining how the invention method of predicting and processing image fine structures is implemented in the use of the image fine structure predicting system.

An exemplary method of using the image fine structure predicting system 11 having the image fine structure predicting and processing block 22 with the structural features described above will now be described below with reference to FIG. 15.

To begin with, the screen attribute input device 14 is activated to designate the screen ruling LPI and screen angle θ, the moiré intensity input device 15 is activated to designate the coefficient of emphasis of moiré intensity α, and the sharpness intensity input device 16 is activated to designate the ratio of emphasis of sharpness intensity β (step S31).

Subsequently, matrices for the four plates CMYK (i.e., image fine structures emphasizing filters) are determined on the basis of the screen ruling LPI and screen angle θ so as to produce image fine structure emphasizing filters in which the intensity of a position dependent filter is adjusted by the coefficient of emphasis of moiré intensity α and the intensity of a sharpness filter adjusted by the ratio of emphasis of sharpness intensity β (step S32). In the illustrated case, wgt9' shown in FIG. 6 is used as the weighting matrix but the present invention permits the use of any one of the following adjusted weighting matrices shown in FIG. 6, wgt0', wgt1', wgt5' and wgt7'. Such weighting matrix is allowed to act on the respective plates CMYK, thereby emphasizing the image fine structures (step S33).

Image data I' with emphasized image fine structures are converted into display's RGB image data by means of the display color predicting and processing block 24 (step S34).

The four plates CMYK based are assembled based on the display's RGB image data and the resulting image fine structures are examined on the screen of the display 18 (step S35).

If necessary, the image on either one of the plates C, M, Y and K is examined by monitoring on the display 18 (step S36).

Subsequently, the result of examination is checked to see if it is satisfactory or not (step S37). If the result is unsatisfactory due to the appearance of moiré or any other image fine structures in the image on the display 18, the process returns to step S31, the screen ruling LPI and screen angle θ are designated again and the steps up to S36 are repeated.

If the result is satisfactory since moiré, line discontinuities or any other image fine structures do not appear in the image, the CMYK image data Ia' with emphasized image fine structures which have been obtained in step S33 are converted to printer's RGB image data by means of the print color predicting and processing block 23 (step S38) and a hard proof HP is output from the printer 17 for use in proof reading (step S39).

According to the embodiment described above, a proof depicting and simulating the image fine structures which will appear in an actual printed document can be produced within a much shorter processing time than in the prior art, for example, a proof with an image of size A4 can be produced by processing for about two minutes (excluding the print time) by means of the above-mentioned commercial personal computer.

Therefore, by making use of the image fine structure predicting system 11 shown in FIG. 1, printing conditions (screen ruling and angle) that will eliminate moiré, line discontinuities and other image fine structures can be designated in accordance with the type of a specific printing machine at the site of image capture with the image input device 13 such as a scanner, whereby satisfactory prediction can be made as to the finish in terms of image fine structures. This ensures that the quality of printed documents up to the final printing stage can be guaranteed even at the "site of color separation" although this has been impossible to accomplish by the prior art.

In addition, even if expensive halftoning printers or any special materials (chemical proofs) are not used, proofs that can simulate image fine structures which will occur due to the halftoning process can be produced from a computer to which an inexpensive printer (of low image resolution, density resolution and operating stability) is connected.

As a further advantage, the image data having the image fine structures emphasized in the embodiment described above are obtained by a weighted averaging process and, hence, will cause no effects on colors. Therefore, if such image data are used on a color predicting printer, proofs are produced that enable the prediction of not only colors but also image fine structures.

In association with image fine structures, the following four items can be checked by examining the proofs produced in accordance with the above-described embodiment of the invention after making proper adjustments on the habit and other characteristics of the printing machine to be eventually used to produce a printed document: 1) the presence or absence of moiré, the intensity of moiré and the identification of a plate or plates that are suspected of causing moiré; 2) whether line discontinuities will occur when fine lines in the original image are printed on the printing machine; 3) whether imperfections in straight lines will take place on account of the halftoning process; and 4) sharpness of the image in the printed document.

The proofs also allow for the checking of the overall impression of the halftone created in the printed document when the results of checking for parameters 1)–4) are combined together.

As described above in detail, the first embodiment of the present invention is characterized in that when converting the values of pixels in the original image on each of the CMY or CMYK plates into pixel values for predicting the image fine structures that would appear in an image on a printed document, the values of the pixels of interest and neighboring pixels are subjected to weighted averaging by weights dependent on the period of grid units which is determined by the screen ruling and angle and, hence, the image fine structures which would appear in the printed document can be predicted on the proof image which is based on the image data composed of the converted pixel values. In other words, moiré, line discontinuities and other image fine structures which would appear on the printed document can be predicted on hard or soft proofs in an accurate and easy manner within a short period of time.

If a sharpness filter is allowed to act upon the image produced by weighted averaging, moiré, line discontinuities, imperfections in straight lines and other image fine structures that would appear in a printed document can be predicted on hard or soft proofs in an accurate and easy manner without impairing image sharpness.

The method of the invention which performs the weighted averaging process has the advantage of causing no side effects on colors. Therefore, if the CMYK data in the original image to be printed are converted to RGB data for use by a continuous-tone printer which is capable of producing colors very close to those computed by the weighted averaging process performed on said CMYK data, one can construct a proof that is highly approximate to the printed document not only in terms of moiré, line discontinuities, imperfections in straight lines and other image fine structures but also with respect to colors.

In addition, according to the method of the invention, an inexpensive machine such as a continuous-tone printer can be used to provide convenience in producing a proof that simulates the image fine structures which will develop due to printed halftone dots. A particular advantage is that even a continuous-tone printer of low resolution (e.g., on the order of 200 dpi as is typically the case of a thermal transfer-type printer) can accomplish moiré simulation by adopting the method of the invention.

The present invention enables high-speed simulation of moiré and other image fine structures.

What is more, the method of the invention allows for adjustment of the intensities of moiré and sharpness on simulations (proofs) of image fine structures and, hence, sharpness and moiré can be simulated in a manner that is appropriate for the specific type of a printing machine to be used, thereby making it possible to produce proofs having higher fidelity to the printed document.

In the prior art, moiré cannot be displayed on a monitor unless the image of interest is enlarged to the screen resolution ($\geq 1000$ dpi); however, the magnification necessary to meet this requirement is so high that it has been practically impossible to locate the area where moiré appears. This is not the case of the present invention and, given an image size of A4, the entire range of moiré occurrence can be examined by scrolling the viewing screen.

On the pages that follow, we will next describe a method of predicting and processing image fine structures in accordance with the second embodiment of the invention with reference to FIGS. 16–22.

Figure 16:
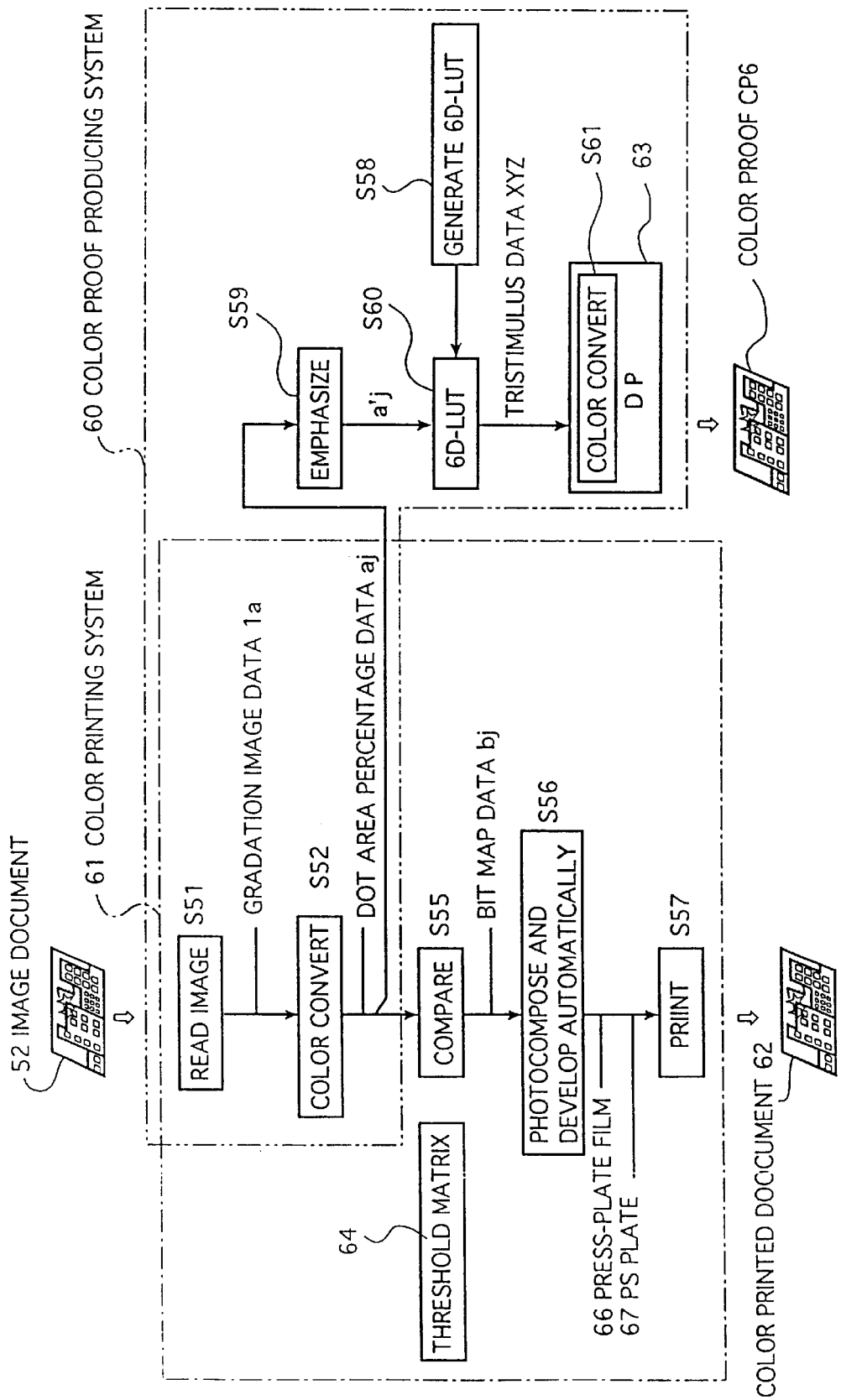
FIG. 16 is a flow chart showing a system of producing color proofs by implementing the second embodiment of the invention method of predicting and processing image fine structures, as well as the basic flow of a color printing system.

FIG. 16 is a flow chart showing a system of producing color proofs by implementing the second embodiment of the invention method of predicting and processing image fine structures, as well as the basic flow of a common color printing system. Those parts or steps shown in FIGS. 16–22 which correspond to those already described in connection with the prior art method of producing color proofs which is shown in FIG. 23 are identified by like numerals or symbols and will not be described below in detail unless required by special need.

Before describing a color proof producing system 60 for implementing the invention method of predicting and processing image fine structures, let us first provide a description of a color printing system 61 which generally uses a color printing machine to produce color printed documents.

In FIG. 16, reference numeral 61 signifies the composition of a common color printing system, in which the image on an image document 52 is read two-dimensionally with an image reader such as a color scanner having a CCD linear image sensor and gradation image data Ia are generated for each of the colors R (red), G (green) and B (blue) in step S51 (image reading step). The image sensor such as a CCD linear image sensor has a resolution (first resolution) Re1, which may be selected at about 400 dpi (dots per inch). One dot corresponds to one pixel, with pixels being generated by a density gradation process to produce multiple (e.g. 256) gradations.

The pixel data composing the RGB gradation image data Ia are then rendered by a color conversion process using conversion lookup tables or the like into dot area percentage data aj (also called "dot percentage data" or "original image pixel percentage data" as already noted in connection with the first embodiment) for the four plates of respective colors C (cyan), M (magenta), Y (yellow) and K (black) in step S52 (color conversion step). The color conversion process allows for various versions in relation to the color printing machine to be described later on and it is usually the proprietary know-how of individual printing companies who employ different color printing machines. If UCR (undercolor removal) process is not to be performed, the RGB gradation image data Ia may be converted to dot area percentage data aj for the three plates C, M and Y. Needless to say, if Y color is not to be reproduced on a color printed document 62, the RGB gradation image data Ia suffices to be converted to dot area percentage data aj for the two plates C and M.

After step S52, the dot area percentage data aj for the four plates CMYK which were generated pixel for pixel are converted into bilevel data (taking either "0" or "1"), or bit map data bj, by comparing the respective threshold values in the elements of four printing threshold matrices 64 (also called "threshold templates" or "dot templates") with the values of the dot area percentage data aj by means of a comparator (not shown), with reference being made to said threshold matrices which have a resolution (second resolution) Re2 of about 2000 dpi (for easy understanding, Re2=1600 dpi in the embodiment under discussion) and which have specified screen angles for the four plates CMYK (step S55: comparison step). Usually, the respective threshold matrices 64 have differences in screen angle, as exemplified by a 45° difference between the threshold matrix for Y plate and that for M plate. In practice, the four plates CMYK have screen angle differences of 75°, 45°, 0° and 15° with respect to the reference (provided by plate Y).

Figure 17:
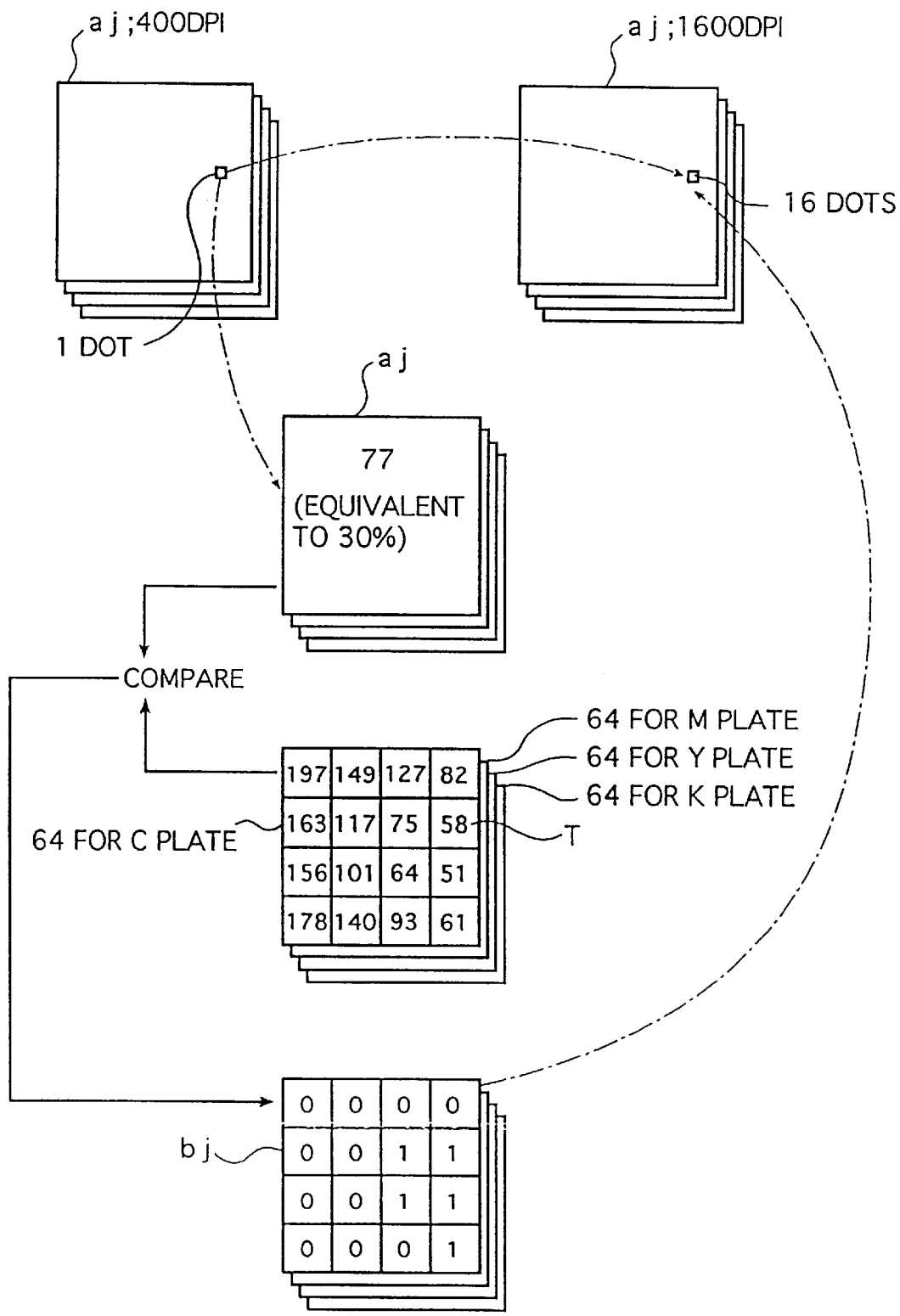
FIG. 17 is a diagram to which reference may be had in explaining the process of generating bit map data in the color printing system shown in FIG. 16.

FIG. 17 is a diagram which provides a schematic representation of threshold matrices 64 and so forth in order to give details about the comparison to be made in step S55 (for generating bit map data). The two diagrams in the top of FIG. 17 illustrate the conversion of one dot in the dot area percentage data aj of 400 dpi into 16 dots in the bit map data bj of 1600 dpi.

Suppose here that one dot in the dot area percentage data aj belongs to plate C and also suppose that the dot area percentage data aj which are represented in 256 gradations assume a value of 77 (this corresponds to 30% but in the case of comparison process, aj is usually represented in gradations and takes an integral value such as 77); then, this value of aj is compared with the threshold matrix 64 for C plate. The threshold matrix 64 is typically composed of threshold values T arranged convolutionally in the matrix elements as shown in FIG. 17. The threshold matrix 64 has no direct bearing on the present invention, so it will not be described here in any greater details; it suffices here to say that the threshold matrix 64 is a hypothetical entity which is reconstructed from an extracted portion of either threshold values T corresponding to one dot, said threshold values taking 8-bit gradations (0, 1, 2, ... 254 and 255) and being arranged convolutionally from the center outward, or a supercell (e.g. one threshold corresponding to 9 dots).

Further referring to FIG. 17, generation of bit map data bj, or conversion of the values of dot area percentage data aj into bilevel data, is carried out by a well-known technique in accordance with the following equations (41) and (42):

$$aj \geq T \rightarrow 1 \quad (41)$$

$$aj < T \rightarrow 0 \quad (42)$$

Thus, as shown in the bottom of FIG. 17, bit map data bj are generated which correspond to one pixel of interest in plate C (i.e., the pixel for which the dot area percentage data aj is 30%). As already mentioned, the threshold matrices 64 for plates M, Y and K have screen angles selectable with respect to the threshold matrix 64 for plate C.

On the basis of the thus generated bit map data bj, the necessary processes are performed with a photocomposing machine, an automatic developing machine, and so forth in step SS6 (platemaking step) so as to prepare four processplate films 66 having halftone images and serving as camera-ready copies, as well as PS plates 67 (also called "press plates").

Finally, using the press plates 67, a printed color document 62 composed of a halftone image is produced with a color printing machine having rotary presses in step S57 (printing step).

The halftone image on the printed color document 62 has moiré, a rosette image and other image fine structures which appear on account of the use of threshold matrices 64 having different screen angles.

This is how the color printing system is composed for producing color printed documents using a common printing machine.

We next describe the color proof producing system 60 implementing the invention method of predicting and processing image fine structures.

The color proof producing system shown in FIG. 16 (which is hereinafter referred to simply as "proof system") first requires that a position-dependent six-dimensional lookup table (hereafter abbreviated as "6D-LUT") for converting the CMYK dot area percentage data aj at a resolution of, say, 400 dpi into common color space data for predicting a rosette and other image fine structures with a continuous-tone printer, such as tristimulus data XYZ at a resolution of, say, 400 dpi should be prepared in advance in step S58 (6D-LUT preparing step). The proof system 60 then starts to produce printed color proofs through an image reading step (S51) and a color conversion step (S52); it shares both of these steps with the color printing system 61.

After the color conversion process S52, the dot area percentage data aj (400 dpi) are processed for prediction of (first) image fine structures such as moiré, whereby the amplitude of the image fine structures to be predicted is adjusted in step S59 (first image fine structure predicting and processing step, which is hereinafter also referred to as "moiré emphasizing step"; see the description of the method of predicting and processing image fine structures in accordance with the first embodiment of the invention). From step S59, there are outputted dot area percentage data a'j (having a resolution of, say, 400 dpi) which are emphasized in moiré and other first image fine structures and these data a'j are subjected to a process of predicting (second) image fine structures such as a rosette image by interpolation and like techniques using the position-dependent 6D-LUT, whereby a'j are converted to tristimulus data XYZ (400 dpi) on a common color space which are adjusted in the amplitude of the image fine structures to be predicted. This is step S60, or a second image fine structure predicting and processing step (which is hereinafter sometimes referred to as "rosette emphasizing step" or "6D-LUT processing step" as the case may be).

Finally, the tristimulus data XYZ (400 dpi) from the rosette emphasizing step S60 which have been emphasized in first image fine structures (e.g. moiré) and second image fine structures (e.g. rosette image) are supplied into a continuous-tone printer (digital color printer DP) 53, where they are converted to output device (DP 53) dependent three primary RBG data (having a resolution of, say, 400 dpi) on the basis of a color conversion lookup table (not shown) or the like (step S61, or color conversion process). On the basis of the color converted three primary data having the output resolution (400 dpi), DP 53 outputs a color proof CPb.

The thus obtained color proof CPb not only provides a faithful reproduction of moiré, rosette and other image fine structures that would appear in the printed color document 62 produced with the color printing machine but also reproduces colors that match the colors in the printed document; therefore, CPb is an accurate proof of the printed color document.

The preparation of 6D-LUT in step S58 is the most characterizing portion of the second embodiment of the invention. The present inventors already proposed in Unexamined Published Japanese Patent Application (kokai) Hei 8-192540 a method of producing color proofs which takes much time in processing but which is capable of accurate simulation of image fine structures that would appear in printed documents. According to the second embodiment of the present invention, the mathematical operations for predicting image fine structures that are performed in the proposed method are applied to representative colors and the results of such operations are stored in the position-dependent 6D-LUT; in the actual preparation of a color proof, said mathematical operations are not performed but the position-dependent 6D-LUT is applied to the halftone image (area percentage) data obtained from the original image and the necessary interpolation is effected to ensure the same result as will be obtained by performing said mathematical operations on those halftone image data from the original image. As a consequence, the calculation time that is actually taken by the method of the present invention is no longer than what is required by interpolation from 6D-LUT and, hence, a substantial time reduction is realized in comparison with the data processing technology for depicting image fine structures as proposed in Unexamined Published Japanese Patent Application (kokai) Hei 8-192540 (which technology is hereinafter referred to simply as "basic (data) processing technology").

Figure 18:
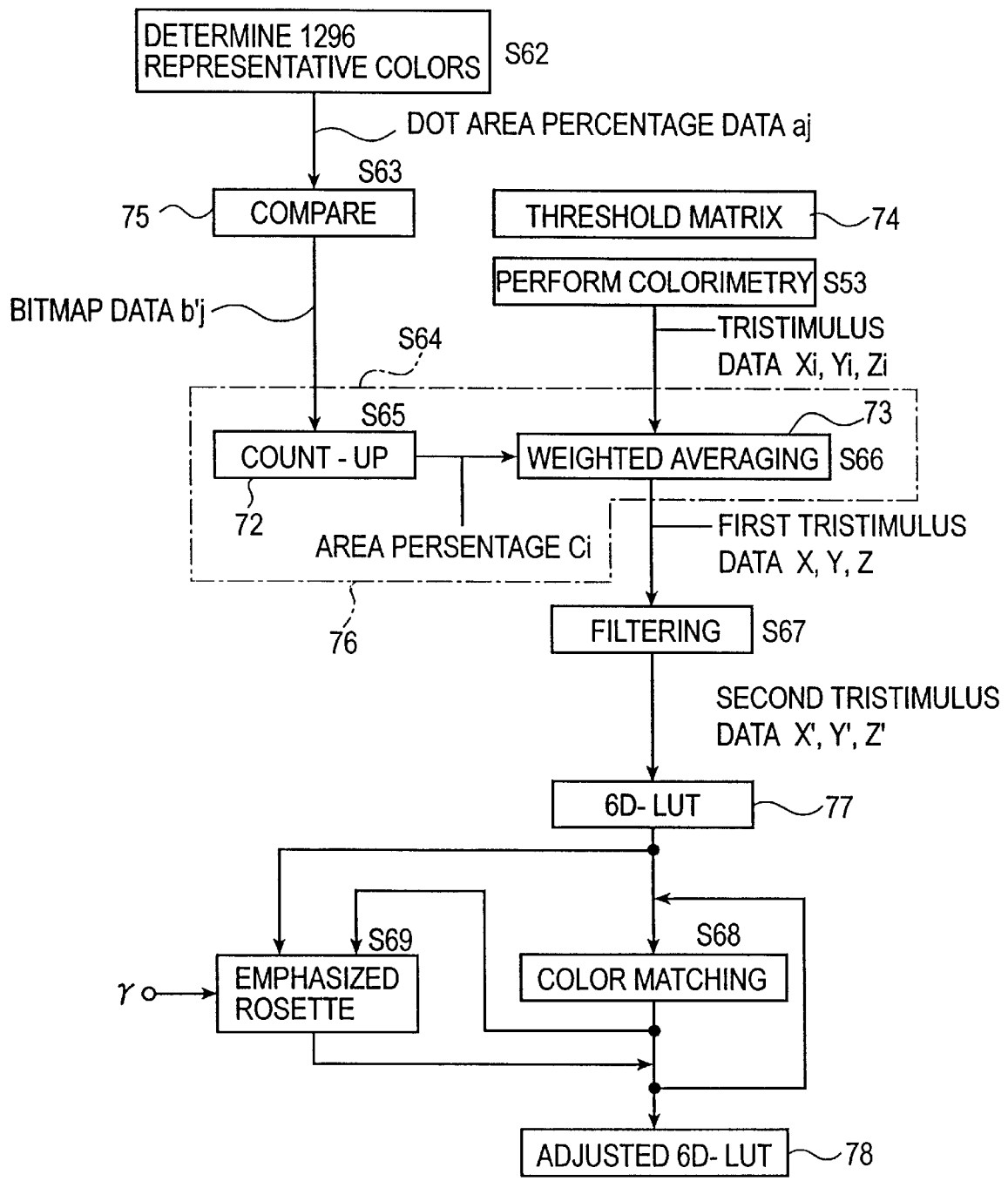
FIG. 18 is a flow chart showing the basic flow of an exemplary process of generating a six-dimensional lookup table in the system of producing color proofs which is shown in FIG. 16.

Therefore, it is necessary for the method of the invention to prepare 6D-LUT prior to the production of a color proof from the original image. FIG. 18 shows an example of the flow of the preparation of 6D-LUT in step S58 according to the characterizing feature of the invention. The first step of the flow is to determine representative colors to which the basic data processing technology is to be applied: n colors (plates) including at least three primaries are set; in the case under consideration, four (n=4) colors (plates) CMYK are set and each is divided in N stages, for example, 6 stages, whereby a total of $N^n$ colors are determined (in the illustrated case, $6^4$=1296 colors are determined). This is step S62 for determining representative colors. Since the image data on which the 6D-LUT is allowed to act are dot area percentage data aj (%), the dot area percentage data for the respective N stages of each of the tour colors CMYK consist of 0%, 100/(N−1), 2×100/(N−1), . . . , (N−2)×100/(N−1) and 100%; if N=6, the corresponding data are 0%, 20%, 40%, 60%, 80% and 100%. The following description assumes that each of colors (plates) CMYK is divided into 6 stages.

In the method of the invention, a rational number screen is used in the halftoning step in the basic data processing technology. This is because a rational number screen ensures that a repeated pattern of second image fine structures such as a rosette image can be rendered into the repetition of $m_r \times n_r$ rectangular blocks (pixels) in the rational number screen as in the case of simulating first image fine structures such as moiré. Symbols $m_r$ and $n_r$ represent the size of the rational number screen in terms of a certain resolution, say, 400 dpi. As a result, recording $m_r \times n_r$ data files ($m_r \times n_r$ representing the repeated screen unit size or pixel size) enables the shape of a rosette image to be represented for the screens on all spaces. This is how the size of 6D-LUT is determined.

Accordingly, the basic data processing technology is applied to $N^n$ (=1296) monochromatic images each having a size comparable to $m_r \times n_r$ rectangles such that the halftoning process is performed using a screen having a period of $m_r \times n_r$. To give a specific example, if a printed document having a halftone image created with a screen ruling of 175 using Y, C, M and K plates having respective screen angles of 0, 15, 45 and 75 degrees is to be simulated on a continuous-tone printer of 400 dpi, the required repeating screen unit size ($m_r \times n_r$) is 43×43.

The six-dimensional lookup table (6D-LUT) prepared by the above-described procedure has the following parameters as arguments: the coordinates (x,y) of the positions of the pixels in the 1296 monochromatic original images (x between 0 and $m_r$−1 and y between 0 and $n_r$−1) and the number of stages (or steps) of each of the colors CMYK; hence, 6D-LUT may be expressed as 6DLUT[i] [j] [k] [y] [m] [c] and relevant color data, for example, tristimulus data XYZ are assigned to respective values of this expression.

In the stated expression, i=0–42, j=0–42, c=0–5, m=0–5, y=0–5, and k=0–5, i representing the x coordinate of the original image, j representing the y coordinate of the original image, and k, y, m and c representing the number of steps of the plates K, Y, M and C, respectively; step numbers of 0, 1, 2, 3, 4 and 5 correspond to 0%, 20%, 40%, 60%, 80% and 100%, respectively. It should be noted here that assuming N gradation levels, the MNth step is generally expressed by M×100/(N−1) (%) (where $M_N$ is between 0 and N−1).

In order to determine tristimulus data XYZ corresponding to 6DLUT[i][j][k][y][m][c], the basic data processing technology to be described below (for details, see Unexamined Published Japanese Patent Application Hei 8-192540) is applied to one of the 1296 monochromatic images, thereby providing tristimulus data XYZ for the coordinates of the positions of 43×43 corresponding pixels at a repeating size of 43×43.

For better understanding of the basic data processing technology, let us first describe an anti-aliasing filtering process shown as step S67 in FIG. 18.

When a color proof CPb is produced at a resolution of Re3 (being the resolution of DP 53, Re3 is also called the "third resolution" or "output resolution" and set at 400 dpi in the case under consideration), aliasing noise will occur on account of Re3. The anti-aliasing filtering process is inserted to preclude the generation of such aliasing noise. For effective performance of the anti-aliasing filtering process, the resolution (fifth resolution or Re5) of the image data which is the original signal to be processed with an anti-aliasing filter must be higher than Re3 (=400 dpi) which is the resolution of DP 53. In the case under consideration, Re5 or the fifth resolution (which may also be called the "intermediate resolution") is set at 1600 dpi.

The matrix of the anti-aliasing filter (which is a square matrix of n×n elements) is first considered. If the image data having a resolution of 1600 dpi (=Re5) are to be converted to image data having a resolution of 400 dpi (=Re3), a minimum number of elements in a filter having no anti-aliasing capability is 4×4 since one dot (pixel) of 400 dpi corresponds to 16 dots (4×4 pixels) of 1600 dpi.

For minimizing the aliasing noise, the anti-aliasing filter desirably has the greatest number of elements but limiting factors are the computing speed, hardware and so forth.

As will be understood by analogy from the reproducibility of color information by the Naugebauer's equation, the anti-aliasing filter must have such frequency characteristics that the smallest possible insertion loss will occur at frequencies in the neighborhood of the dc component and this is in order to satisfy the need for passing comparatively low-frequency components including the dc component. Therefore, the anti-aliasing filter should ideally have a response of 0 dB at the center of the matrix.

On the other hand, interference fringe components such as moiré [i.e., those components having a frequency not higher than one half the screen frequency (screen ruling) component] should altogether remain intact after the anti-aliasing filtering process.

In addition, if the anti-aliasing filter has sharp attenuation characteristics, a new peculiar pattern will appear after the anti-aliasing filtering process. This possibility must also be considered in designing the anti-aliasing filter.

FIG. 19 shows the structure of an anti-aliasing filter AF composed of 9×9 elements which is constructed incorporating all of the above-mentioned design considerations. If the elements of the filter AF are represented by d(i,j), the values of the individual elements d(i,j) (also referred to as "filter coefficients"), when added together, must amount to a total of 1.0. To meet this requirement, the actual value of each element d(i,j) is divided by the total sum of the elements d(i,j) $\{=\Sigma_{i=-4}^{4}\Sigma hd\ j=-4^{4}d(i,j)\}$. As will be apparent from FIG. 19, the filter coefficients of the thus composed anti-aliasing filter AF are arranged such that its frequency characteristics provide a bell-shaped attenuation pattern characterized by monotonic decrease from the center outward.

Figure 20:
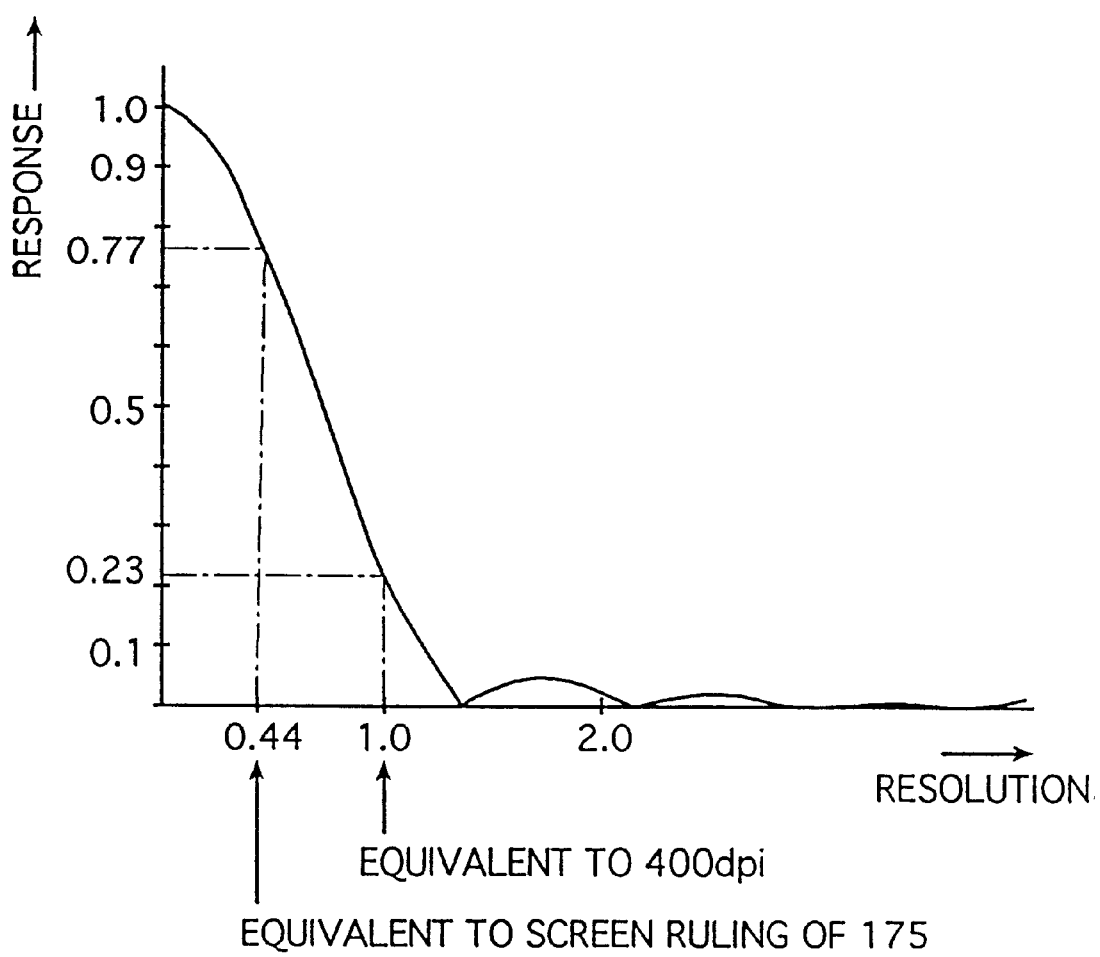
FIG. 20 is a diagram showing the frequency response of the anti-aliasing filter shown in FIG. 19.

FIG. 20 shows the frequency characteristics of the anti-aliasing filter AF. The horizontal axis of the graph in FIG. 20 plots resolution such that the resolution of DP 53 (Re3 =400 dpi) is standardized to 1.0. Hence, the screen ruling of 175 which represents the screen frequency is standardized to a value of 0.4 (175/400). The vertical axis of the graph in FIG. 20 plots the response of the filter AF and the value of 121 which is assumed by the central element d(5,5) in FIG. 19 is standardized to 1.0.

As will be understood from FIG. 20, the filter AF shown in FIG. 19 has a response of about 0.23 at the resolution of 1.0 and a response of about 0.77 at the resolution 0.44.

According to the result of analyses of various cases, an anti-aliasing filter having a response of at least 0.5 (50%) when the resolution was equal to the screen frequency (=screen ruling) and a response of no more than 0.3 (30%) when the resolution was 1.0 (the resolution of color digital printer DP 53) could ensure that moiré and other peculiar patterns which would appear in the color printed document 62 were reproduced on the color proof CPb while suppressing any aliasing noise to a visually unrecognizable level.

The foregoing is the description of the composition of the matrix of the anti-aliasing filter AF, which, in the case under consideration, is a square matrix consisting of n×n (=9×9) elements.

The anti-aliasing filtering process in step S67 produces image data (non-device dependent image data) on a common color space at a resolution of 400 dpi (=Re3) which, in the case under consideration, are tristimulus data X, Y, Z (also called "second tristimulus data X', Y', Z'").

The image data (tristimulus data X, Y, Z) which are to be processed with the anti-aliasing filter AF are set to have a resolution of 1600 dpi and one dot in said image data is not of bilevel data but of image data on a common color space which, in the case under consideration, is tristimulus data X, Y, Z (which may also be called "first tristimulus data").

In order to produce the first tristimulus data X, Y, Z without using the Naugebauer's equation, the dot area percentage data aj for 43×43 pixels in a monochromatic image of one of the 1296 colors produced in the representative color determining step S62 are compared with the threshold values in the threshold matrices 74 (which may also be called "threshold templates" or "dot matrices" by means of a comparator 75 and converted to bilevel bit map data b'j having a higher resolution than the printing bit map data bj (=1600 dpi) (step S63).

The threshold matrices (or templates) 74 for use in step S63 are rational number screen templates. For reproduction of moiré and other image fine structures, it is essential that the screen ruling for the threshold matrices 74 be the same as the screen ruling used in printing. In the case under consideration, the threshold matrices 74 are designed to have a screen ruling of 175. In order to provide high resolution, the threshold matrices 74 for creating halftone dots each consist of 256×256 (=65536) elements. The threshold T in each of the elements may typically take either one of the values ranging from 0 to 255. The thus generated bit map data b'j for the four plates CMYK have a resolution (fourth resolution: Re4) of 44800 (=256×175) dpi.

In order to convert the bit map data b'j of 44800 dpi into the first tristimulus data X, Y, Z at a resolution (Re5) of 1600 dpi, one may convert 28×28 dots in the bit map data b'j into one dot in the first tristimulus data X, Y, Z. A data processing section 76 is provided for effecting such conversion (step S64).

Figure 21A:
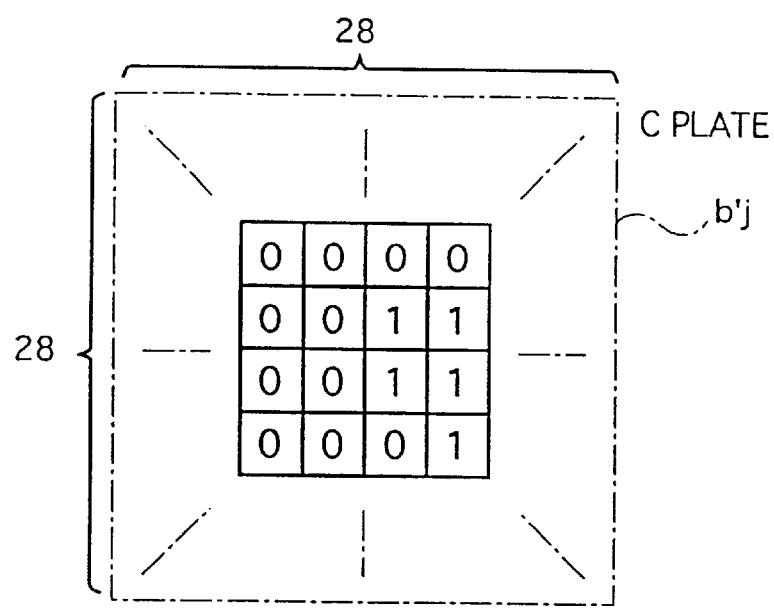
FIG. 21A is a diagram showing exemplary bit map data of 28×28 dots for C plate, to which reference may be had in explaining how average calorimetric data are generated from bit map data of comparatively high resolution in the process of generating a six-dimensional lookup table as shown in FIG. 18.
Figure 21B:
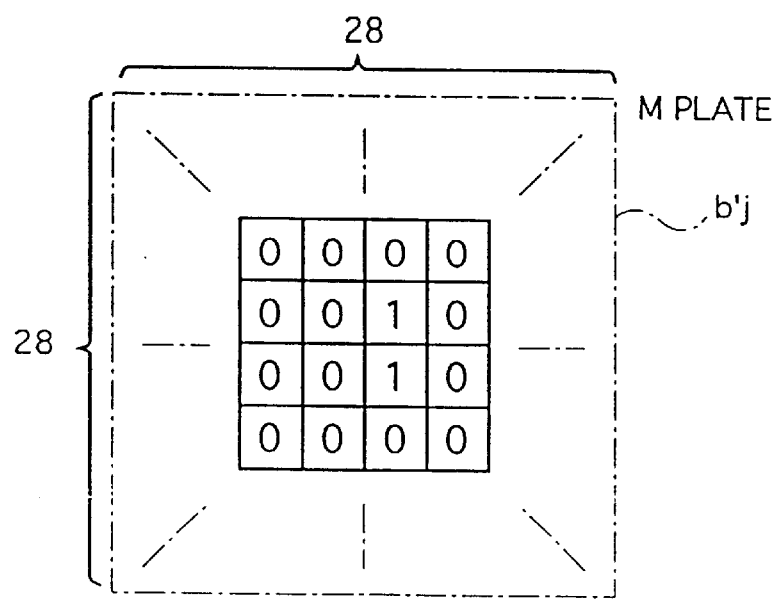
FIG. 21B is a diagram showing exemplary bit map data of 28×28 dots for M plate.

Step S64 will be better understood by referring to FIG. 21A which shows 28×28 dots in the bit map data b'j for C plate and to FIG. 21B which shows 28×28 dots in the bit map data b'j for M plate. All elements that are not shown in FIGS. 21A and 21B are assumed to take value "zero". It is also assumed that all elements of the remaining bit map data b'j for Y and K plates take value "zero".

For the 28×28 dots, simultaneous reference is made to the bit map data b'j for the four plates CMYK (needless to say, the bit map data b'j for the two plates C and M will suffice in the case under consideration) and the area percentage ci is counted up for each of the colors of interest (which are 24 in number since there are four plates to be processed) in a count-up section 72. This is step 65 (count-up step).

For the pixels (corresponding to 28×28 dots) which are shown in FIGS. 21A and 21B, the area percentage ci is calculated as follows for the respective colors:

Color C: ci =$c_c$=3/784

(where $c_c$ represents the area percentage of an area where only color C is present when C and M plates are superposed and viewed under transmitted light and an area where colors C and M overlap is represented by area percentage $c_{C+}$M of color B (=C+M);

Color C+M: $c_{C+M}$=2/784

Color W; $c_W$=779/784

(this parameter represents the area percentage of an area where neither of colors C and M are present when C and M plates are superposed and viewed under transmitted light).

The remaining colors (i.e. 13 colors including Y and K) have an area percentage ci of zero. Thus, the first tristimulus data X, Y and Z of 1600 dpi are generated.

In step S53, calorimetric data Xi, Yi, Zi for respective colors (i represents $2^4$=16 colors for the four plates CMYK) were preliminarily measured by the process described in detail in the Prior Art section of this specification (i.e., using a calorimeter to measure 16 solid colors printed on the color document 12). After step S65, the calorimetric data Xi, Yi, Zi are subjected to weighted averaging in a section 73 using as weight coefficients those values of area percentage ci which were counted up color for color in step S65, whereby the first tristimulus data X, Y, Z which represent mean calorimetric values are determined in accordance with the following equations (43) (step S66). Briefly, the calorimetric data Xi, Yi, Zi are subjected to weighted averaging with color-dependent values of area percentage ci so as to determine the first tristimulus data X, Y, Z:

$$X = \sum ci \cdot Xi \quad (43)$$
$$= (3/784)X_C + (2/784)X_{C+M} + (779/784)X_W$$
$$Y = \sum ci \cdot Yi$$
$$= (3/784)Y_C + (2/784)Y_{C+M} + (779/784)Y_W$$
$$Z = \sum ci \cdot Zi$$
$$= (3/784)Z_C + (2/784)Z_{C+M} + (779/784)Z_W$$

By performing both the count-up process (step S65) and the weighted averaging process (step S66) for each group of 784 (=28×28) dots over the entire range of the bit map data b'j, the first tristimulus data X, Y, Z of 1600 dpi are obtained.

The thus obtained first tristimulus data X, Y, Z of 1600 dpi are then processed with the above-described anti-aliasing filter AF to generate the second tristimulus data X', Y', Z' at 400 dpi which is equal to the resolution of DP 53 (step S67).

Figure 9:
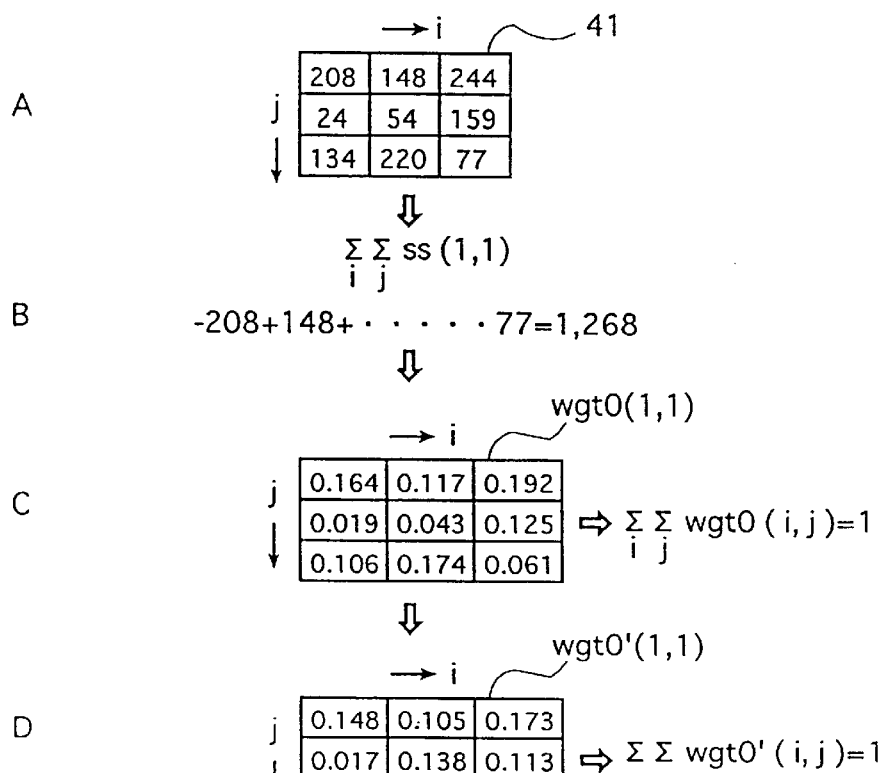
FIG. 9 is a diagram showing a specific example of the weighted averaging step in the invention method of predicting and processing image fine structures.
Figure 22A:
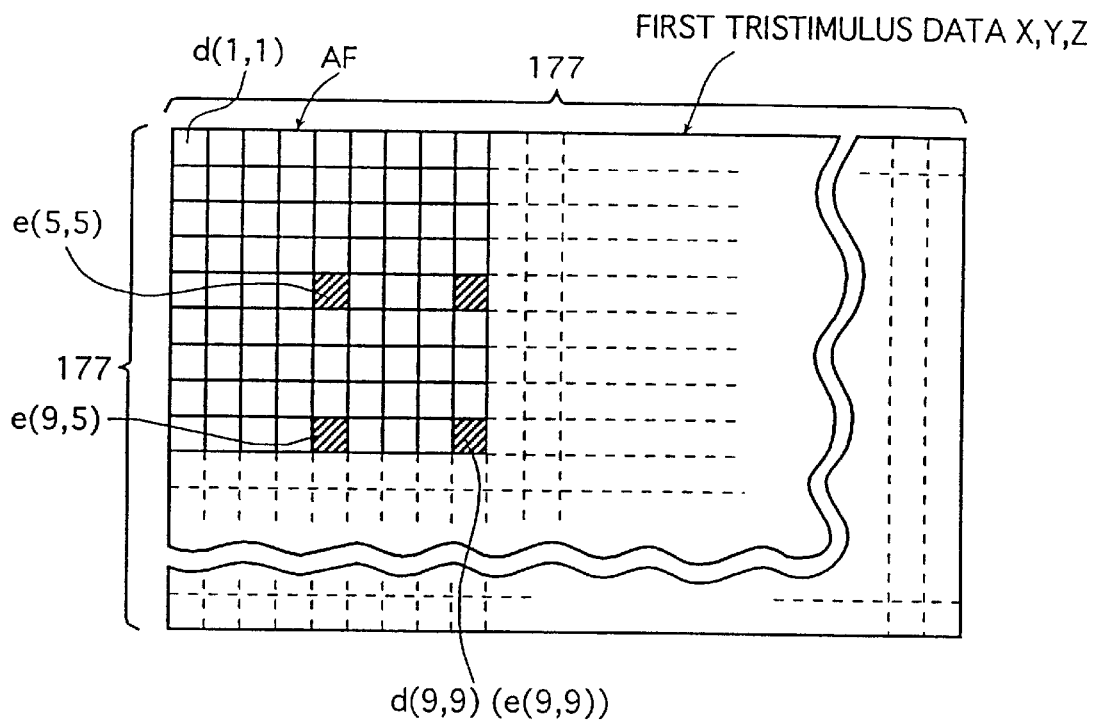
FIG. 22A is a diagram showing the first processing step of average calorimetric data with an anti-aliasing filter in the process of generating a six-dimensional lookup table as shown in FIG. 18.
Figure 22B:
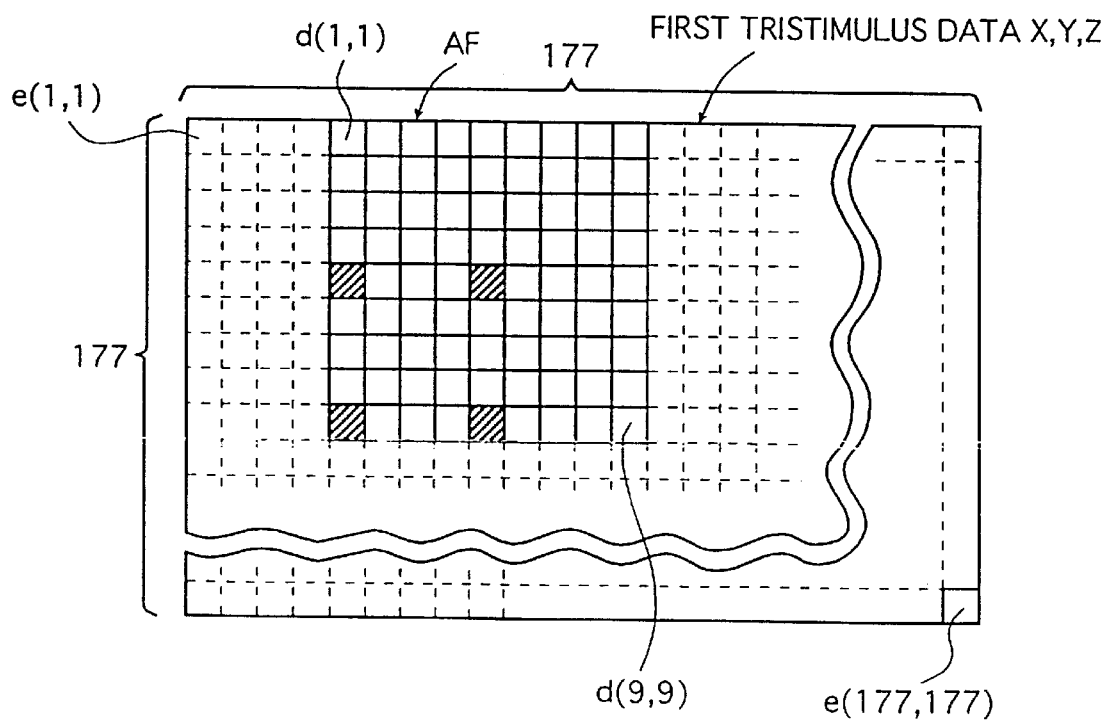
FIG. 22B is a diagram showing the next processing step.
Figure 23:
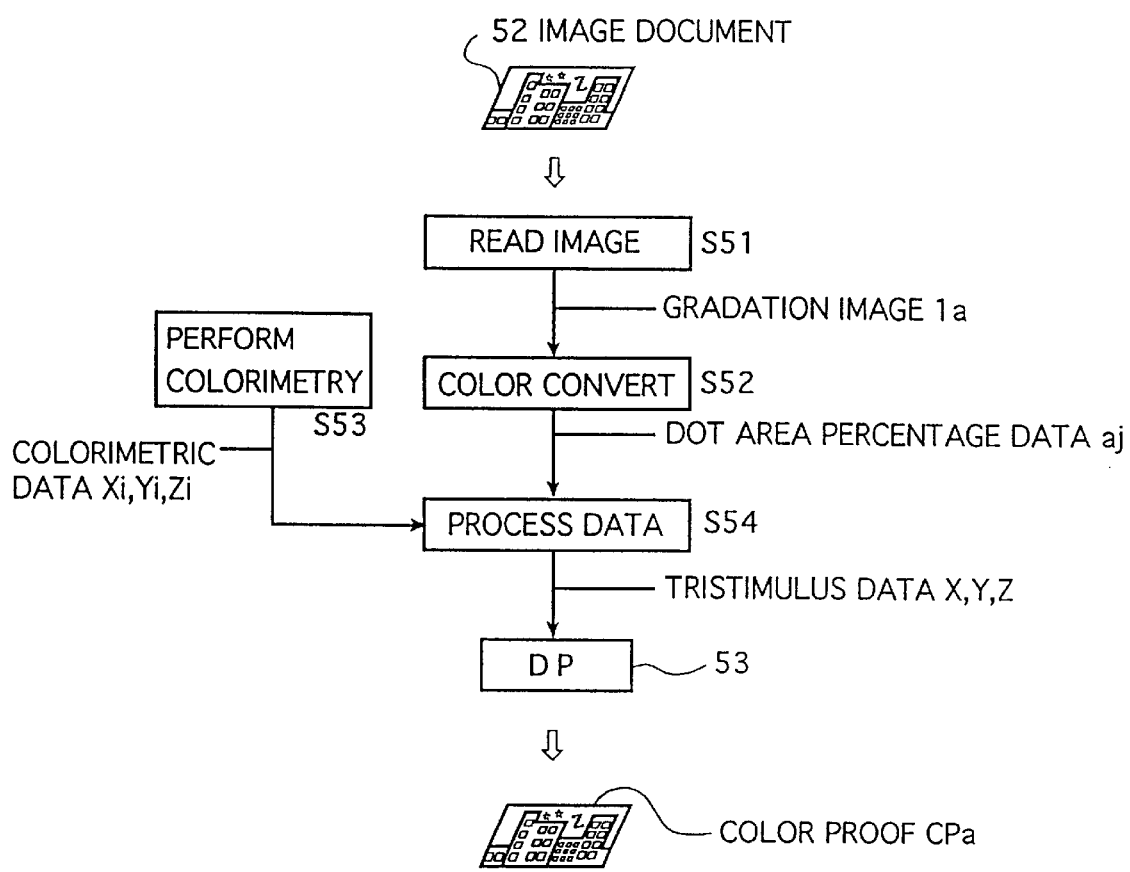
FIG. 23 is a flow chart of a conventional system of producing color proofs.

FIGS. 22A and 22B are diagrams illustrating how the first tristimulus data X,Y,Z are processed with the anti-aliasing filter AF. As shown in FIG. 22A, 9×9 dots in the top left portion of the first tristimulus data X,Y,Z of 1600 dpi which are centered at the pixel element e(5,5) are brought into correspondence with the anti-aliasing filter AF of a 9×9 matrix (see FIG. 19) of which the elements are represented by d(k,l) and all the elements of the matrix are multiplied by the corresponding dots and the total sum of the products is determined to perform the anti-aliasing filtering process, thereby yielding element e(1,1) of the second tristimulus data X',Y',Z' of 1600 dpi. Stated specifically, if the position of the central element in the 9×9 dots is written as (i',j') and the respective elements of the first tristimulus data X,Y,Z as e(i',j',k,l) (where k and l are between −4 and 4 for each of X, Y and Z), then $\Sigma_{l=-4}^{4}\Sigma_{l=-4}^{4}\{d(k,l)\times e(i',j',k,l)\}$ is determined for each of the first tristimulus values X, Y and Z and the respective values are used as the second tristimulus data X', Y', Z' at a resolution of 400 dpi. As already noted, the total sum for the anti-aliasing filter is standardized to $\Sigma_{l=-4}^{4}\Sigma_{l=-4}^{4}d(k,l)=1$ (k and l are each between −4 and 4). Alternatively, to dispense with the prolonged calculations that are necessary to perform multiplications of numbers containing decimal fractions, the values of the individual elements of the anti-aliasing filter AF may be used unchanged from the data shown in FIG. 19 and written as d'(k,l) so that $\Sigma_{l=-4}^{4}\Sigma_{l=-4}^{4}\{d'(k,l)\times e(k,l)\}/\Sigma_{l=-4}^{4}\Sigma_{l=-4}^{4}d'(k,l)$ (k',l=−4~4) is determined as the value obtained by processing with the anti-aliasing filter AF.

The purpose of the anti-aliasing filtering process is to convert the first tristimulus data X,Y,Z of 1600 dpi to the second tristimulus data X',Y',Z' of the lower resolution 400 dpi, so a second cycle of the anti-aliasing filtering process may be carried out with the anti-aliasing filter shifted by four dots of the first tristimulus data X,Y,Z either horizontally to the right as shown in FIG. 22B or vertically downward. By successively applying the anti-aliasing filter AF in this manner, the resolution (1600 dpi) of the first tristimulus data X,Y,Z can be lowered to produce the second tristimulus data X',Y',Z' of 400 dpi. Suppose here that the individual elements of the second tristimulus data X',Y',Z' of 400 dpi are expressed by e'(i+1, j+1), with (i+1, j+1) representing their position coordinates (i and j are each between 0 and 42); also suppose that the elements of a 9×9 dot portion of the first tristimulus data X,Y,Z of 1600 dpi which correspond to said elements and which are to be processed with the anti-aliasing filter AF of a 9×9 matrix are expressed by e(i',j',k,l), with (i',j') representing the positional coordinates of the central element and (k,l) representing the respective positions of the 9×9 dots (k and l are each between −4 and 4); further assume that the individual elements of the anti-aliasing filter AF of a 9×9 matrix are expressed by d(k,l) where k and l are each between −4 and 4. Based on these assumptions, i'=4i+5 and j'=4j+5 and, hence, the following equation (44) holds:

$$e'(i+1, j+1) = \Sigma_{k=-4}^{4}\Sigma_{l=-4}^{4} d(k,l) \times e(i',j',k,l) = \Sigma_{k=-4}^{4}\Sigma_{l=-4}^{4} d(k,l) \times e(4i+5, 4j+5, k, l) \quad (44)$$

If the individual elements e'(i+1, j+1) of the second tristimulus data X',Y',Z' are determined by applying the equation (44) to 43×43 elements of the repeating units (or repeating size) where i and j each range from 0 to 42, a lookup table can be determined for one monochromatic image (such as one where K=20·k0%, Y=20·y0%, M=20·m0% and C=20·c0%), with the lookup table being typically expressed as 6DLUT[i] [j] [k0] [y0] [m0] [c0]. By determining such lookup table for the 1296 monochromatic images, one can construct 6DLUT[i] [j] [k] [y] [m] [c], where i and j are each between 0 and 42, and k, y, m and c each between 0 and 5.

Thus, tristimulus data XYZ of low resolution (equivalent to the output resolution of 400 dpi) can be obtained by applying the basic data processing technology of Unexamined Published Japanese Patent Application (kokai) Hei 8-192540 to 1296 colors, with the calculations being based on the size of $m_r \times n_r$ pixels. The lookup tables indicated as 6D-LUT 77 in FIG. 18 have been constructed by storing such tristimulus data XYZ in correspondence with the 1296 colors. If it is desired to further enhance the precision of colors or adjust the contrast of rosette and other image fine structures, the 6D-LUT 77 is preferably subjected to the following two post-processing steps.

As shown in FIG. 18, 6D-LUT is subjected, either direct or after applying the second post-processing step to be described later, to color matching (the first post-processing step S68). In the color matching step S68, the average of each of the 1296 colors for 43×43 regions is adjusted to the desired color. To ensure matching of each color to the desired color, this step S68 shall be performed on all pixels in the 43×43 regions for the 1296 colors. Processing in this step is done with all colors (1296 colors) taken as a group and 1296 cycles of processing are performed in succession. The color matching step S68 consists of the following two stages:

(Stage one) The results of application of the 6D-LUT to the respective colors are output on a proof printer. The output colors are measured with a calorimeter, which outputs Xout, Yout and Zout.

(Stage two) Mathematical operations are performed on the respective colors in accordance with the following equations (45) to ensure that each color as averaged for 43×43 regions matches the desired color. If colors at certain points in the 43×43 regions are written as Xi, Yi and Zi (i is between 1 and 43×43), the results of processing as Xi', Yi' and Zi' (i is between 1 and 43×43), and the desired colors as Xa, Ya and Za, the following equations (45) will hold:

$$Xi'=(Xi/Xout) \times Xa$$

$$Yi'=(Yi/Xout) \times Ya$$

$$Zi'=(Zi/Xout) \times Za \quad (45)$$

Substituting the thus obtained tristimulus data X',Y',Z' for the tristimulus data stored in 6D-LUT 77 yields adjusted (color matched) 6D-LUT 78. Using the adjusted (color matched) 6D-LUT 78, one can produce color proofs which are high not only in the fidelity of reproduction of moiré and other image fine structures but also in the precision of color reproduction.

As also shown in FIG. 18, 6D-LUT is subjected, either direct or after applying the first post-processing step, to rosette emphasis step (the second post-processing step S69). This is the step of emphasizing the contrast of image fine structures such as rosette. As in color matching step S68, the mathematical operations to be performed in the step S69 apply to 43×43 pixels for the 1296 colors and processing, which is done with all colors taken as a group, is performed through 1296 successive cycles. The rosette emphasis step S69 consists of the following two stages:

(Stage three) Each color is first averaged for the 43×43 regions. If the individual colors are written as Xi',Yi',Zi' (i represents a point somewhere in the 43×43 regions), the averages Xave, Yave and Zave are expressed by the following equations (46):

$$Xave=(\Sigma Xi')/(43 \times 43)$$

$$Yave=(\Sigma Yi')/(43 \times 43)$$

$$Zave=(\Sigma Zi')/(43 \times 43) \quad (46)$$

where $\Sigma$ means the sum of additions, with i' ranging from 1 to 43×43.

(Stage four) Then, for individual colors Xi',Yi',Zi', the distances from the averages Xave, Yave, Zave are increased, with the respective averages being taken as central values. The results of the processing, Xi", Yi" and Zi", are expressed by the following equations (47):

$$Xi"=Xave \times \{(Xi'/Xave)^\gamma\}$$

$$Yi"=Yave \times \{(Yi'/Yave)^\gamma\}$$

$$Zi"=Zave \times \{(Zi'/Zave)^\gamma\} \quad (47)$$

where i is between 1 and 43×43; $\gamma$ is the degree of rosette emphasis; and symbol "^" represents a mathematical operation of multiplying a number by itself a certain number of times; hence, A^$\gamma$ signifies that A is raised to the $\gamma$th power.

The degree of rosette emphasis $\gamma$ is not limited to any particular value; it ranges typically from 0.8 to 3.0 and the greater its value, the sharper the rosette image that has been emphasized. However, if $\gamma$ is increased, the result of its application is frequently such that Xi", Yi", Zi" will be converted to colors that are outside the range of color reproduction on the proof printer. To avoid this problem, $\gamma$ is preferably adjusted to a smaller value if the desired color Xa is outside or near the border of the range of color reproduction on the printer. Whether the result of rosette emphasis by raising to the $\gamma$th power will be within or outside the range of color reproduction on the printer can be verified by converting the tristimulus data XYZ to device-dependent data RBG which are dependent on the proof printer.

Calculations are then performed to determine how many of the colors in the 43×43 pixels deviate from the color reproduction range to what extent and the degree of rosette emphasis $\gamma$ is set to a new value such that the proportion of the deviating colors or the distance of deviation or the criterion for judgment based on these two factors will become lower than a certain limit, thereby reducing the amount by which the color averaged for the 43×43 pixels departs from the desired color.

If the post-processing step consists of either color matching (S68) or rosette emphasis (S69) alone, the adjusted 6D-LUT can be used to produce a color proof that features not only faithful reproduction of image fine structures such as moiré but also high precision in the adjustment of colors or rosette intensity. If the two post-processing steps S68 and S69 are performed in that order, each step once, not only is it possible to achieve faithful reproduction of moiré but also high color precision is ensured in addition to proper intensity adjustment of rosette.

If the two post-processing steps S68 and S69 are performed in that order, each step more than once, or if color-matching step S68 is repeated more than once after steps S68 and S69 are performed in that order, each step once, colors that are indefinitely close to those appearing in printed documents can be reproduced.

If the thus obtained six-dimensional lookup table 6DLUT [i] [j] [k] [c] [m] [y] is 6DLUT[1] [2] [3] [4] [5] [0], this entry of lookup table is loaded with tristimulus data XYZ of 400 dpi for a color that has image coordinates at (1,2) and which is characterized by 60% stage division of K plate, 80% for Y plate, 100% for M plate and 0% for C plate.

From the definition of the rational number screen, a color with having coordinates (x,y)=(47,91) and K,C,M,Y=(20%, 20%, 20%, 20%) is the same as the XYZ values recorded in the entry 6DLUT[4] [5] [2] [2] [2] [2]. Due to the use of a rational number screen of the size 43×43, the same color appears in every 43 pixels, so the data for the fourth pixel is the same as that for the 47th pixel. Generally speaking, data for a pixel of (x,y)=(i0,j0) are the same as data for a pixel of (x,y)=(i0%mr, j0%nr), where $m_r \times n_r$ is the size of a rational number screen expressed in terms of the resolution of the output device. Sign "%" means a residue calculation (i.e., a mathematical operation for yielding the remainder after division).

Described above is the procedure for providing 6D-LUT for representative colors before the production of actual color proofs is started. By referencing the thus provided 6D-LUT and performing interpolations, color proofs can be produced in a much shorter time than has been required in the prior art.

While the specific process of conversion by making reference to the 6D-LUT will be described below, it should be mentioned here that despite the advantage of shortening the process (calculation) time, the application of the 6D-LUT has the side effect of reducing the contrast of moiré compared to the basic data processing technology which performs the necessary mathematical operations on individual pixels. This has the potential for the failure to achieve faithful reproduction of moiré and other image fine structures. In the basic data processing technology, calculations are performed at a very fine resolution (1600 dpi) whereas in the method of the present invention, calculations are only performed on the basis of the pixels in the original image (having a resolution of 400 dpi) and the resulting loss of the high-frequency component of the interference between the original image and pictures (which is the cause of moiré) is believed to be responsible for the lower contrast of moiré.

However, increasing the density of pixels under calculation to 1600 dpi is not consistent with the need to shorten the calculation time. Alternatively, filtering is applied to emphasize image fine structures, particularly moiré, and after selectively emphasizing the moiré component of the original image, 6D-LUT is preferably applied. By adopting this compensation means, not only the first image fine structures such as moiré but also the second image fine structures such as a rosette image can be reproduced faithfully.

We next describe the step of emphasizing the first image fine structures such as moiré (this step indicated by S59 in FIG. 16 is hereunder referred to simply as "moiré emphasis step") In the moiré emphasis step S59, the dot area percentage data aj for the pixels in the plates (such as CMYK) from the image document which have been subjected to color conversion in step S52 are converted to dot area percentage data aj' which are emphasized in the first image fine structures such as moiré that would appear in a printed image in a manner dependent upon the combination of the screen ruling, screen angle and pictures or the like in the original image; the 6D-LUT which is the characterizing part of the second embodiment of the invention is then allowed to act on the resulting dot area percentage data aj'. For performing the conversion from aj to aj', weights for the values of the pixel to be converted (which is hereunder also called "pixel under calculation") and neighboring pixels are determined in a manner dependent on the period of grid units that is determined by the screen ruling LPI and the screen angle θ and the thus determined weights are adjusted by the coefficient of emphasis of moiré intensity α in such a way as to produce the first image fine structures such as moiré that occur at an intensity associated with the type of the printing machine which is to output the printed image, and the dot area percentage data aj are subjected to weighted averaging with the adjusted weights.

Therefore, moiré emphasis step S59 in the method of predicting and processing image fine structures according to the second embodiment of the present invention can be performed by applying the method of predicting and processing image fine structures according to the first embodiment already described above. Briefly, the moiré emphasis step S59 in the second embodiment can be performed in entirely the same manner as processing is effected in the image fine structure predicting and processing block 22 in the image fine structure predicting system 11 shown in FIG. 1, except that the original image I and the area percentage data with emphasized image fine structures I' are replaced by dot area percentage data aj and the area percentage data with emphasized image fine structures aj'. Hence, the moiré emphasis step S59 in the second embodiment of the invention will not be described any further.

The dot area percentage data aj' from step S59 which are the image data with the moiré intensity adjusted by moiré emphasis in that step are then sent to step S60, where they are processed with the 6D-LUT to be emphasized in the second image fine structures such as rosette.

We now describe the processing with 6D-LUT which is to be performed in step S60 (for rosette emphasis). As shown in FIG. 16, step S60 of processing with 6D-LUT is the step of predicting (simulating) the second image fine structures in such a way that the dot area percentage data a'j (j=CMYK) which have been adjusted in the first image fine structures such as moiré in the moiré emphasis step S59 are subjected to interpolation with the 6D-LUT preliminarily provided in step S58, whereby they are converted to tristimulus data XYZ on a common color space which allow rosette and other second image fine structures to be reproduced and emphasized while leaving moiré and other first image fine structures intact as they were reproduced emphasized in step S59. Subscript j in a'j which represents the emphasized dot area percentage data signifies CMYK and should be distinguished from the same character used in expressing position coordinates (i,j). Hence, symbol "$j_a$" is substituted in the following description.

The method of using the 6D-LUT is not limited to any particular type and as in the case where, in other fields, LUTs are used to produce images of the same appearance with different devices (e.g., a CRT monitor and a printer) or from different media (e.g., digital scanner data and printer data), various techniques including volume interpolation, linear interpolation and area interpolation may be employed. In the present invention, a four-dimensional space comprising the four colors (plates) CMYK is to be interpolated and this may be considered as an extension of either one of the following three cases: linear interpolation of a one-dimensional space; area interpolation of a two-dimensional space; and volume interpolation of a three-dimensional space. Hence, a four-dimensional quantity which is equivalent to the volume in a three-dimensional space is defined as a four-dimensional volume in a four-dimensional space. The following discussion assumes as a representative case the interpolation of a four-dimensional space using the four-dimensional volume.

The case to be discussed below is where the KYMC values at coordinates (i1,j1) are k, y, m and c, respectively. In this case, k is between k0 and k1, y is between y0 and y1, m is between m0 and m1, and c is between c0 and c1; k0, y0, m0 and c0, as well as k1, y1, m1 and c1 are all such that they refer to either one of the N stages into which each of the plates KYMC is divided (in the case of division into 6 stages, either one of 0, 20, 40, 60, 80 and 100% is referred to); k1, y1, m1 and c1 are one stage higher than k0, y0, m0 and c0, respectively (take k as an example; if k0 is 20%, k1 is 40% and this may be generally expressed by the relation k0≦k≦k1).

Suppose here that the XYZ values corresponding to 6DLUT[i] [j] [k] [y] [m] [c] are expressed by 6DLUT[i] [j] [k] [y] [m] [c].X, 6DLUT[i] [j] [k] [y] [m] [c].Y and 6DLUT[i] [j] [k] [y] [m] [c].z, respectively. From the definition of a rational number screen, the XYZ values of the original image at positional coordinates (i1,j1) are equal to the XYZ values at (i2,j2) which satisfy the following equations (48):

$$i2=i1\%m_r, \quad j2=j1\%n_r \tag{48}$$

where % designates a residue calculation; $i2<m_r$ and $j2<n_r$; $m_r \times n_r$ represents the size of the rational number screen. Hence, i2 and j2 represent positional coordinates in the 6D-LUT.

If the results of determination by interpolation of 6D-LUT are written as 6DLUT(i,j,k,y,m,c).X - Z, they can be calculated by the following equations (49):

$$6DLUT(i1, j1, k, y, m, c) \cdot X = 6DLUT(i2, j2, k, y, m, c) \cdot X \tag{49}$$

$$= 6DLUT[i2][j2][k0][y0][m0][c0] \cdot$$

-continued $$X * YV0000[i2][j2] +$$

$$6DLUT[i2][j2][k0][y0][m0][c1] \cdot$$

$$X * YV0001[i2][j2] \ldots +$$

$$6DLUT[i2][j2][k1][y1][m1][c1] \cdot$$

$$X * YV1111[i2][j2]$$

$$= 6DLUT[i2][j2][k0][y0][m0][c0] \cdot$$

$$X * (k1-k)(y1-y)(m1-m)(c1-c) *$$

$$(k1-k0)(y1-y0)(m1-m0)(c1-c0) +$$

$$6DLUT[i2][j2][k0][y0][m0][c1] \cdot$$

$$X * (k1-k)(y1-y)(m1-m)(c-c0) *$$

$$(k1-k0)(y1-y0)(m1-m0)(c1-c0) \ldots +$$

$$6DLUT[i2][j2][k1][y1][m1][c1] \cdot$$

$$X * (k-k0)(y-y0)(m-m0)(c-c0) *$$

$$(k1-k0)(y1-y0)(m1-m0)(c1-c0)$$

$$= 6DLUT[i2][j2][k0][y0][m0][c0] \cdot$$

$$X * (k1-k)(y1-y)(m1-m)(c1-c) * V +$$

$$6DLUT[i2][j2][k0][y0][m0][c1] \cdot$$

$$X * (k1-k)(y1-y)(m1-m)(c-c0) * V \ldots$$

$$= 6DLUT[i2][j2][k1][y1][m1][c1] \cdot$$

$$X * (k-k0)(y-y0)(m-m0)(c-c0) *$$

$$V6DLUT(i1, j1, y, m, c) \cdot Y$$

$$= 6DLUT[i2][j2][k0][y0][m0][c0] \cdot$$

$$Y * (k1-k)(y1-y)(m1-m)(c1-c) * V +$$

$$6DLUT[i2][j2][k0][y0][m0][c1] \cdot$$

$$Y * (k1-k)(y1-y)(m1-m)(c-c0) * V \ldots +$$

$$6DLUT[i2][j2][k1][y1][m1][c1] \cdot Y *$$

$$(k-k0)(y-y0)(m-m0)(c-c0) *$$

$$V6DLUT(i1, j1, k, y, m, c) \cdot Z$$

$$= 6DLUT[i2][j2][k0][y0][m0][c0] \cdot Z *$$

$$(k1-k)(y1-y)(m1-m)(c1-c) * V +$$

$$6DLUT[i2][j2][k0][y0][m0][c1] \cdot Z *$$

$$(k1-k)(y1-y)(m1-m)(c-c0) * V \ldots +$$

$$6DLUT[i2][j2][k1][y1][m1][c1] \cdot Z *$$

$$(k-k0)(y-y0)(m-m0)(c-c0) * V$$

where $i2 = i1\% m_r$ and $j2 = j1\% nr$; YVxxxx represents the four-dimensional volume of a four-dimensional grid unit (a four-dimensional cube defined as an equivalent of a cube in a three-dimensional space) which includes vertices (kw,yw,mw,cw) [which are diagonally opposite to (kx,yx,mx,cx)] and a point (k,y,m,c); $V = (k1 - k0)(y1 - y0)(m1 - m0)(c1 - c0)$.

It should also be noted that each of x'es is YVxxxx is either 0 or 1 and that each of w's in kw, yw, mw and cw is also either 0 or 1, provided that when x is 0, w is 1 and vice versa.

Thus, using (referencing) the 6D-LUT 77, image data (dot area percentage data $aj_a'$) which have positional coordinates of (i1,j1) in the original image can be processed to yield tristimulus data XYZ in a CIE XYZ color system in a common color space which have the first image fine structures such as moiré and the second image fine structures such as rosette emphasized and adjusted in accordance with the type of the printing machine to be eventually used to produce a printed document. By determining the tristimulus data XYZ for all of the positional coordinates in the original image, full-image tristimulus data XYZ can be obtained. The thus obtained full-image tristimulus data XYZ are sent to DP 53, where they are subjected to the next step S61 for performing color conversion in a device-dependent manner.

We next describe the color conversion and color proof production which are to be performed by DP 53 in step S61.

In the color conversion process of step S61, the tristimulus data XYZ in a common color space which result from the processing with 6D-LUT in step S60 and which have image fine structures such as moiré and rosette emphasized properly are converted to gradation image data which are dependent on device such as DP 53. The color space represented by the data to be converted was already determined at the point of time when 6D-LUT was constructed in step S58 and, in the case under consideration, said data are represented by tristimulus values in a CIE XYZ color system. Therefore, in order to output matching colors on a proof printer, it is necessary to perform data conversion to those values which are dependent on the output device (e.g. a continuous-tone color printer or a display such as CRT), as exemplified by device-dependent RGB. To determine RGB image data for outputting a color proof on DP 53, interpolation is performed in the color conversion process using color converting LUTs (lookup tables) capable of conversion from the tristimulus data XYZ to device-dependent RGB data.

The thus obtained RGB image data are used by DP 53 to output a color proof. The image on the output hard copy, namely, the color proof CPb features not only color matching with the color printed document 62 but also faithful reproduction of peculiar image fine structures which would appear in halftone images. In other words, moiré, rosette and other image fine structures (peculiar patterns) that are substantially the same as those which would appear in the color printed document 62 can be faithfully reproduced on the color proof CPb.

Described above are the basic compositions of the method of predicting and processing image fine structures according to the second embodiment of the invention, as well as the color print producing system which implements this method.

In the above-described exemplary case of 6D-LUT generation in step S58, colorimetric data $X_i, Y_i, Z_i$ are used to construct the first tristimulus data X,Y,Z and the second tristimulus data X',Y',Z', both kinds of data being mean colorimetric data. Alternatively, other common color space data (device-independent data) such as chromaticity or gray scale data may be used to construct the mean calorimetric data. All that is required is that when image data such as dot area percentage data are converted to image data with emphasized image fine structures such as rosette using the 6D-LUT in step S60, such image data should be constructed as mean calorimetric data on a common color space using data that were measured on a non-device dependent color space (i.e. common color space). Speaking of the dot arrangement in the threshold matrices 64 and 74, so-called FM screens characterized by a random arrangement of halftone dots may equally be employed to produce color proofs by implementation of the present invention.

As already described with reference to FIG. 18, the first tristimulus data X,Y,Z determined in the process of rendering into bit map data b'j (also called "halftoning") in step S63 and subsequent data processing in step S64 are composed of pixels which are several times smaller than pixels at a resolution of 400 dpi (=Re3 or the resolution of DP 53); for example, the pixels comprising the first tristimulus data X,Y,Z have an-intermediate resolution (Re5=1600 dpi). The process of determining the first tristimulus data X,Y,Z is as follows: first, a pixel of an intermediate resolution is divided into a matrix of 28×28 dots of a much smaller area [one dot having a resolution of 44800 dpi (=Re4)] (see FIGS. 21A and 21B); check is made as to which one of the 16 primary colors is represented by each of said tiny areas and the dots representing the 16 primary colors are summed up for the individual pixels having the intermediate resolution (the count-up step S65); preliminarily measured tristimulus data $X_i, Y_i, Z_i$ for the 16 primaries are subjected to weighted averaging with weights which represent the counts of the 16 primaries. If the area percentage $c_i$ of each of the 16 primary colors is written as $P_i$ (existential probability), the first tristimulus data X,Y,Z can be determined by the following equation (50):

$$X = (P_i \times X_i) \quad (i=1-16) \tag{50}$$

which also holds for Y and Z.

As described in connection with the comparing step S63, the color represented by each small-area dot can be readily determined by comparing the threshold values of the threshold matrices 74 with the values of CMYK dot area percentage data $a_j$ (dot percentage or dot area percentage). On the other hand, in order to ensure high precision in the colors of pixels at the intermediate resolution, the number of small areas has to be increased to, for example, as many as 28×28 dots and this only results in prolonged calculations.

To deal with this problem, the present inventors already proposed a convenient technique using cumulative histograms in Japanese Patent Application Hei 8-179122. According to this technique, the existential probability (also called "dot presence probability") $P_i$ is determined for each of the pixels at the intermediate resolution by a stochastic method of approximation such as the aforementioned Neugebauer's equation. Briefly, $P_i$ (i=1–16) is determined in accordance with the following equations (51):

$$P_1 = (1-P_c)(1-P_m)(1-P_y)(1-P_k)$$

$$P_2 = P_c \cdot (1-P_m)(1-P_y)(1-P_k)$$

$$P_3 = (1-P_c) \cdot P_m \cdot (1-P_y)(1-P_k)$$

$$P_4 = P_c \cdot P_m \cdot (1-P_y)(1-P_k)$$

$$P_5 = (1-P_c)(1-P_m) \cdot P_y \cdot (1-P_k)$$

$$P_6 = P_c \cdot (1-P_m) \cdot P_y \cdot (1-P_k)$$

$$P_7 = (1-P_c) \cdot P_m \cdot P_y \cdot (1-P_k)$$

$$P_8 = P_c \cdot P_m \cdot P_y \cdot (1-P_k)$$

$$P_9 = (1-P_c)(1-P_m)(1-P_y) \cdot P_k$$

$$P_{10} = P_c \cdot (1-P_m)(1-P_y) \cdot P_k$$

$$P_{11} = (1-P_c) \cdot P_m \cdot (1-P_y) \cdot P_k$$

$$P_{12} = P_c \cdot P_m \cdot (1-P_y) \cdot P_k$$

$$P_{13} = (1-P_c)(1-P_m) \cdot P_y \cdot P_k$$

$$P_{14} = P_c \cdot (1-P_m) \cdot P_y \cdot P_k$$

$$P_{15} = (1-P_c) \cdot P_m \cdot P_y \cdot P_k$$

$$P_{16} = P_c \cdot P_m \cdot P_y \cdot P_k \tag{51}$$

The existential probabilities $P_c$, $P_m$, $P_y$ and $P_k$ for the colors C, M, Y and K, respectively, are orthodoxically determined by comparing the dot area percentage data $a_j$ with the threshold values T of the threshold matrices 74. However, considering that the value C (or M, Y or K) of the dot area percentage data $a_j$ is constant at the level of intermediate resolution whereas the threshold value T varies with the position of a specific tiny area, the process of comparison in step S63 may be accelerated by performing it on each group of pixels at the intermediate resolution. To this end, a cumulative histogram of threshold values T may be constructed for each number of tiny areas composing one pixel at the intermediate resolution, namely, for each matrix of 28×28 dots (28×28 threshold values). The vertical axis of each cumulative histogram plots cumulative frequency, which corresponds to the existential probability Pi.

There may sometimes be the need to reproduce various aspects of the sensation in quality of the print sheet on a color proof and they include the following: 1) "unevenness" which is felt as a random change in density pattern that occurs in the image reproduced on the print sheet by ink transfer from the uniform image on press plates; 2) "graininess" which is also felt as a random change in density pattern but which is fine enough to introduce "jaggies" into the edges of a reproduced image (at shorter periods than "unevenness"); 3) "texture" which is felt as a peculiar density pattern depending on the type of the print sheet. There may also be the need to correct color shifts and other defects in the simulation of image fine structures. In a case like these, the methods described in commonly assigned Unexamined Published Japanese Patent Applications (kokai) Hei 9-115854 and Hei 9-270930 may of course be applied either prior to or after the processes of predicting (or simulating) image fine structures in accordance with the invention, such as moiré emphasis in step S59 or rosette emphasis in step S60.

It should also be noted that the adjustment of the intensities of moiré and sharpness emphasis which are preferably added to the moiré emphasis step S59 is by no means limited to the foregoing example which has been described as a specific case of the first embodiment of the invention.

For actual application of the invention method of predicting and processing image fine structures, a printed document having a screen ruling of 175 and screen angles of 15, 45, 0 and 75 degrees for CMYK was simulated in accordance with the color proof producing system 60 shown in FIG. 16 to output a color proof CPb on "Pictrography 3000" of Fuji Photo Film Co., Ltd. which was a photographic continuous-tone digital printer of 400 dpi. In the experiment, halftones were expressed by the repetition of patterns in a single cell of a size 43×43 (a square about 2.73 mm per side on Pictography) and the degree of moiré emphasis α, the ratio of sharpness emphasis β and the ratio of rosette emphasis γ were set at 1.2, 0.5 and 2.0, respectively (except that for the colors that were close to the bounds of the range of color reproduction by the digital printer "Pictrography 3000", γ was adjusted to a value close to 0.0).

For comparison, a color proof CPa was produced on the same digital printer "Pictrography 3000" using the conventional color proof producing system shown in FIG. 23.

The image on the color proof CPb was compared with the image formed on a print sheet using an actual color printing machine and with the image on the color proof CPa produced by application of the conventional color proof system. The image on CPb was capable of faithful reproduction of moiré, rosette image and other peculiar patterns that would appear in the image on the color printed document 62 output from the color printing machine. As regards "graininess" and "unevenness", the image on CPb was closer to the image on the printed document 62 than the image on CPa which was produced with the digital printer using the Naugebauer's equation according to the conventional color proof system. Thus, the overall result of simulation by the method of the invention was quite satisfactory.

When the mathematical operations involved in the method of the invention were performed with a personal computer "Power Macintosh 9500/132" of Apple Computer, Inc., it took only 10 minutes to complete calculation per proof of size A4, which was several to less than a hundred times shorter than required in the prior art. Thus, substantial reduction in the calculation time was realized by the invention.

In the foregoing example, a continuous-tone printer is used as the image output device but this is not the sole case of the invention and its concept is also applicable to a display monitor and so forth.

It has been commonly held that color printers and the like which have low resolution on the order of 400 dpi are incapable of reproducing peculiar patterns that will appear in color printed documents at higher resolution on the order of 2000 dpi. According to the second embodiment of the invention, the Naugebauer's equation is not used in generating device-independent data for producing printing proofs from an image output device but instead threshold matrices for a printing screen are rendered into bit map data of high resolution to determine the area percentage for each of the colors to be reproduced and the thus determined values of dot percentage are used as weight coefficients for calorimetric data in computing mean calorimetric data at low resolution by referencing position-dependent multi-dimensional lookup tables such as five- or six-dimensional lookup tables having two position parameters and three or four color parameters. Because of these features, the method of the invention can be implemented with an image output device such as a convenient and consistent-performance continuous-tone printer, for example, a color printer of low resolution and yet peculiar phenomena that occur on account of the halftone dots in a printed document can be simulated as faithfully as can be achieved by means of expensive dot-forming proofers. If the data for producing printing proofs as generated by the method of the invention are supplied into the image output device such as a color printer, the latter will output a color proof carrying an image that provides an accurate, faithful and rapidly accessible reproduction of moiré, rosette and other image fine structures peculiar to the color printed document.

In addition, the method of the invention realizes substantial reduction in the length of time required by mathematical operations to be performed in simulating image fine structures.

The method of the invention also provides an improvement in the precision of color reproduction, thereby producing a proof representing colors adequately closer to those in a printed document.

A further advantage of the method of the invention is that the amplitude of simulated second image fine structures such as rosette can be enhanced without causing any side effects such as deterioration in moiré and other first image fine structures and the lowering of color precision.

Yet another advantage of the method of the invention is that the amplitude of simulated second image fine structures such as rosette can be adjusted by optimization for the specific type of a printing machine or medium to be used.

According to still another advantage of the method of the invention, moiré, line discontinuities and other image fine structures can be predicted on either a hard or soft proof accurately, easily and within a short time, preferably without impairing the image sharpness.

The present invention also enables the intensities of moiré and sharpness to be adjusted on simulations (proofs) of image fine structures and, therefore, in addition to the simulation of image fine structures such as rosette, image sharpness and moiré can be simulated in a manner appropriate for the specific type of the printing machine to be used, thereby enabling the production of proofs with higher fidelity.

According to a further advantage of the invention, lookup tables are constructed by such a method that mean calorimetric data are processed not only for color correction but also from the center outward, with mean predicted colorimetric data located in the center and this allows the reproduction of nearly pure colors, which eventually results in even more faithful reproduction of image fine structures such as a rosette pattern.

While the method of the invention for predicting and processing various image fine structures has been described above with reference to two specific embodiments, it should be noted that the invention is by no means limited to those embodiments and various improvements and design modifications are of course possible without departing from the spirit and scope of the invention.

What is claimed is:

1. A method of predicting and processing image fine structures, in which an original image is converted to dot area percentage data for n plates including at least three primary colors and, for ensuring that a color proof for a color printed document which is to be produced with a color printing machine is output from an image output device using said dot area percentage data, said dot area percentage data are converted to color proof image data for predicting the image fine structures on said color printed document, comprising:

preliminarily dividing into N stages 0–100% dot area percentage data for each of the n plates;

determining gradation image data as device-independent data for predicting said image fine structures for each monochromatic image for $N^n$ colors in total, thereby constructing a lookup table that has a repeating pixel size necessary for predicting said image fine structures and which has a position parameter and n color parameters as arguments; and converting the dot area percentage data for the n plates associated with said original image to said color proof image data by referencing said lookup table.

2. The method according to claim 1, wherein prior to conversion to said gradation image data, the dot area percentage data for the respective plates associated with said original image are subjected to weighted averaging together with neighboring pixels by means of adjustable weights in order to emphasize said image fine structures, said weights being dependent on the period of grid units which is determined by the screen ruling and the screen angle.

3. The method according to claim 2, wherein the weights dependent on the period of said grid units are arranged in the respective elements of a weighting matrix of the same mask size as said neighboring pixels and if the weights to be arranged in the respective elements of the weighting matrix are written as $F(i,j,k,l)$, if $E(k,l)$ is written for a coefficient matrix of the same size as said weighting matrix, said coefficient matrix having a coefficient of 1.0 at the center and a coefficient of 0 in the other positions and if the coefficient of said weight adjustment is written as $\alpha$, then the weights to be arranged in the respective elements of said weighting matrix after weight adjustment are given by the following equation (3):

$$F'(i,j,k,l)=\alpha\{-E(k,l)+F(i,j,k,l)\}+E(k,l) \qquad (3)$$

where (i,j) represents the coordinates of the position at which said pixel to be converted is located in said original image, and (k,l) represents the coordinates in the weighting matrix of the same mask size as said neighboring pixels.

4. The method according to claim 1, wherein said lookup table is constructed by the steps of:

converting the dot area percentage data for the n plates associated with said original image into bit map data, with a threshold matrix of a higher resolution than said color printed document being referenced for each of the dot area percentage data for said n plates;

counting up, for a given range of said bit map data, the area percentage for each of the $2^n$ colors depending upon the presence or absence of each of the n plates, with the bit map data for the n plates being referenced simultaneously;

processing predetermined colorimetric data for each of the $2^n$ colors with the counted up area percentage as a weight coefficient, thereby calculating first mean colorimetric data;

performing an anti-aliasing filtering process successively on said first mean colorimetric data for a range larger than the pixels on said image output device, thereby converting said mean calorimetric data into second mean colorimetric data which correspond to the pixels on said image output device; and using the thus obtained second mean calorimetric data as said gradation image data.

5. The method according to claim 1, further comprising:

taking said gradation image data constructing said lookup table as first gradation image data;

outputting a test proof of each of said monochromatic images from said image output device based on said first gradation image data and subsequently measuring the colors of said test proof with a calorimeter;

color correcting said first gradation image data for all pixels of said repeating pixel size using both the obtained colorimetric data and the desired data for the average of said first gradation image data for all pixels of said repeating pixel size, thereby yielding second gradation image data; and using the thus obtained second gradation image data to construct said lookup table.

6. The method according to claim 5, wherein if with respect to one color specification value in a common color space for said monochromatic images, said calorimetric data is written as Xout, said desired data Xa, said first gradation image data Xi, said second gradation image data Xpi and said repeating pixel size $m_r \times n_r$, then said color correction process is expressed by the following equation (4):

$$Xpi=(Xi/Xout)\times Xa (i=1\sim m_r\times n_r) \qquad (4).$$

7. The method according to claim 1, further comprising:

taking said gradation image data constructing said lookup table as preliminary gradation image data;

averaging said preliminary gradation image data over all pixels of said repeating pixel size for each of said monochromatic images so as to yield a mean value;

adjusting the distance between said preliminary gradation image data for each pixel and said mean value, with the latter taken as the central value, thereby adjusting the amplitude of said image fine structures so as to yield revised gradation image data; and using the thus obtained revised gradation image data to construct said lookup table.

8. The method according to claim 7, wherein if with respect to one color specification value in a common color space for said monochromatic images, said mean value is written as Xave, said preliminary gradation image data Xqi, said revised gradation image data Xri, said repeating pixel size $m_r \times n_r$ and a ratio of emphasis of image fine structure $\gamma$, then said process of adjusting the amplitude of image fine structures is expressed by the following equations (5):

$$Xave=(\Sigma_I Xqi)/(m_r \times n_r) \quad Xri=Xave \times (Xqi/Xave)^\gamma \qquad (5)$$

where $i=1-m_r \times n_r$, $\Sigma_I Xqi$ represents the sum of Xqi, with i ranging from 1 to $m_r \times n_r$, and $(Xqi/Xave)^\gamma$ represents the mathematical operation of raising (Xqi/Xave) to the $\gamma$th power.

9. The method according to claim 7, wherein said color correction process and said process of adjusting the amplitude of image fine structures are performed in that order, each process at least once.

10. The method according to claim 9, wherein said color correction process is repeated at least once after said color correction process and said process of adjusting the amplitude of image fine structures are performed in that order, each process at least once.

* * * * *